(12) United States Patent
Koller et al.

(10) Patent No.: US 11,724,807 B2
(45) Date of Patent: Aug. 15, 2023

(54) SYSTEMS AND METHODS FOR IN-FLIGHT RECOVERY OF A TARGET AIRCRAFT BY A HOST AIRCRAFT DURING FORWARD FLIGHT

(71) Applicant: General Atomics Aeronautical Systems, Inc., San Diego, CA (US)

(72) Inventors: Kevin David Koller, Ramona, CA (US); Michael Joseph Allwein, San Luis Obispo, CA (US); Roy Hultenius, Encinitas, CA (US); Armen Assatourian, Escondido, CA (US); Russell Temple, Golden, CO (US)

(73) Assignee: General Atomics Aeronautical Systems, Inc., San Diego, CA (US)

( * ) Notice: Subject to any disclaimer, the term of this patent is extended or adjusted under 35 U.S.C. 154(b) by 415 days.

(21) Appl. No.: 15/930,281

(22) Filed: May 12, 2020

(65) Prior Publication Data
US 2021/0354825 A1 Nov. 18, 2021

(51) Int. Cl.
*B64U 70/20* (2023.01)
*B64D 5/00* (2006.01)
*B64C 39/02* (2023.01)
*B64U 70/30* (2023.01)
*B64U 80/82* (2023.01)

(52) U.S. Cl.
CPC .............. *B64D 5/00* (2013.01); *B64C 39/024* (2013.01); *B64U 70/20* (2023.01); *B64U 70/30* (2023.01); *B64U 80/82* (2023.01)

(58) Field of Classification Search
CPC ...... B64C 2201/182; B64D 5/00; B64D 3/02; B64D 39/06; B64F 1/0295; B64U 70/20
See application file for complete search history.

(56) References Cited

U.S. PATENT DOCUMENTS

| 2,464,073 A | 3/1949 | Cotton |
| 3,013,743 A | 12/1961 | Keeney |
| 3,207,480 A | 9/1965 | Fulton, Jr. |
| 6,932,299 B2 | 8/2005 | Beyerle et al. |
| 7,059,564 B2 | 6/2006 | Dennis |

(Continued)

FOREIGN PATENT DOCUMENTS

| CN | 107933925 A | * | 4/2018 | ............... B64D 3/00 |
| CN | 111776148 | | 10/2020 | |
| WO | 2016167849 A1 | | 10/2016 | |

OTHER PUBLICATIONS

International Search Report and Written Opinion in PCT Application No. PCT/US2021/031510 dated Aug. 27, 2021, in 19 pages.

(Continued)

*Primary Examiner* — Christopher D Hutchens
*Assistant Examiner* — Michael A. Fabula
(74) *Attorney, Agent, or Firm* — Knobbe, Martens, Olson & Bear, LLP

(57) ABSTRACT

In-flight recovery of an unmanned aerial vehicle (UAV). A towline may be deployed by a host aircraft in-flight in order to recover a target UAV that is also in-flight. A reel on the host aircraft may pay out the towline having a fitting thereon. A catch on the target UAV may engage with the fitting on the towline, and the reel may then retract the towline to thereby pull in the target UAV to the host aircraft. The target UAV may then securely attach with the host aircraft.

31 Claims, 72 Drawing Sheets

(56) References Cited

U.S. PATENT DOCUMENTS

| | | | |
|---|---|---|---|
| 7,066,430 B2 | 6/2006 | Dennis et al. | |
| 7,097,137 B2 | 8/2006 | McDonnell | |
| 7,900,866 B2* | 3/2011 | Kutzmann | B64C 39/024 244/116 |
| 8,038,090 B2* | 10/2011 | Wilson | B64C 39/024 244/1 TD |
| 8,074,931 B2 | 12/2011 | Schroeder | |
| 8,231,083 B2* | 7/2012 | Kutzmann | B65H 75/44 244/137.4 |
| 8,991,793 B1 | 3/2015 | Bernhardt | |
| 9,878,777 B2* | 1/2018 | Bernhardt | B64C 39/024 |
| 10,246,189 B2* | 4/2019 | Paunicka | B64D 5/00 |
| 10,266,267 B2* | 4/2019 | Paunicka | B64C 39/024 |
| 10,589,859 B2 | 3/2020 | Foo et al. | |
| 10,913,534 B1* | 2/2021 | Brum | B64C 39/024 |
| 11,008,102 B2 | 5/2021 | Ryan et al. | |
| 2005/0133665 A1 | 6/2005 | Dennis et al. | |
| 2007/0108345 A1 | 5/2007 | McDonnell | |
| 2010/0038477 A1* | 2/2010 | Kutzmann | B64D 5/00 242/400 |
| 2010/0237183 A1* | 9/2010 | Wilson | B64C 39/024 244/3 |
| 2010/0276537 A1* | 11/2010 | Kutzmann | B64C 39/024 244/1 TD |
| 2011/0006151 A1* | 1/2011 | Beard | B64D 3/00 244/3 |
| 2013/0082137 A1 | 4/2013 | Gundlach et al. | |
| 2013/0320138 A1 | 12/2013 | Dickson et al. | |
| 2017/0349283 A1* | 12/2017 | Paunicka | B64C 39/024 |
| 2018/0327093 A1 | 11/2018 | Von Flotow et al. | |
| 2021/0237901 A1 | 8/2021 | von Flotow et al. | |

OTHER PUBLICATIONS

TE Connectivity Ltd., Rochester Cables, Engineered Cable Solutions for Harsh Environments, dated Apr. 2016, in 16 pags.

Rescue Hoist Model 44301, A Rugged Reliable Rescue Hoist, collinaerospace.com/hoistandwinch, dated Jan. 2019, in 2 pages.

Rescue Hoist Model 42305, A Rugged Reliable Rescue Hoist, collinaerospace.com/hoistandwinch, dated Jan. 2019, in 2 pages.

Rescue Hoist Model 42325/44314, A Rugged Reliable Rescue Hoist, collinaerospace.com/hoistandwinch, dated Jan. 2019, in 2 pages.

U.S. Appl. No. 17/455,383, filed Nov. 17, 2021, Airborne Recovery of Unmanned Aerial Vehicles.

U.S. Appl. No. 17/455,376, filed Nov. 17, 2021, Airborne Recovery of Unmanned Aerial Vehicles.

* cited by examiner

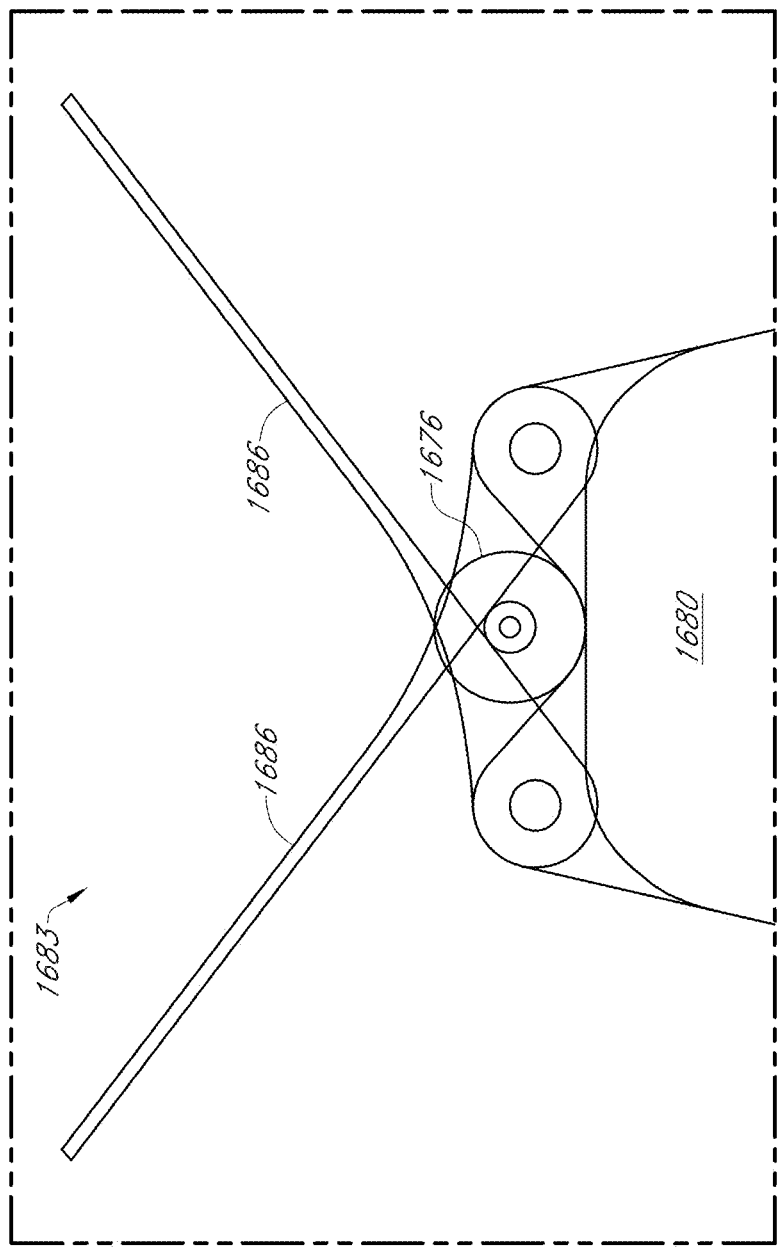

SYSTEMS AND METHODS FOR IN-FLIGHT RECOVERY OF A TARGET AIRCRAFT BY A HOST AIRCRAFT DURING FORWARD FLIGHT

BACKGROUND

Field

This disclosure relates generally to unmanned aerial vehicles (UAVs), in particular to systems and methods for recovery of a UAV while in flight.

Related Art

Unmanned aerial vehicles (UAVs) are aircraft that are piloted without a human pilot onboard. UAVs may be used for transport, surveillance, communications, weapons, and other uses. UAVs typically take off from the ground and return to the ground, which limits their versatility and usefulness. Improvements to these and other drawbacks are desirable.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices and methods for unmanned aerial vehicles (UAVs).

The following disclosure describes non-limiting examples of some embodiments. Other embodiments of the disclosed systems and methods may or may not include the features described herein. Moreover, disclosed advantages and benefits may apply only to certain embodiments of the invention and should not be used to limit the disclosure.

Features for in-flight recovery of a target UAV are described. A towline may be deployed by a host aircraft in-flight in order to recover a target UAV that is also in-flight. A reel on the host may pay out the towline having a fitting on an end thereof. The towline may have control features, such as located weights, to orient (e.g. horizontally) the section of the towline having the fitting. The host aircraft, the target UAV, and/or the towline may be maneuvered in-flight such that a catch on the target UAV is positioned forward of the fitting on the towline. The UAV and host aircraft may then move vertically relatively closer together to capture the towline within arms of the catch. The UAV and host aircraft may then move horizontally relatively closer together to cause the towline fitting and target aircraft catch to engage. The reel may then retract the towline, to thereby pull in the target UAV to the host aircraft. The target UAV may then securely attach with the host aircraft (such as using standard military lugs). This is just an overview, and various aspects, embodiments, and further details of the development are described herein.

In one aspect, a system for in-flight recovery of a target aircraft by a host aircraft during forward flight is described. The system comprises a reel, a towline, and a catch. The reel is configured to attach with the host aircraft. The towline comprises an aft section with a fitting attached to the aft section, where the reel is configured to pay out the towline from the reel to extend the fitting away from the host aircraft during forward flight. The catch is configured to attach with the target aircraft and to transition from a first configuration to a second configuration. In the first configuration, the catch is configured to vertically receive a part of the towline located forward of the fitting. In the second configuration, the catch is configured to prevent vertical separation of the towline from the catch as the catch and the towline move horizontally relative to each other. The catch is further configured to engage with the fitting after sufficient relative horizontal movement between the catch and the towline, and the reel is further configured to retract the towline with the catch engaging the fitting to direct the target aircraft towards the host aircraft.

Various embodiments of the various aspects are described herein. The towline may include a forward section, a weighted section, and the aft section, where the forward section is separated from the aft section by the weighted section. The aft section of the towline may include a drogue, and the weighted section of the towline and the drogue may be configured to cause the aft section of the towline to extend rearward from the weighted section at an angle of less than 180° (degrees) relative to the forward section. The aft section of the towline may include a drogue configured to increase drag on the aft section of the towline to thereby cause the aft section to be oriented in a substantially horizontal orientation. The drogue may comprise the fitting. The fitting may be located along the towline forward of the drogue. The catch may comprise one or more arms configured to deploy, to guide the towline, and to stow.

In another aspect, a method for in-flight recovery of a target aircraft by a host aircraft during forward flight is described. The method comprises deploying a towline away from the host aircraft, vertically receiving the towline with a catch on the target aircraft, causing relative horizontal movement between the catch and the towline, engaging a fitting attached to the towline with the catch after sufficient relative horizontal movement between the catch and the towline, and retracting the towline toward the host aircraft to direct the target aircraft toward the host aircraft.

Various embodiments of the various aspects are described herein. The method may further comprise orienting an aft section of the towline in a substantially horizontal orientation. The method may further comprise detecting a position of the towline using an imaging system on the target aircraft and/or host aircraft. The method may further comprise changing a configuration of the target aircraft to a tow configuration. Vertically receiving the towline with the catch on the target aircraft may include deploying one or more arms of the catch to receive the towline. The method may further comprise securing the target aircraft with the host aircraft.

In another aspect, a system for in-flight recovery of a target aircraft by a host aircraft during forward flight is described. The system comprises a reel, a towline, and a catch. The reel is configured to attach with the host aircraft. The towline comprises a forward section, an aft section, a weighted section located between the forward section and the aft section, and a fitting attached to the aft section. The reel is configured to pay out the towline away from the host aircraft during forward flight such that the aft section extends substantially horizontally from the weighted section. The catch is configured to attach with the target aircraft and to engage the fitting during forward flight. The reel is further configured to retract the towline with the catch engaging the fitting to direct the target aircraft towards the host aircraft.

Various embodiments of the various aspects are described herein. The forward section may be separated from the aft section by the weighted section. The system may further comprise a drogue attached with the aft section, and where the weighted section of the towline and the drogue are configured to cause the aft section of the towline to extend rearward from the weighted section at an angle of less than 180° (degrees) relative to the forward section. The drogue may be one of a chute, a streamer, and a solid-body object. The fitting may be located forward of the drogue. The weighted section may comprise a plurality of weighted objects configured to allow the towline to be severed along the weighted section. The catch may be further configured to transition from a first configuration to a second configuration, where in the first configuration the catch is configured to vertically receive a part of the towline located forward of the fitting, and in the second configuration the catch is configured to prevent vertical separation of the towline from the catch as the catch and the towline move horizontally relative to each other.

The foregoing summary is illustrative only and is not intended to be limiting. Other aspects, features, and advantages of the systems, devices, and methods and/or other subject matter described in this application will become apparent in the teachings set forth below. The summary is provided to introduce a selection of some of the concepts of this disclosure. The summary is not intended to identify key or essential features of any subject matter described herein

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawing, may be arranged, substituted, combined, and designed in a wide variety of different configurations, all of which are explicitly contemplated and make part of this disclosure.

FIGS. 34A-34C are schematics of another embodiment of catch arms shown in various configurations to secure a fitting of a towline, and that may be used with the various aircraft recovery systems described herein

DETAILED DESCRIPTION

The following detailed description is directed to certain specific embodiments of the development. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments.

Unmanned aerial vehicles (UAVs) are aircraft without a human pilot onboard. UAVs may be piloted manually by a remote operator and/or through autonomous or semi-autonomous controls. The remote operator may pilot the UAV based on the UAV's flight cameras, gauges, and other control sensors. A UAV may include a fuselage, one or more flight surfaces, such as wings, extending outwardly from the fuselage, and a propulsion system, such as a combustion or electric engine. UAVs may be used in a number of roles, such as aerial reconnaissance and ground surveillance, monitoring terrestrial objects and people, scientific experiments, geological surveys, military or non-military contexts, weapon delivery, and others.

Larger aircraft may generally have greater operable ranges than smaller or lighter UAVs. Thus, carrying a UAV on a host aircraft and launching therefrom expands the useful range of the UAV. However, safely landing the UAV for terrestrial recovery may be difficult or impossible in certain circumstances. For example, the geography may lack sufficient landing space, or the landing spaces may be in undesirable locations (e.g., under enemy control). Moreover, existing methods of aerial recovery of UAVs are impractical and unreliable. Accordingly, a need exists for the reliable recovery of a UAV midflight.

Figure 1A:
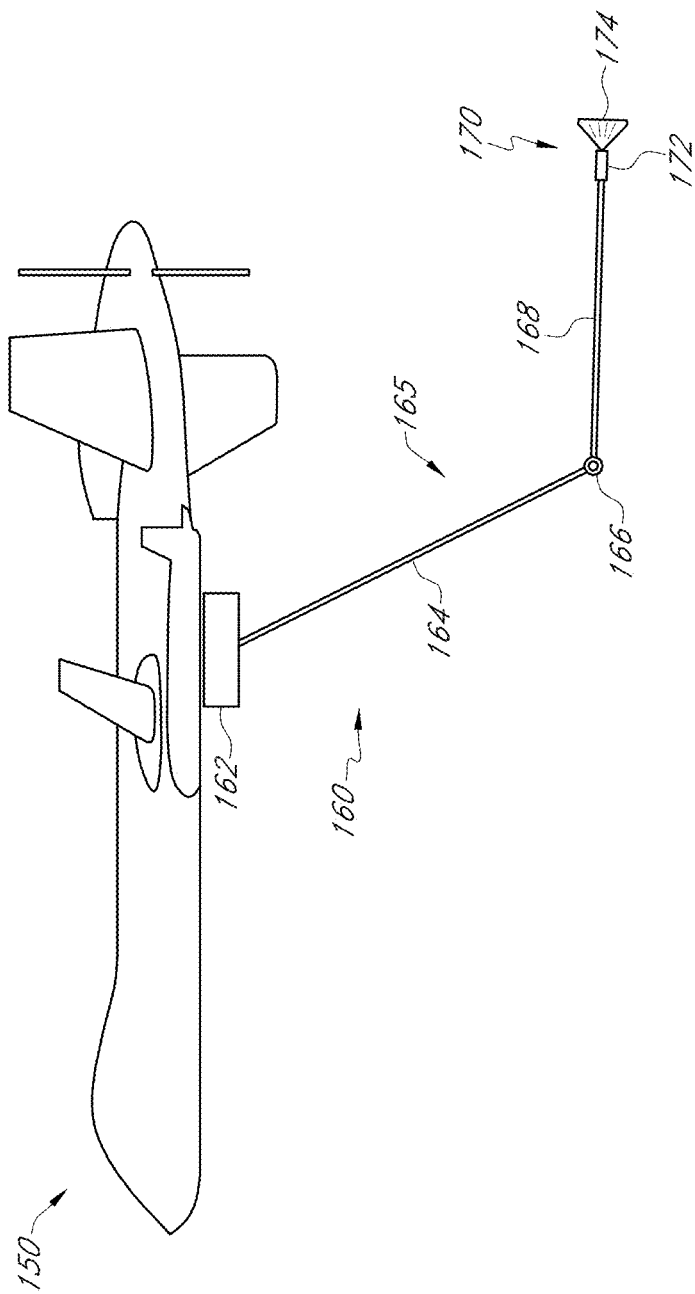
FIG. 1A is a side view of an embodiment of a host aircraft with a towline deployed therefrom.
Figure 1B:
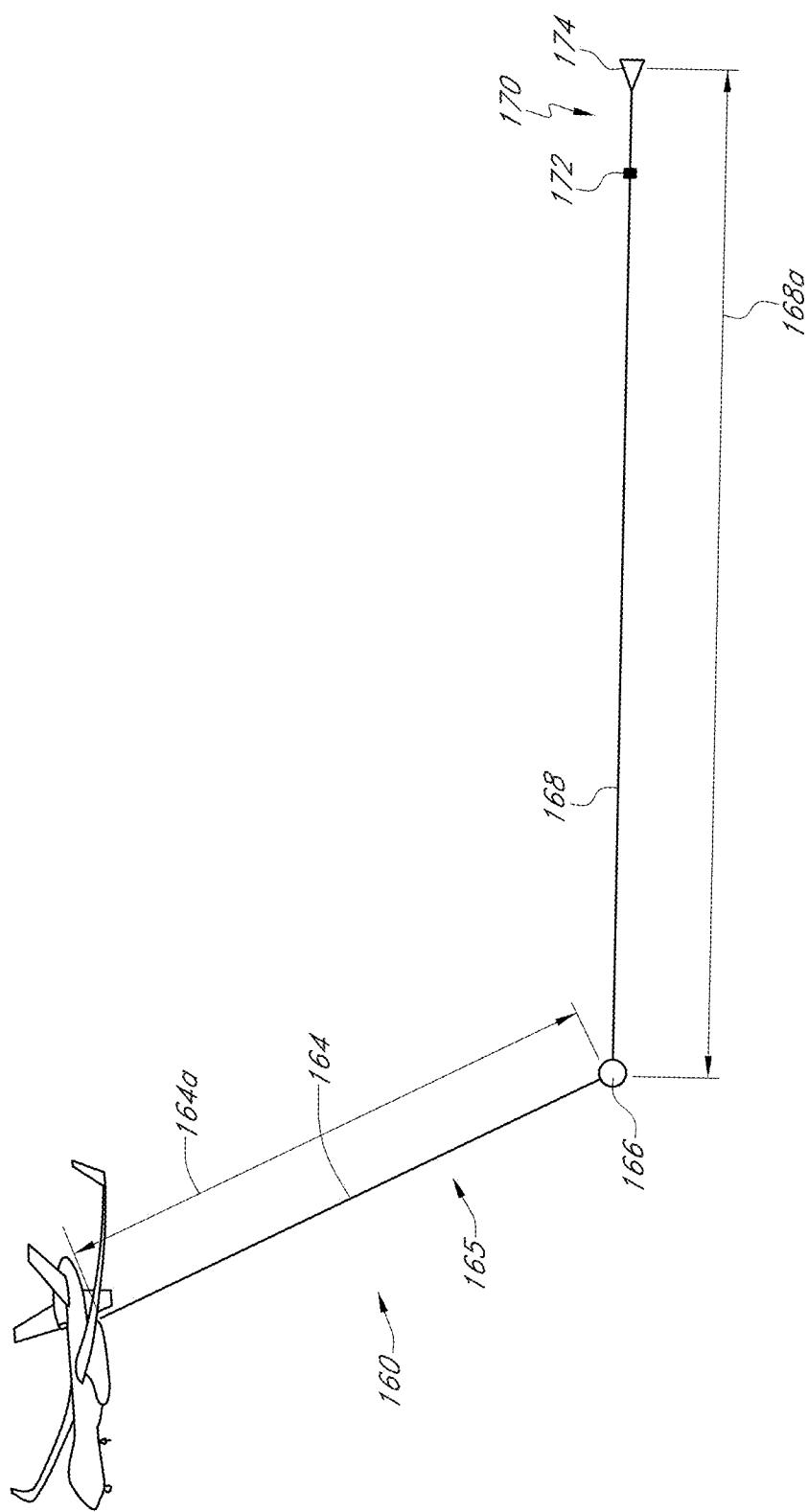
FIG. 1B is a side perspective view of another embodiment of a host aircraft with a towline deployed therefrom.
Figure 2:
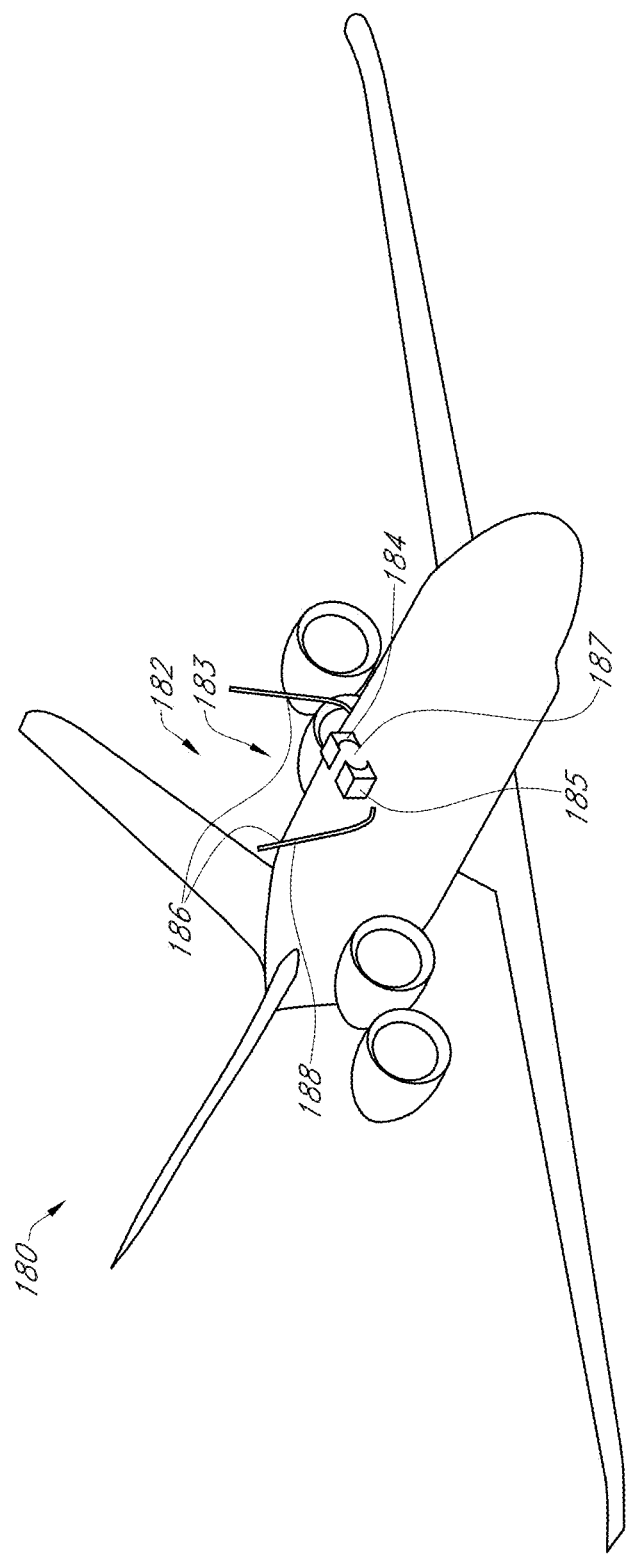
FIG. 2 is a front perspective view of an embodiment of a target aircraft, shown as a UAV, having a catch configured to engage with a towline.

This disclosure generally relates to systems and methods for the in-flight recovery of a target aircraft, such as a UAV, by a host aircraft using a towline recovery system. FIG. 1A is a side view of an embodiment of a host aircraft 150 with a towline of a towline recovery system 160 deployed therefrom. FIG. 1B is a side perspective view of another embodiment of the host aircraft 150 with a towline of the towline recovery system 160 deployed therefrom. FIG. 2 is a front perspective view of an embodiment of a target aircraft 180, shown as a UAV, having a catch configured to engage with a towline.

The in-flight recovery of the target aircraft 180 made be performed using the towline recovery system 160 of the host aircraft 150. The host aircraft 150 may be any type of manned or unmanned aircraft. The host aircraft 150 may be a conventional aircraft such as a jet or prop-driven aircraft, UAV, or other aircraft type. The target aircraft 180 may be any type of UAV, although this disclosure is not limited to UAVs. The target aircraft 180 may be smaller by size and/or weight than the host aircraft 150.

During a recovery maneuver in which the host aircraft 150 recovers the target aircraft 180, the towline recovery system 160 may be extended from the host aircraft 150. The target aircraft 180 and the towline recovery system 160 may be aligned with each other and then coupled together. The towline recovery system 160 may then be retracted to direct the coupled target aircraft 180 towards the host aircraft 150. Once retracted, the target aircraft 180 may be securely attached with the host aircraft 150. Optionally, the target aircraft 180 may also be deployable from the host aircraft 150 before and/or after recovery. The recovery may occur during any phase of flight. The recovery may occur during forward flight, ascending or descending flight, takeoff, landing, or other phases. The host and/or target aircraft may be forward flying aircraft. In some embodiments, one or both of the host and target aircraft may be in vertical flight, such as a vertical takeoff and landing (VTOL) aircraft, helicopter, or other types of aircraft.

There are various uniquely desirable features of the towline recovery system 160 and the methods described herein for recovery of a target aircraft 180 by a host aircraft 150. One advantage is the expanded utility of smaller or lighter UAVs. For example, it may be advantageous to use smaller or lighter UAVs instead of larger aircraft in target locations where it is beneficial to avoid detection. By recovering the target aircraft 180 using the host aircraft 150 and the towline recovery system 160 (e.g., in a safe location away from the target location), exposure or detection of the host aircraft 150 within the target location may be minimized within. Further, for example, larger aircraft may be more expensive to operate and maintain than smaller or lighter UAVs. By utilizing the target aircraft 180 to complete a task and then recovering the target aircraft 180 using the host aircraft 150 and the towline recovery system 160, total flight time of the host aircraft 150 may be minimized in favor of flight time by the target aircraft 180.

As mentioned, the host aircraft 150 may be equipped with the towline recovery system 160. The towline recovery system 160 may be attached in and/or with a fuselage of the host aircraft 150 and/or one of the wings or other portions of the host aircraft 150. Advantageously, the towline recovery system 160 may be attached on an underside of the host aircraft 150, such as under a wing. In one embodiment, the towline recovery system 160 may be attached on a pylon on the wing of the host aircraft 150. As shown in FIG. 1A, the towline recovery system 160 includes a towline that is deployed, for example fully extended, from the host aircraft 150 in midflight.

The towline recovery system 160 may include a reel system 162. As further described herein, for example with respect to FIGS. 16-18, the reel system 162 may include a motor and a rotatable drum. The motor may operate to rotate the rotatable drum. The reel system 162 may attach with a towline 165, such as a rope, cord, extension, other suitable elongated feature, or combinations thereof. The towline 165 may attach with the rotatable drum. The reel system 162 may pay out, or allow to pay out, and/or retract the towline 165 by rotation of the rotatable drum. The motor may be controlled by an operator (e.g. by a manned operator or a remote operator).

The towline 165 may comprise a forward section 164 and an aft section 168. The forward section 164 may be separated from the aft section 168 by a sinker 166. The sinker 166 may attach with the towline 165. The towline 165 may be formed out of a woven material such as a natural and/or synthetic fiber. In some embodiments, the material of the towline 165 may include metallic material such as metallic strands or cables. In some embodiments, the material of the towline 165 may be a composite of natural or synthetic fibers and metal cabling. The forward section 164 may be formed integrally with the aft section 168. The towline 165 may have the sinker 166 attached thereto. In certain implementations, the sinker 166 may be contained within the material of the towline 165. For example, the towline 165 may comprise a tubular structure with the sinker 166 disposed therein.

The sinker 166 may include one or more weights made out of a dense material, such as a metal (e.g., steel, lead or tungsten). The sinker 166 may be permanently or removable affixed with the towline 165. The sinker 166 may be spherical, oblong, teardrop, or any other shape. Preferably, the sinker 166 may be shaped to minimize or lessen air drag on the towline 165. In certain implementations, the sinker 166 may be a weighted section of the towline 165. The weighted section may comprise a plurality of discrete weights or an elongated weight. During flight of the host aircraft 150 and notwithstanding any catenary shape of the forward section 164, the sinker 166 may cause the forward section 164 to extend in a generally vertical direction such that the sinker 166 is located at a lower altitude than the host aircraft. For example, a straight line from the sinker 166 to the reel system 162 may be less than 45° from vertical. In another example, a straight line from the sinker 166 to the reel system 162 may be less than 30° or less than 15° from vertical.

The aft section 168 may include an end 170. The end 170 may be a terminal end of the towline 165. The aft section 168 may include a fitting 172. The fitting 172 may be located at or near the end 170. The fitting 172 may include a cylindrical member. The cylindrical member may include a longitudinal axis aligned along the towline 165. The fitting 172 may have a forward end including a taper. The fitting 172 may be configured to couple with a corresponding structure of a target aircraft, such as a catch system, as further described herein. The aft section 168 may extend beyond the fitting 172.

Figure 41A:
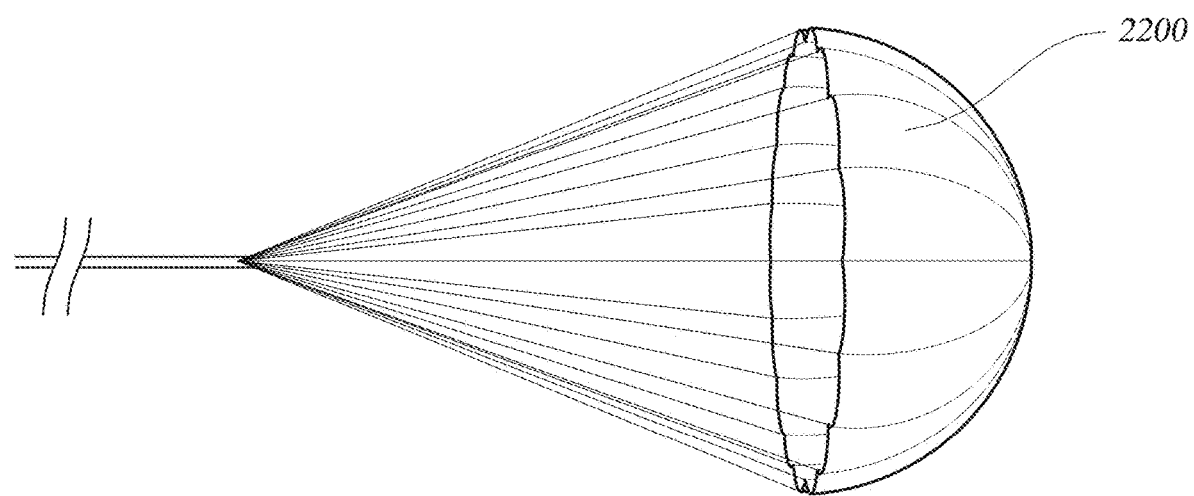
FIG. 41A is a schematic illustration of a chute attached to an aft section of a towline.
Figure 41B:
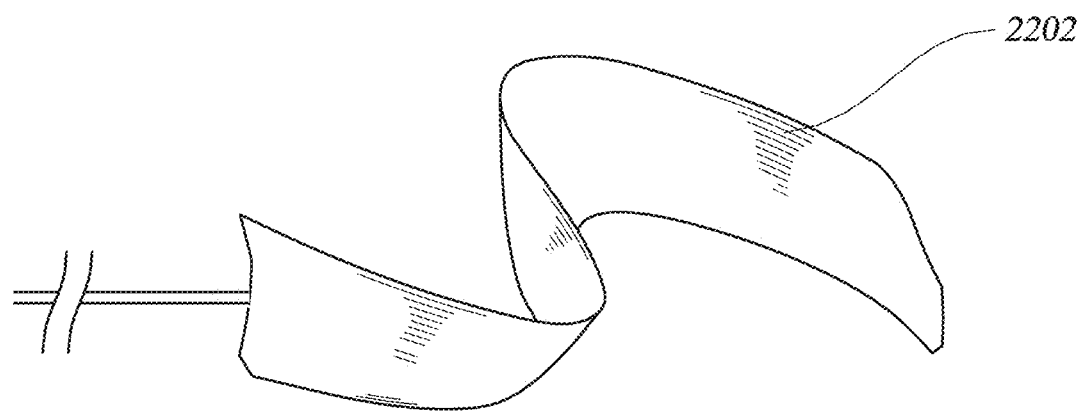
FIG. 41B is a schematic illustration of a streamer attached to an aft section of a towline.
Figure 41C:
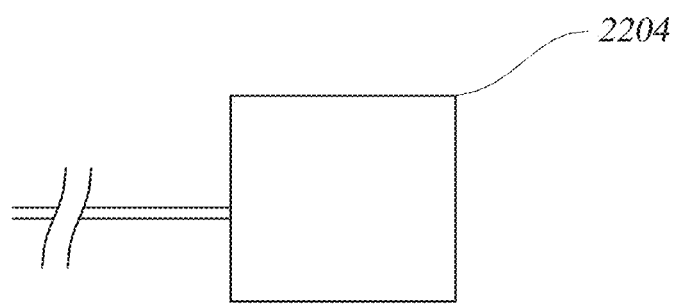
FIG. 41C is a schematic illustration of a solid body object attached to an aft section of a towline.

The aft section 168 may include a drogue 174. With reference to FIGS. 41A-41C, the drogue 174 may be a chute 2200, a streamer 2202, or a solid body object 2204. The drogue 174 may be attached with the aft section 168 at the end 170. The aft section 168 may terminate at, or extend rearward beyond, the drogue 174. The drogue 174 may be located rearward of the fitting 172 along the aft section 168. The drogue 174 may be attached with the fitting 172 (e.g., either assembled therewith or formed integrally therewith). The drogue 174 may include a longitudinal axis aligned along the towline 165, for example with the aft section 168. The drogue 174 may include an outward portion extending radially outward and rearward from the longitudinal axis. The outward portion of the drogue 174 may be designed to maximize or increase air drag on the aft section 168.

The drogue 174 may be configured to position the aft section 168 of the towline 165 in flight. During flight of the host aircraft 150 and notwithstanding any catenary shape of the aft section 168, the drogue 174 may cause the aft section 168 to extend rearward from the sinker 166 at an angle of less than 180° (degrees) relative to the forward section 164. The aft section 168 of the towline 165 may be generally horizontal. As used herein, "horizontal" refers to a direction generally parallel to the horizon while in flight, and "vertical" refers to a direction generally perpendicular to the horizontal direction. For example, a straight line from the sinker 166 to the drogue 174 may be less than 45° from horizontal. In another example, a straight line from the sinker 166 to the drogue 174 may be less than 30° or less than 15° from horizontal.

As shown in FIG. 1A, when the towline recovery system 160 is deployed the drogue 174 and the fitting 172 are attached with the aft section 168. The aft section 168 may be paid out of the reel system 162 (e.g., by rotation of the rotating drum). The drogue 174 may assist in paying out the aft section 168 and/or other portions of the towline 165, by creating drag and a corresponding rearward force on the end 170. The sinker 166 may be paid out of the reel system 162. The forward section 164 may be paid out of the reel system 162. The sinker 166 may assist in paying out the forward section 164, for example due to drag and/or gravity. The sinker 166 may cause the forward section 164 to drag from the reel system 162 in a relatively vertical configuration. The drogue 174 and the sinker 166 may cause the aft section 168 to drag in a relatively horizontal configuration. The towline recovery system 160 may thus be configured for recovery of a target aircraft 180, as shown in FIG. 2.

FIG. 1B further shows exemplary dimensions for the towline recovery system 160. The forward section 164 may be paid out (e.g., from the reel system 162 to the sinker 166) to extend greater than 20 feet, greater than 50 feet, greater than 75 feet, greater than 100 feet, greater than 125 feet, or more. The forward section 164 may be paid out to extend between 20 feet and 200 feet, or more. The length 164a the forward section 164 may extend from the host aircraft 150 to the sinker 166. The aft section 168 may be paid out to extend between 20 feet and 200 feet, or more. The aft section 168 may be paid out to extend greater than 20 feet, greater than 50 feet, greater than 75 feet, greater than 100 feet, greater than 125 feet, or more. The forward section 164 may be paid out to extend between 20 feet and 200 feet, or more. The length 168a of the aft section 168 may extend from the sinker 166 to the drogue 174.

As shown in FIG. 2, the target aircraft 180 may include a towline catch system 182. In certain implementations the target aircraft 180 may include a fuselage, a propulsion system, wings, rudders, and control systems appropriate for the target aircraft 180. The target aircraft 180 may be operable by a remote operator. The towline catch system 182 may be configured for attaching with the host aircraft 150 via the towline recovery system 160, as described further below. The towline catch system 182 may attach with a fuselage, wing or other portion of the target aircraft 180. The towline catch system 182 may attach on an upper side of the target aircraft 180. The towline catch system 182 may be aligned with the wings of the target aircraft 180. The catch system 182 may be located along a centerline of the fuselage of the target aircraft 180. The area in which the towline catch system 182 attaches with the target aircraft 180 may be generally flat or otherwise relatively free of vertically extending obstructions. For example an upper portion of the fuselage of the target aircraft 180 may be generally free of antennae and rear stabilizers. In certain implementations, the rear stabilizers may be on a lower side of the target aircraft 180 or spread in a generally more horizontal configuration to prevent interference with the towline 165.

The catch system 182 may include one or more catch arms 186, 188. Optionally, each of the catch arms 186, 188 may include one or more arms, although a pair are illustrated in FIG. 2. The catch arms 186, 188 may each include elongated members extending from respective bases. The elongated members of the catch arms 186, 188 may be generally straight or curved. Distal ends of the catch arms 186, 188 may include hooks. The catch arms 186, 188 may be spaced apart on opposite sides of the catch system 182. The catch arms 186, 188 may be spaced on opposites sides of a plane dividing the target aircraft into left and right sides. The catch arms 186, 188 may be spaced equidistant from the plane. Each catch arm 186, 188 may be aligned across from, or slightly misaligned with, a respective catch arm.

The catch arms 186, 188 may be movable (e.g., pivotable) about the base relative to the target aircraft 180. In a stowed configuration, the catch arms 186, 188 may extend generally downwardly and generally along the sides of the catch system along sides of the fuselage of the target aircraft 180. In an open configuration, the catch arms 186, 188 may extend generally upwardly. In the open configuration, the catch arms 186, 188 may define a capture envelope of the towline 165. In a closed configuration, the catch arms 186, 188 may rotate downwards towards each other and cross to create a closed section between the arms in which to capture the towline. The catch arms 186, 188 may be movable between the stowed, open and closed configurations.

The towline catch system 182 may include a latch 183. The latch 183 may be located between the catch arms 186, 188. The latch 183 may be centered on the catch system 182. The latch 183 may be located anywhere along the target aircraft 180. The latch 183 may be located forward of the catch arms 186, 188. The latch 183 may include a channel 187. The channel 187 may be an aperture that extends through the latch 183 in a forward/rearward direction relative to the target aircraft 180. The latch 183 may include a pair of latch members 184, 185. The latch members 184, 185 may be spaced apart on opposite sides of the catch system 182. The latch members 184, 185 may be spaced on opposites sides of the plane dividing the target aircraft into left and right sides. The latch members 184, 185 may be spaced equidistant from the plane. Each latch members 184, 185 may be aligned across from, or slightly misaligned with, a respective latch arm. Each latch member 184, 185 may include corresponding concave portions.

The latch members 184, 185 may be movable (e.g., translatable) towards each other. In a stowed configuration, the latch members 184, 185 may be located within the fuselage of the target aircraft 180 or otherwise within a housing of the catch system 182. In a deployed configuration, the latch members 184, 185 may extend generally upwardly. In a closed configuration, the latch members 184, 185 may translate towards each other and/or abut. The latch members 184, 185 may be movable between the stowed, open and closed configurations.

In the closed configuration the corresponding concave portions of the latch members 184, 185 may be aligned with each other. In the closed configuration, the corresponding concave portions of opposing latch members 184, 185 may form the channel 187.

Figure 3:
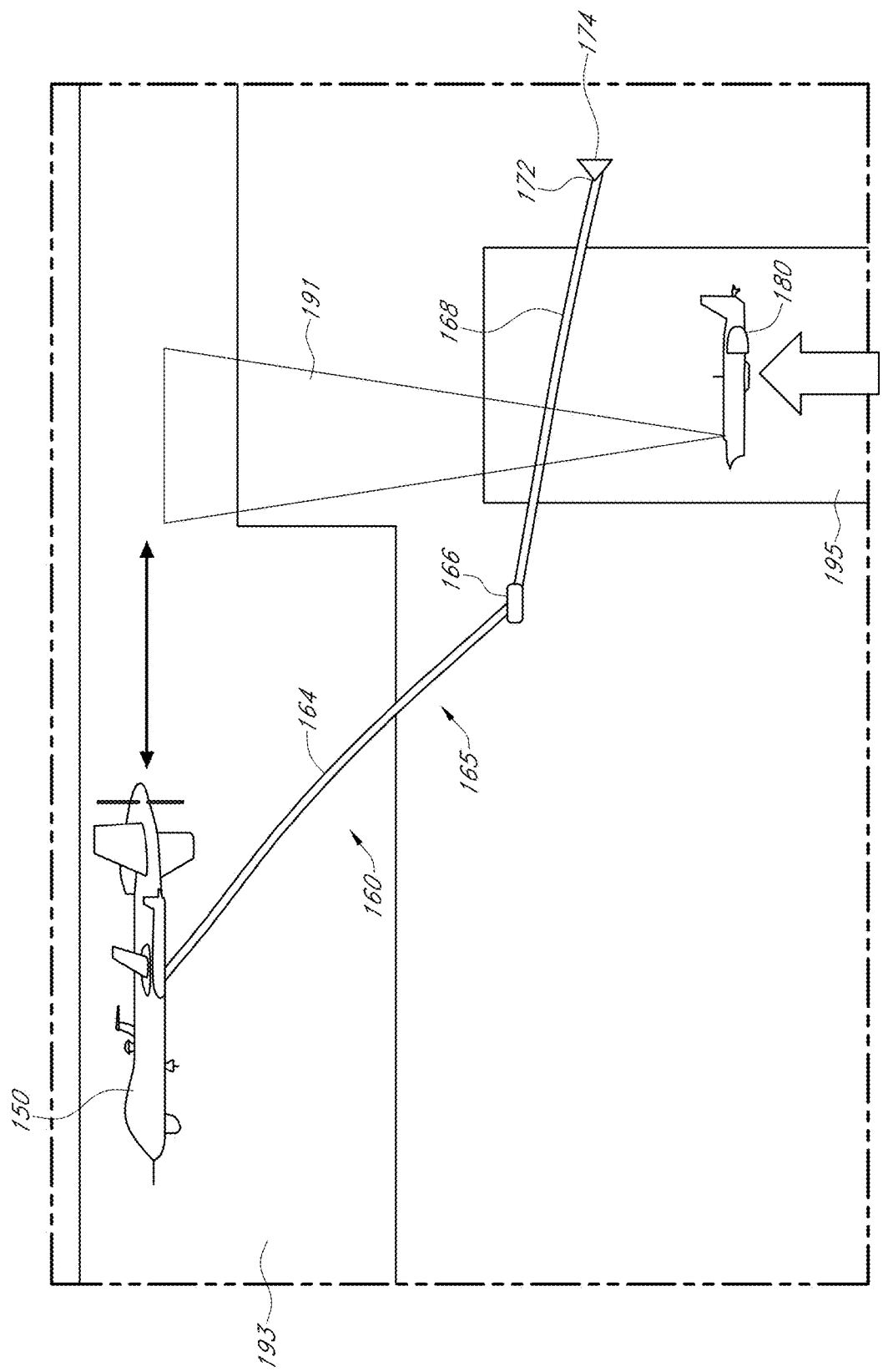
FIG. 3 is a side view of an embodiment of the target aircraft and the host aircraft with deployed a towline performing an initial recovery maneuver.
Figure 4:
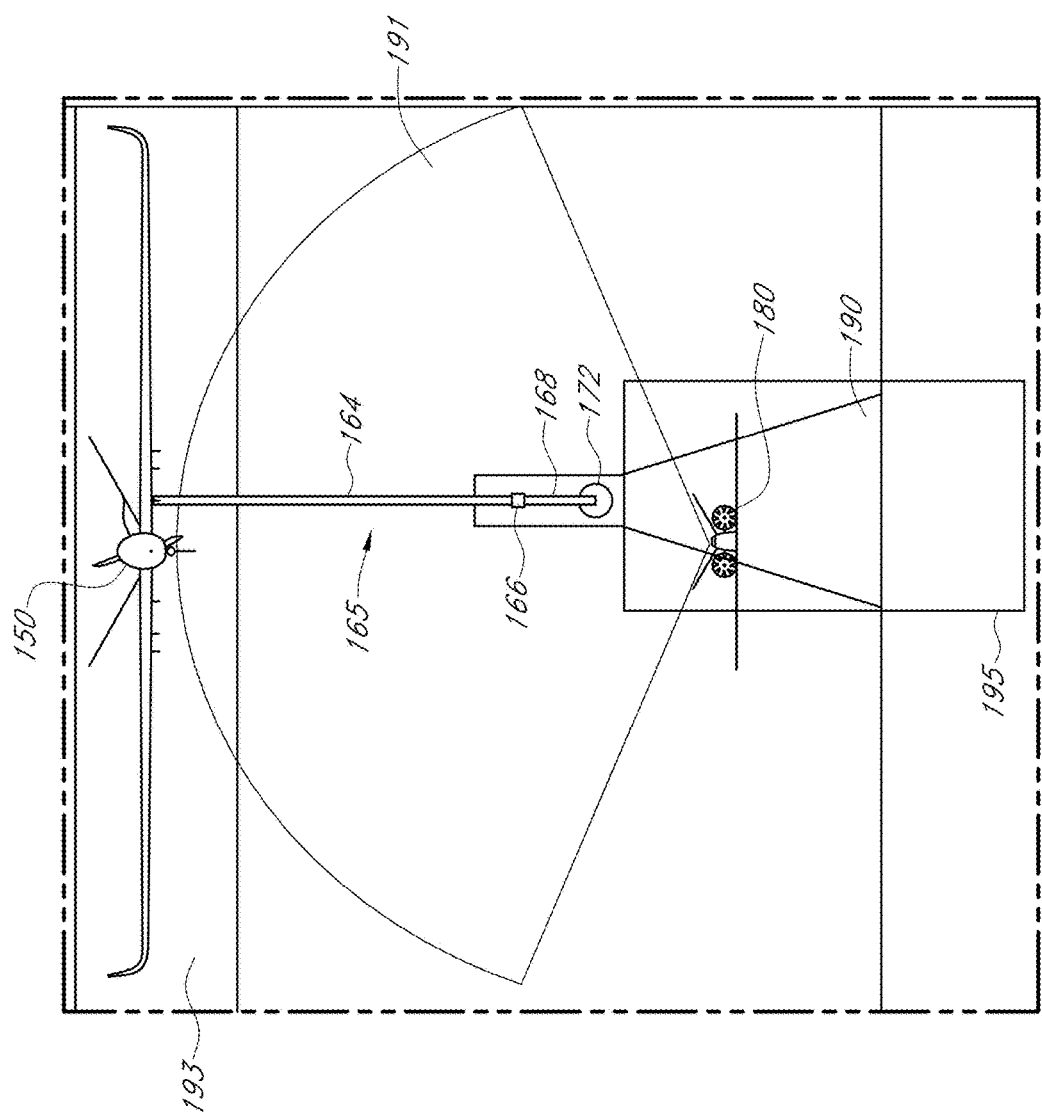
FIG. 4 is a rear view of the target and host aircraft of FIG. 3.
Figure 5:
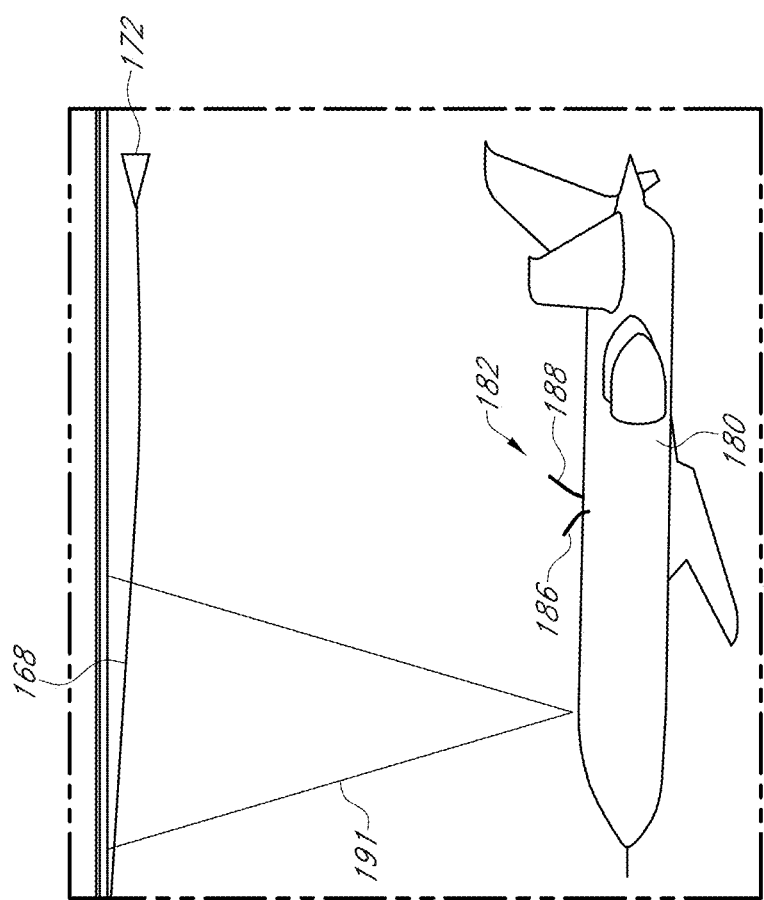
FIG. 5 is a close-up side view of the target aircraft of FIGS. 3-4 detecting the position of the towline.
Figure 6:
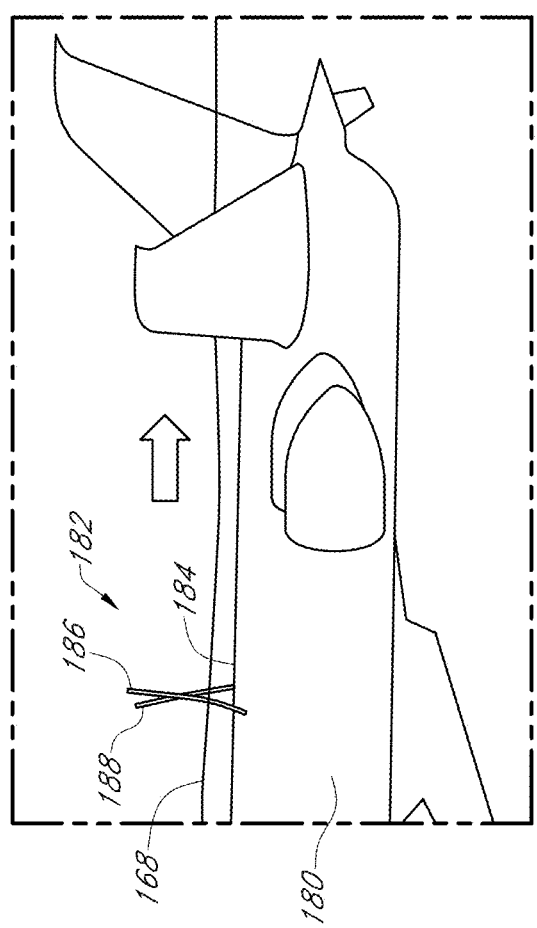
FIG. 6 is a close-up side view of the target aircraft of FIGS. 3-4 having an embodiment of catch arms surrounding a section of the towline that is forward of the fitting at the end of the towline.
Figure 7:
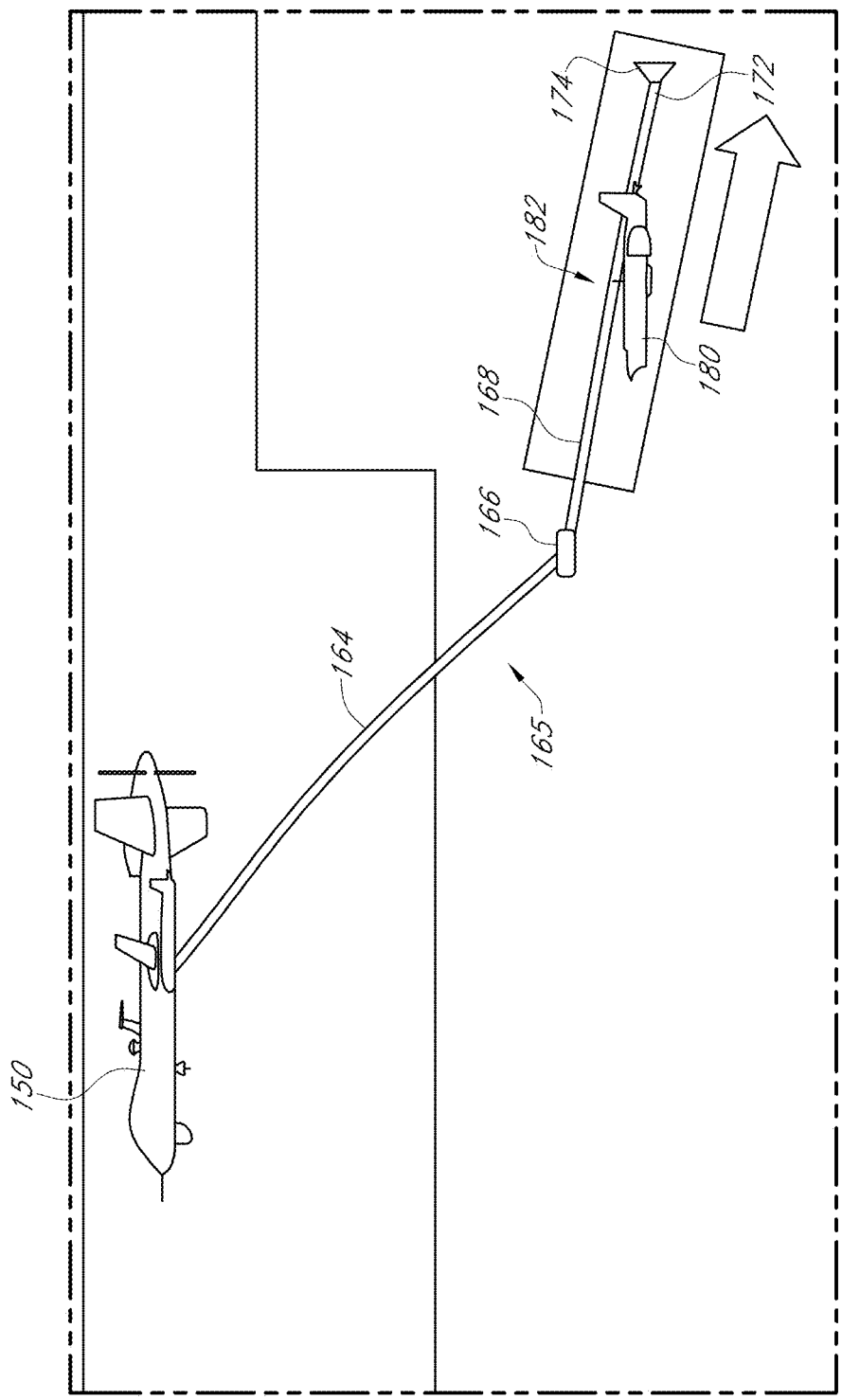
FIG. 7 is a side view of the target and host aircraft of FIGS. 1A-6 executing an embodiment of a latching maneuver with relative horizontal movement between the towline and target aircraft.
Figure 8:
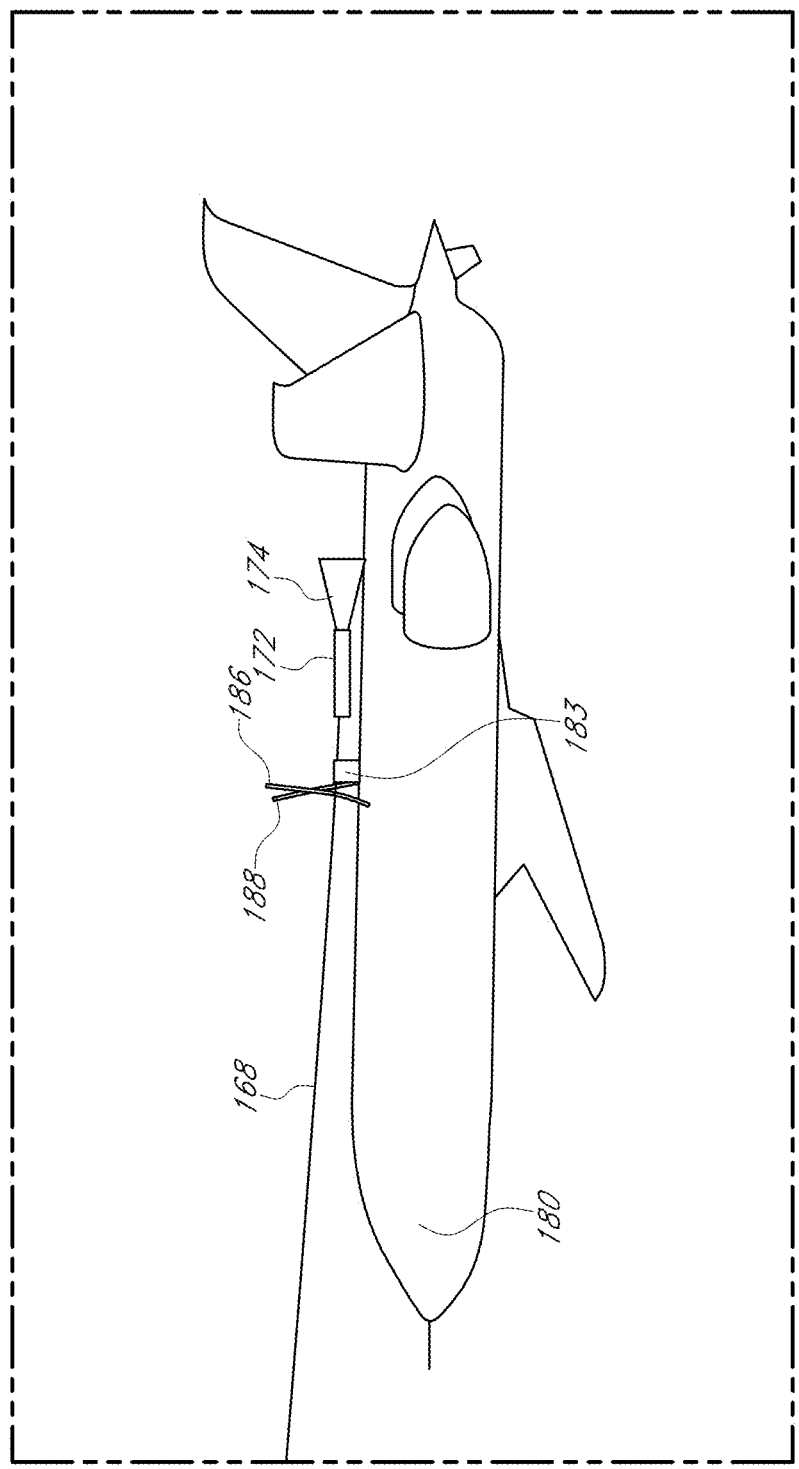
FIG. 8 is a side view of the target aircraft of FIG. 7 with an embodiment of a fitting of the towline aligning with a latch of the catch.

FIGS. 3-13 show various features related to an exemplary recovery maneuver for the host aircraft 150 and the target aircraft 180 that allows for the capture and recovery of the target aircraft 180 using the towline recovery system 160. FIG. 3 is a side view of an embodiment of the target aircraft and the host aircraft with deployed a towline performing an initial recovery maneuver. FIG. 4 is a rear view of the target and host aircraft. FIG. 5 is a close-up side view of the target aircraft of FIGS. 3-4 detecting the position of the towline. FIG. 6 is a close-up side view of the target aircraft of FIGS. 3-4 having an embodiment of catch arms surrounding a section of the towline that is forward of the fitting at the end of the towline. FIG. 7 is a side view of the target and host aircraft of FIGS. 1A-6 executing an embodiment of a latching maneuver with relative horizontal movement between the towline and target aircraft. FIG. 8 is a side view of the target aircraft of FIG. 7 with an embodiment of a fitting of the towline aligning with a latch of the catch. FIG.

Figure 10:
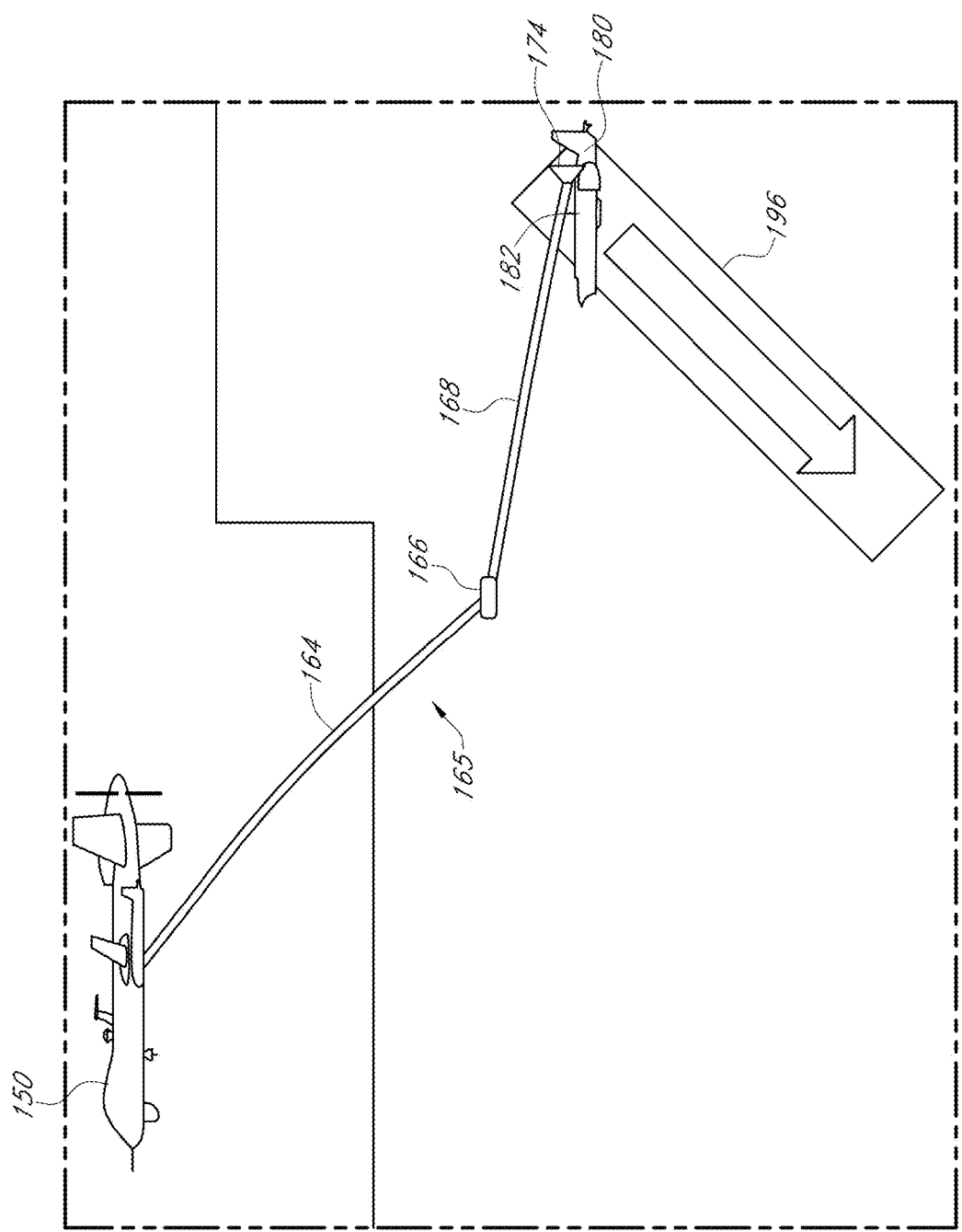
FIG. 10 is a side view of the target and host aircraft of FIGS. 1A-9 showing the target aircraft and the host aircraft executing an embodiment of a tow maneuver.
Figure 11:
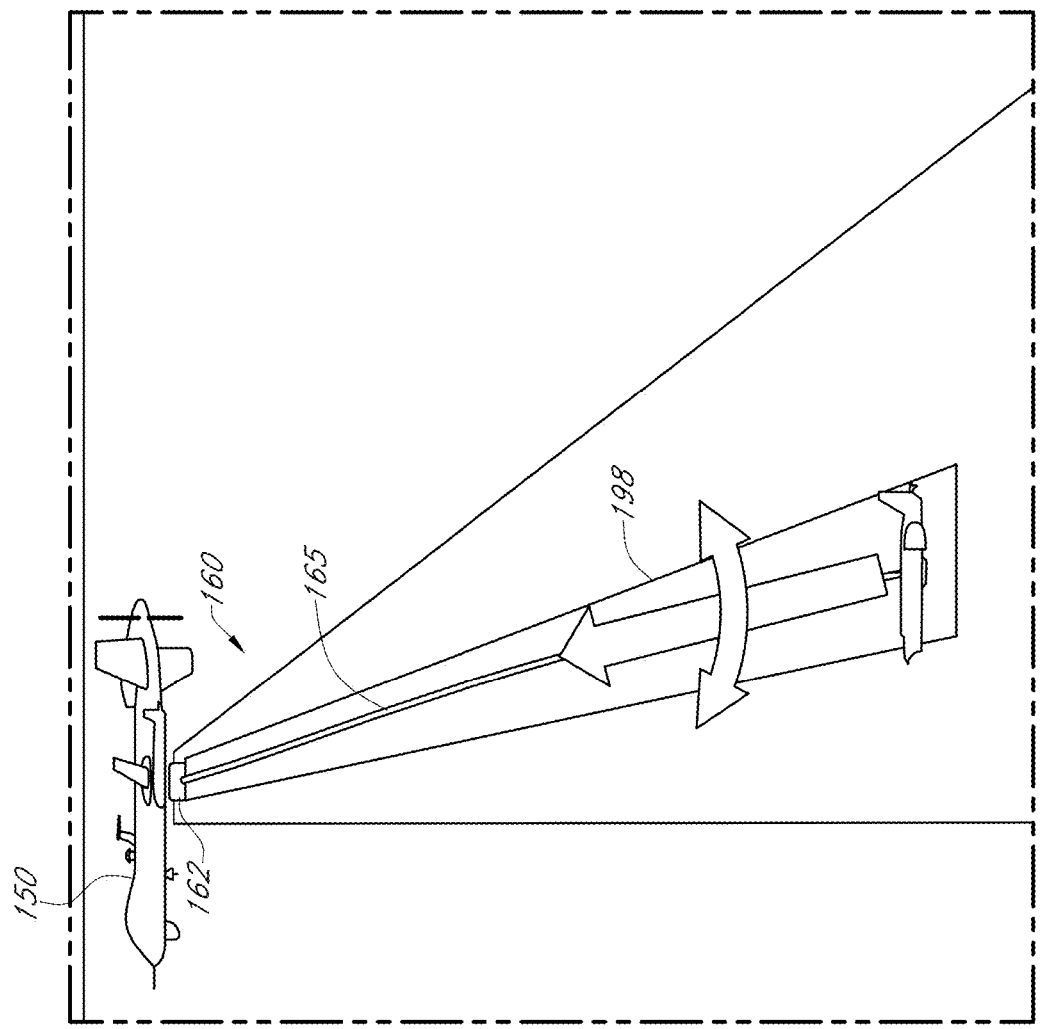
FIG. 11 is a side view of the target and host aircraft of FIGS. 1A-9 showing the target aircraft and the host aircraft executing an embodiment of a towline retraction maneuver.
Figure 12:
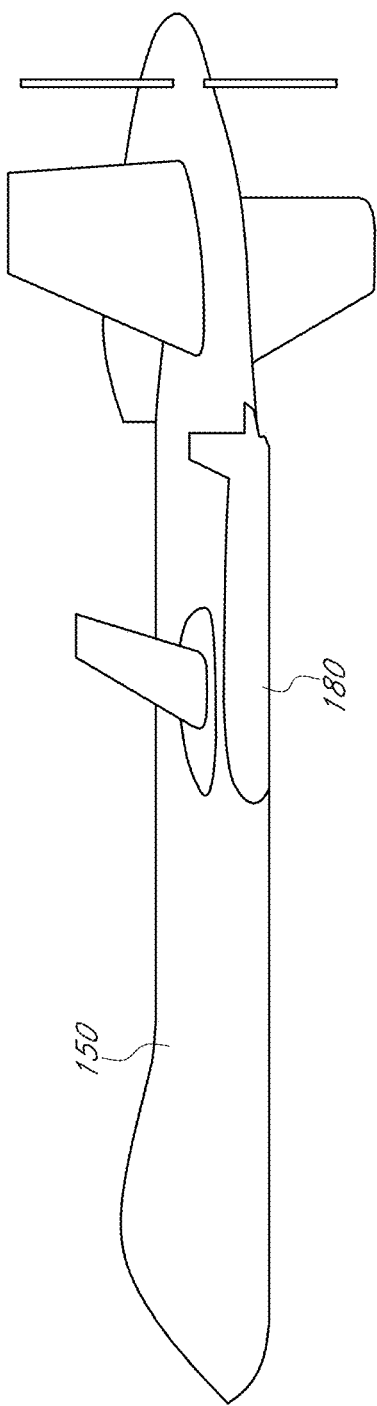
FIGS. 12-13 are side and front views, respectively, of an embodiment of the target aircraft secured to the host aircraft.
Figure 13:
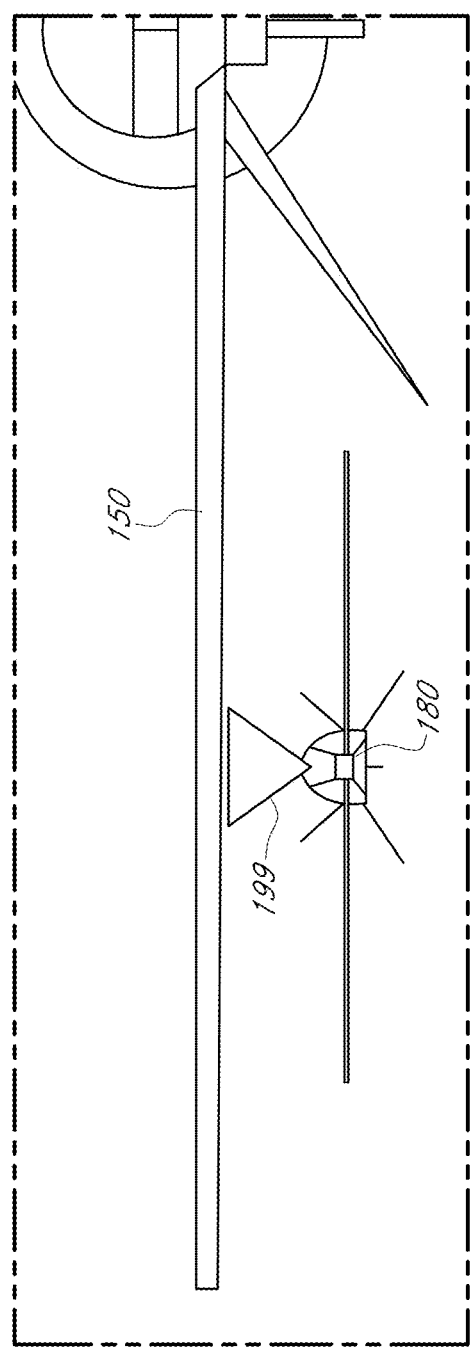

9 is a side view of the target aircraft of FIG. 7 with the latch engaged with the fitting to secure the target aircraft to the towline. FIG. 10 is a side view of the target and host aircraft of FIGS. 1A-9 showing the target aircraft and the host aircraft executing an embodiment of a tow maneuver. FIG. 11 is a side view of the target and host aircraft of FIGS. 1A-9 showing the target aircraft and the host aircraft executing an embodiment of a towline retraction maneuver. FIGS. 12-13 are side and front views, respectively, of an embodiment of the target aircraft secured to the host aircraft.

In FIGS. 3 and 4, the host aircraft 150 may maintain a steady trajectory (e.g., speed and/or direction) with the towline recovery system 160 fully deployed, as described above. The target aircraft 180 may match the trajectory of the host aircraft 150. Optionally, the host aircraft 150 and the target aircraft 180 may communicate directly to match trajectories. The target aircraft 180 may be positioned behind and below the host aircraft 150.

A capture trajectory 195 may be defined based on the location of the aft section 168. The capture trajectory 195 may be aligned with and below the aft section 168 of the towline recovery system 160. The capture trajectory 195 includes both forward/rearward alignment, as shown in FIG. 3, and left/right alignment 190, as shown in FIG. 4. The capture trajectory 195 may extend up to 500 feet below the aft section 168 and/or up to 200 feet to either side of the aft section 168. The target aircraft 180, if forward of the capture trajectory 195, may slow relative to the host aircraft 150 before again matching speed with the host aircraft 150 once the target aircraft 180 is within the capture trajectory 195. If rearward of the capture trajectory 195, the target aircraft 180 may accelerate relative to the host aircraft 150 before again matching speed once within the capture trajectory 195. If left or right of the capture trajectory 195, the target aircraft 180 may move right or left, respectively, into the capture trajectory 195. In some embodiments, the host aircraft 150 may travel at constant speed and direction while the target aircraft 180 adjusts speed and/or altitude, or vice versa. In some embodiments, both the host aircraft 150 and the target aircraft 180 may adjust speed and/or altitude.

An abort trajectory 193 may be defined based on the location of the host aircraft 150. The abort trajectory 193 may represent a volume about the host aircraft 150 in which too much risk is posed to the target aircraft 180 and/or the host aircraft 150 for preforming a recovery maneuver. Too much risk may be posed to the safety of the aircraft and/or to the success of the recovery. Too much risk may be posed if the abort trajectory 193 and the capture trajectory 195 overlap or are otherwise within a threshold distance of each other. The threshold distance may be less than 30 feet, less than 20 feet, less than 10 feet, or less. The abort trajectory 193 may extend 50 feet below the host aircraft 150, and/or 50 feet to either side of the host aircraft 150. For example, the abort trajectory 193 may encompass regions near the props or jets of the host aircraft 150. If the target aircraft 180 becomes inadvertently positioned within the abort trajectory 193, the recovery maneuver may be cancelled by the operators, or automatically by an autopilot subroutine. The target aircraft 180 and/or the host aircraft 150 may break off from one another. Another attempt at the recovery maneuver may afterwards be re-initiated.

The target aircraft 180 may remain within the capture trajectory 195 until it has successfully attached with the towline recovery system 160. Once within the capture trajectory 195, the target aircraft 180 may operate one or more automated or manual imaging systems 191 (e.g., LIDAR, optical cameras, etc.) for detecting the position of the aft section 168 of the towline 165. Within a retrieve trajectory the host aircraft 150 and/or the target aircraft 180 may adjust speeds and trajectories such that the target aircraft 180 may position itself within the capture trajectory 195. The process of aligning the target aircraft 180 within the capture trajectory 195 may include communications between the host aircraft 150 and the target aircraft 180 or between the pilots or automated flight systems thereof.

As shown in FIG. 5, the target aircraft 180 may use the imaging systems 191 to locate and approach the aft section 168. The target aircraft 180 may horizontally and/or vertically align the catch system 182 with the aft section 168. The catch system 182 of the target aircraft 180 may deploy the catch arms 186, 188 from a stowed configuration to an open configuration. The target aircraft 180 may be positioned such that the catch system 182 is located forward of the fitting on the aft section 168. The target and host aircraft may then move vertically relative to each other such that the distance between the towline and the catch system reduces. The vertical distance may be reduced until the towline extends through the catch arms 186, 188 of the target aircraft 180. The target aircraft 180 may increase altitude while the host aircraft 150 maintains altitude. In some embodiments, the target aircraft 180 may maintain altitude while the host aircraft 150 decreases altitude. In some embodiments, the target aircraft 180 may increase altitude while the host aircraft 150 decreases altitude.

As shown in FIG. 6, the catch arms 186, 188 may be actuated into the closed configuration to capture the aft section 168 of the towline 165 therebetween. The catch arms 186, 188 may be actuated when the catch system 182 is sufficiently horizontally and/or vertically close to the aft section 168 and aligned therewith. The catch arms 186, 188 in a closed configuration may prevent vertical separation of the towline 165 from the target aircraft 180. Because of the movement of the aft section 168 during flight, this maneuver may take several attempts to be successful. The closing of the catch arms 186, 188 about the towline 165 may secure the relative vertical and/or horizontal position of the aft section 168 relative to the target aircraft 180. In certain implementations, the catch arms 186, 188 may be closed to a lesser degree or to a greater degree to control the positioning of the aft section 168.

Figure 9:
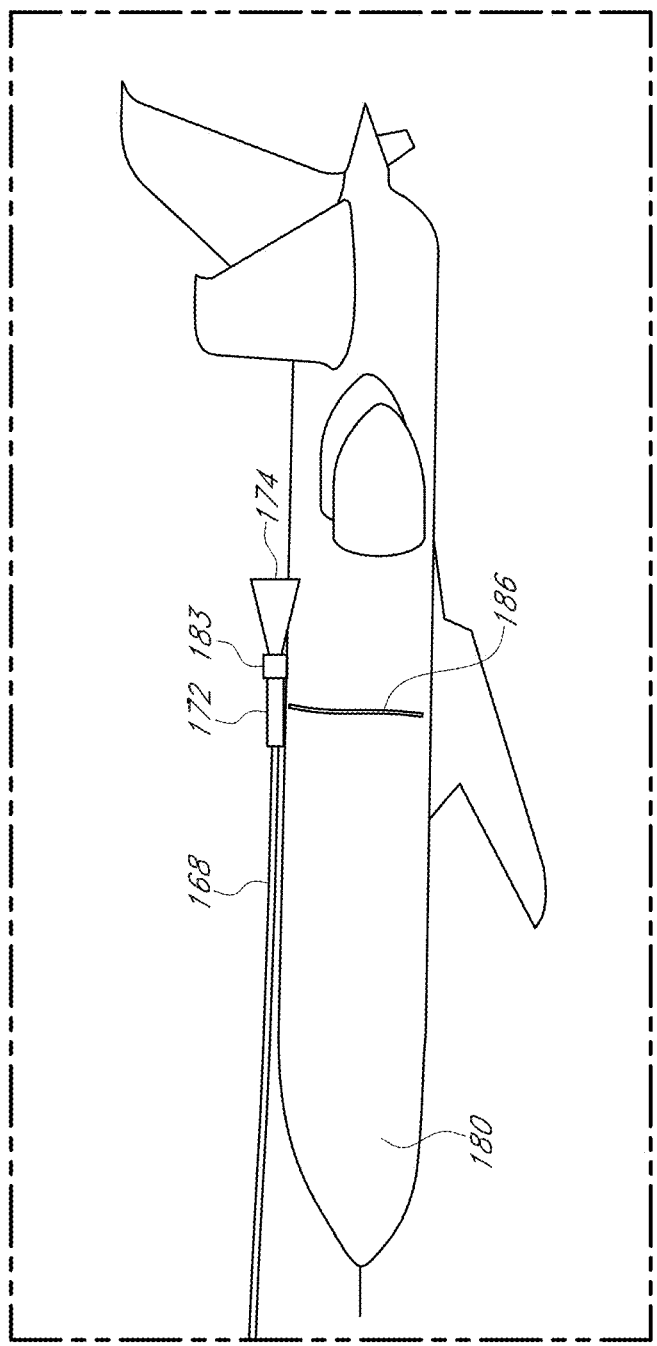
FIG. 9 is a side view of the target aircraft of FIG. 7 with the latch engaged with the fitting to secure the target aircraft to the towline.

As shown in FIGS. 7-9, after capturing the towline 165 between the catch arms 186, 188, the host aircraft 150 and the target aircraft 180 may execute a latching maneuver. The latch 183 may be deployed from the stowed configuration to the open configuration, either before or after the catch arms 186, 188 surround the towline. Latch members 184, 185 may be positioned on either side of the aft section 168 (e.g., by the closing of the catch arms 186, 188). The latch members 184, 185 may be moved into the closed configuration around the aft section 168 with the towline 165 securely located within the channel 187. Once the latch 183 is closed around the aft section 168, the catch arms 186, 188 may optionally be retracted to the stowed configuration.

The target aircraft 180 may also slow relative to the host aircraft 150. The slowing may move the target aircraft 180 rearward along the aft section 168 towards the fitting 172 of the aft section 168. The rearward movement of the target aircraft 180 along the aft section 168 may be executed after capture of the towline 165 by the latch 183. As the target aircraft 180 moves along the aft section 168, the fitting 172 may approach the latch 183 and the channel 187. Further slowing of the target aircraft 180 may place the fitting 172 within the latch 183. The fitting 172 and the channel 187 may be sized for a secure fit. The forward taper of the fitting 172 may facilitate entry of the fitting 172 into the channel 187.

As shown in FIG. 10, with the target aircraft 180 attached to the host aircraft 150 by the towline recovery system 160, the target aircraft 180 may enter a stable towed body flight mode. In the stable towed body flight mode, the target aircraft 180 may assist in maintaining its position relative to the host aircraft 150 (e.g., within a stable towed body trajectory 196) via its propulsion system and/or aerodynamic surfaces to control speed, pitch, roll, yaw, and/or or altitude. In the stable towed body mode, the target aircraft 180 may position itself beneath the host aircraft 150. In the stable towed body flight mode, the target aircraft 180 may utilize reduced or no propulsion. By positioning itself beneath the host aircraft 150 the target aircraft 180 may reduce turbulence and stress on the host aircraft 150 as it tows the target aircraft 180. The stable towed body flight mode may also straighten out the aft section 168 relative to the forward section 164.

After the target aircraft 180 is attached with the towline recovery system 160 and/or has maneuvered beneath the host aircraft 150 in the stable towed body flight mode, the target aircraft 180 may be retrieved by the host aircraft 150. The host aircraft 150 may retrieve the towline 165. Retrieval may include reeling of the towline 165 using the rotating drum of the reel system 162. During retrieval, the target aircraft 180 may maintain its position within a safe retrieval trajectory 198. The target aircraft 180 may actively position itself using its propulsion systems and/or flight surfaces, as described above.

As shown in FIGS. 12 and 13, once retrieved, the host aircraft 150 may secure the target aircraft 180. The host aircraft 150 may include one or more clamping mechanisms 199 for securely attaching the target aircraft 180. The clamping mechanisms 199 may be located adjacent to the towline recovery system 160 (e.g., beneath a wing of fuselage of the host aircraft 150). As the target aircraft 180 is retrieved on the towline 165, it may be brought into contact with the clamping mechanisms 199. Once recovered by the host aircraft 150 the target aircraft 180 may be transported under the propulsion of the host aircraft 150 to a desired destination. The coupling of the target aircraft 180 with the host aircraft 150 can be accomplished by one or more standardized military lugs.

The retrieval process of the target aircraft 180 by the host aircraft 150 may be hazardous to both aircraft. Collision between the host aircraft 150 and the target aircraft 180 may result in the loss of both aerial vehicles. Termination of the recovery procedure may be performed during recovery and/or after the target aircraft 180 is attached with the towline recovery system 160. Accordingly, the towline recovery system 160 may include a decoupling mechanism, such as a portion of the towline that may be severed, as further described herein, for example with respect to FIG. 15. The decoupling mechanism may include a blade that severs a target portion of the towline 165. Alternatively, the decoupling mechanism may include a releasable clamp for a portion of the towline recovery system 160, such as the reel system 162 of the towline 165. The catch system 182 may also decouple from the towline 165 in the event of an emergency. After decoupling, the target aircraft 180 may resume powered flight independent of the host aircraft 150. The towline may exit through the catch system 182, for example due to drag acting on the aft section and pulling the line rearward.

Figure 14:
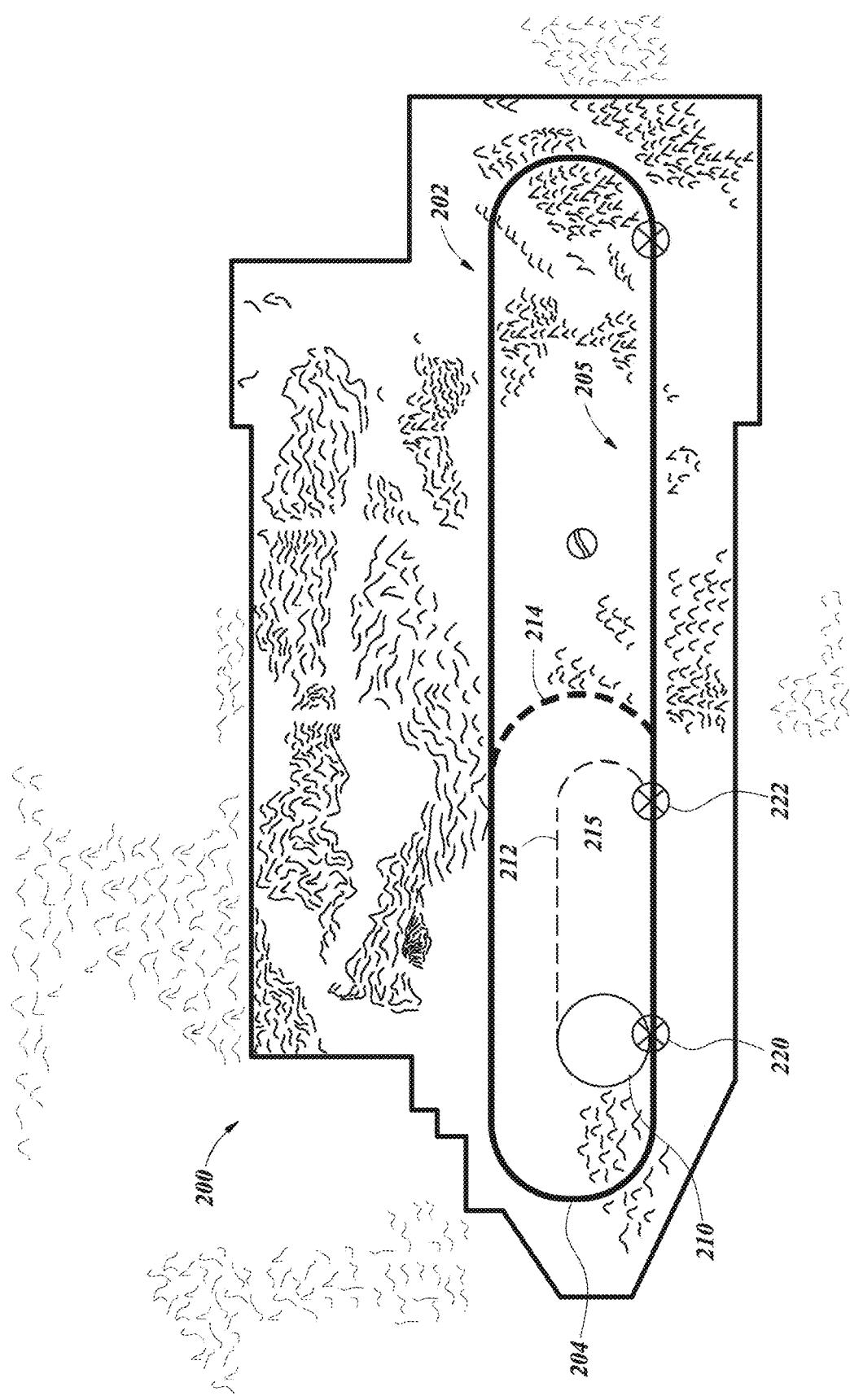
FIG. 14 is a schematic showing embodiments of various flight paths of the target and host aircraft during an in-flight recovery of the target aircraft by the host aircraft.

FIG. 14 shows an embodiment of a coordinated flight plan 200 for the target aircraft 180 and the host aircraft 150 for the recovery maneuver. The host aircraft 150 may follow a route 202. The route 202 may include a first turn 204 into a straight-leg portion 205. The towline recovery system 160 may be deployed either before or after entry into the straight-leg portion 205. The target aircraft 180 may follow a route 210. The route 210 may include a first turn 214 into a straight-leg portion 215. The straight-leg portions 205, 215 may be aligned. The route 202 may intersect with the route 210 at a rendezvous point 220. At the rendezvous point 220 the target aircraft 180 may begin to align itself underneath and rearward of the host aircraft 150. The target aircraft 180 is generally aligned with the host aircraft 150 (e.g., within the capture trajectory 195) by a pre-contact position 222. If the target aircraft 180 fails to align with the host aircraft 150 by the pre-contact position 222, the aircraft may follow recovery paths 211, 212 to make another attempt.

As the target aircraft 180 and host aircraft 150 proceed along the straight-legs 205, 215, the target aircraft 180 may engage with the towline recovery system 160 of the host aircraft 150, as described above. In some of these implementations, the straight-leg portion 205 may be approximately 25 to 35 miles long, or shorter or longer distances. The distance should provide sufficient time (e.g., approximately 10 to 20 minutes, or less) to execute the recovery maneuver. The routes 202, 210 may also include a recovery termination point 224. The recovery termination point 224 may be a location at which if there has not been a successful connection between the host aircraft 150 and the target aircraft 180, then the recovery maneuver attempt is aborted. The aircraft 150, 180 may follow along the respective routes 202, 210 to make another recovery attempt.

Figure 15:
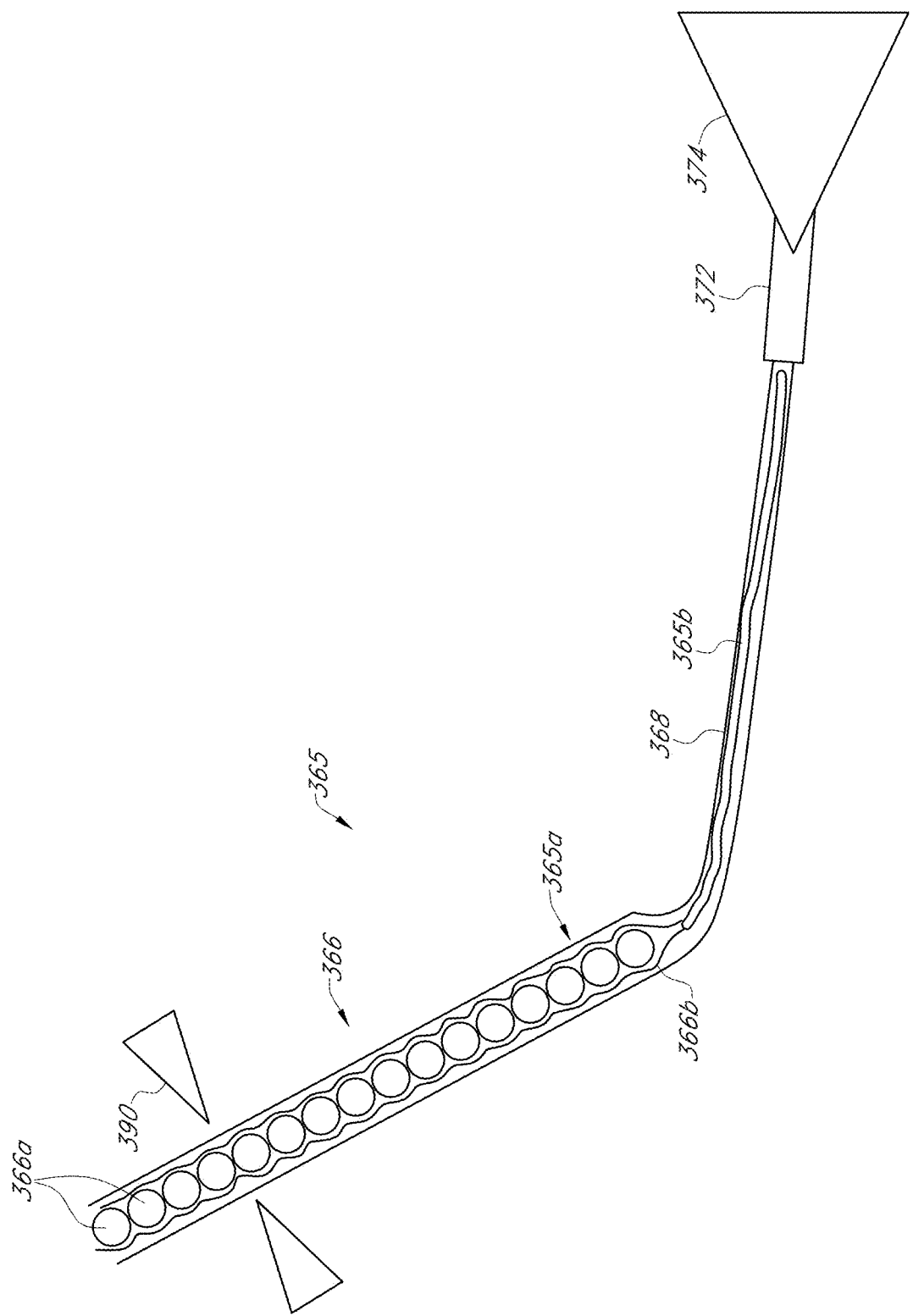
FIG. 15 is a partial side cross-section view of another embodiment of an end of a towline having a weighted section and fitting.

FIG. 15 shows an embodiment of part of a towline 365. The towline 365 may be utilized in the towline recovery system 160 as the towline 165, such as the aft section and weighted section. The towline 365 may include a weighted section 366 and an aft section 368. The aft section 368 may connect with a fitting 372 and/or a drogue 374. The towline 365 may comprise a sleeve 365a, shown in cross-section for clarity. The sleeve 365a may contain a hollow interior. The sleeve 365a may be continuous from the weighted section 366 to the aft section 368. The towline 365 may include a weighted section 366. The weighted section 366 may comprise a plurality of discrete weights 366a. The weights 366a may be ball-shaped weights. The weights 366a made of a metallic material or other suitable dense material. The weights 366a may also be other non-spherical shapes such as cylinders or amorphous shapes.

The weighted section 366 may include an internal wrap 366b, shown in cross-section for clarity. The internal wrap 366b may encase the weights 366a. In one embodiment the internal wrap 366b may be a flexible polyolefin tubing. The internal wrap 366b may be heat shrunk around the weights 366a. The internal wrap 366b may prevent undesirable movement between each of the discrete weights 366a. The weighted section 366 may be embedded within the sleeve 365a. The weighted section 366 may be contained within the forward section 364.

The aft section 368 may include a core member 365b. The core member 365b may extend from the weighted section 366 to the fitting 372. The core member 365b may be formed of a lightweight material that may fill the sleeve 365a. The core member 365b may stiffen the aft section 368. The core member 365b may thereby improve the ability of the catch system 182 (either the latch 183 and/or the catch arms 186, 188) to engage with the aft section 368. The core member 365b may facilitate guiding the fitting 370 into the latch 183.

The towline 365 may also be equipped with a decoupling mechanism 390. The decoupling mechanism 390 may be mounted on the reel system 162 of the recovery system 160. The decoupling mechanism 390 may slice into the sleeve 365a to sever the towline 365. The decoupling mechanism 390 may cut through the weighted section 366 (e.g., between the discrete weights 366a). The decoupling mechanism 390 may be used to abort a recovery procedure after the target aircraft 180 is already attached to the towline 365, or at other times, as described herein.

Figure 16:
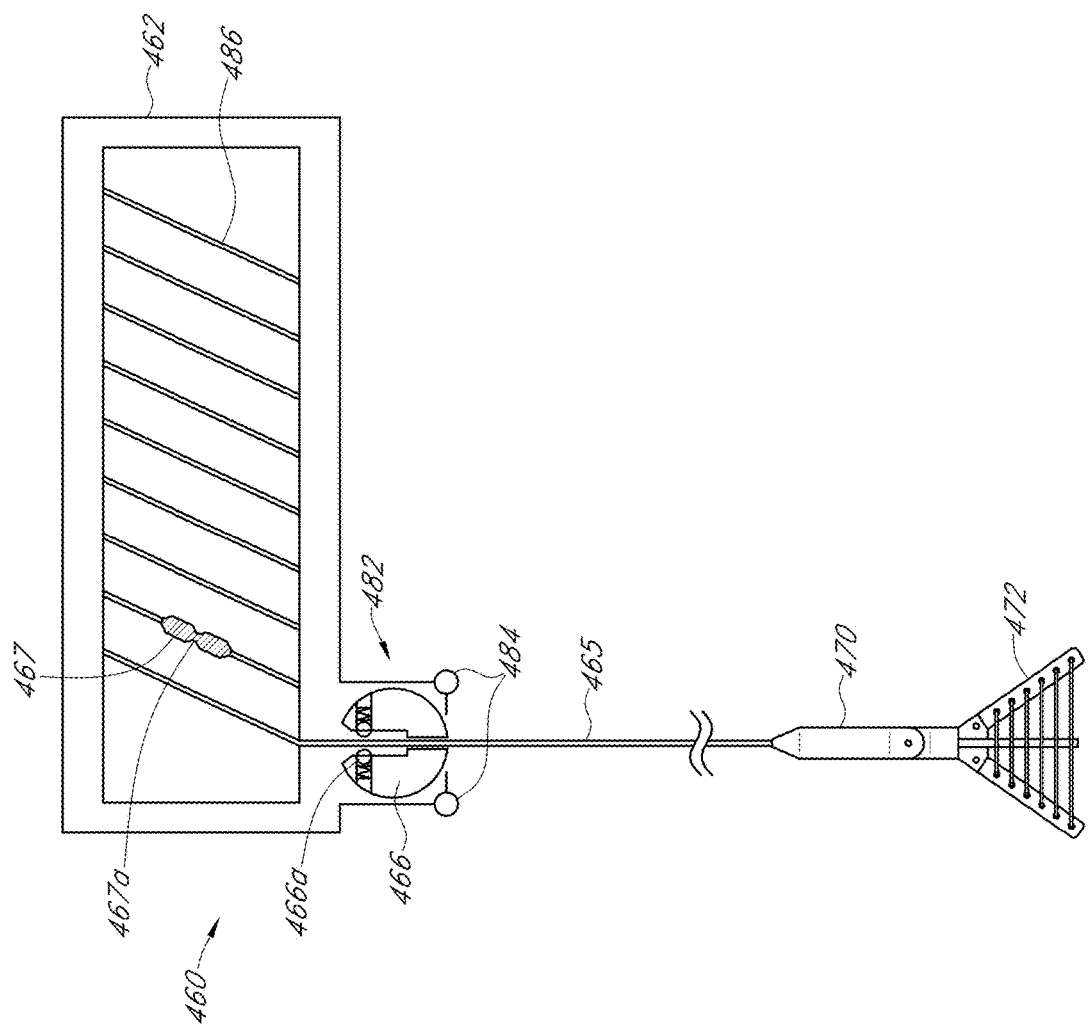
FIGS. 16-18 are schematics of an embodiment of a towline recovery system shown in various configurations, and that may be used with the various aircraft recovery systems described herein.
Figure 17:
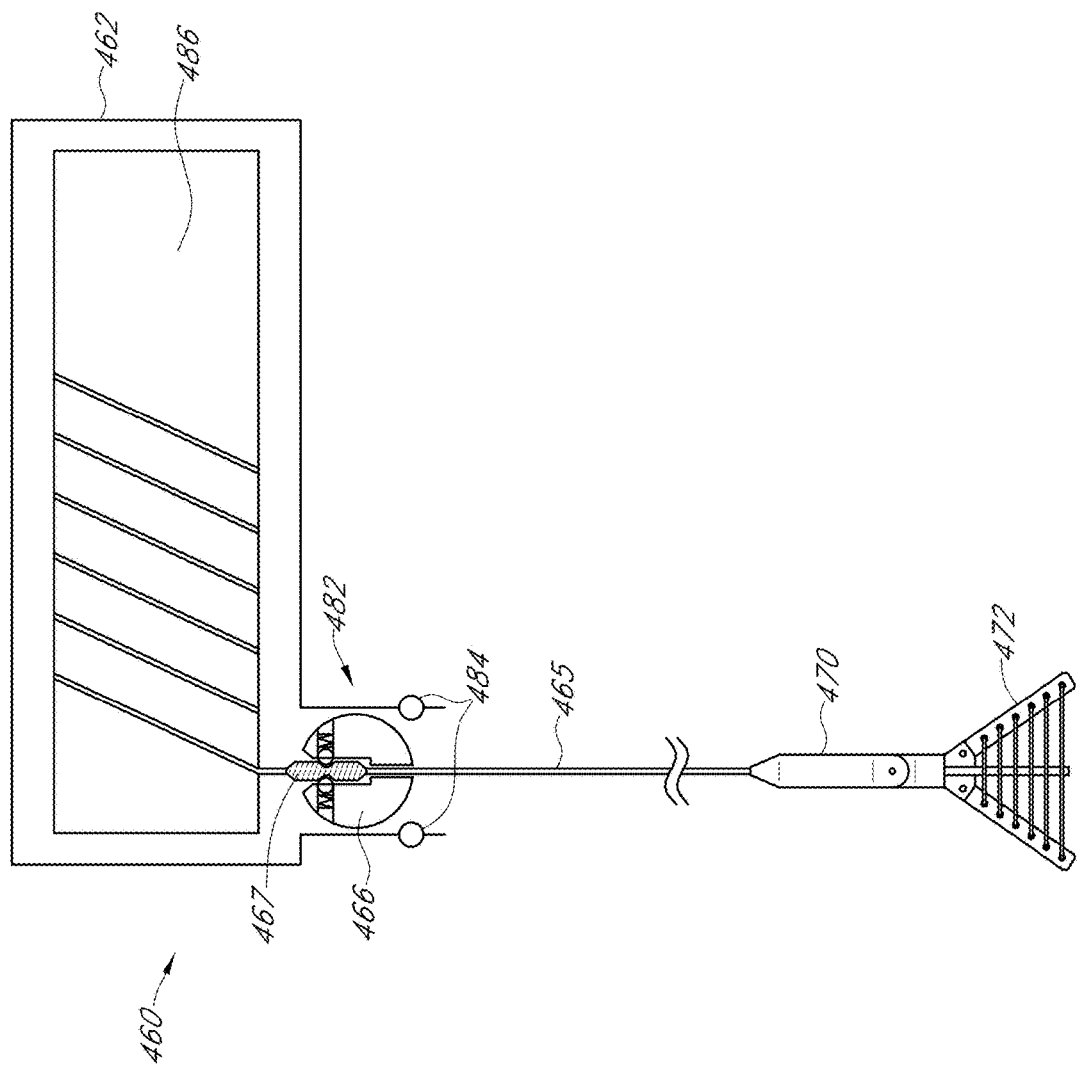
Figure 18:
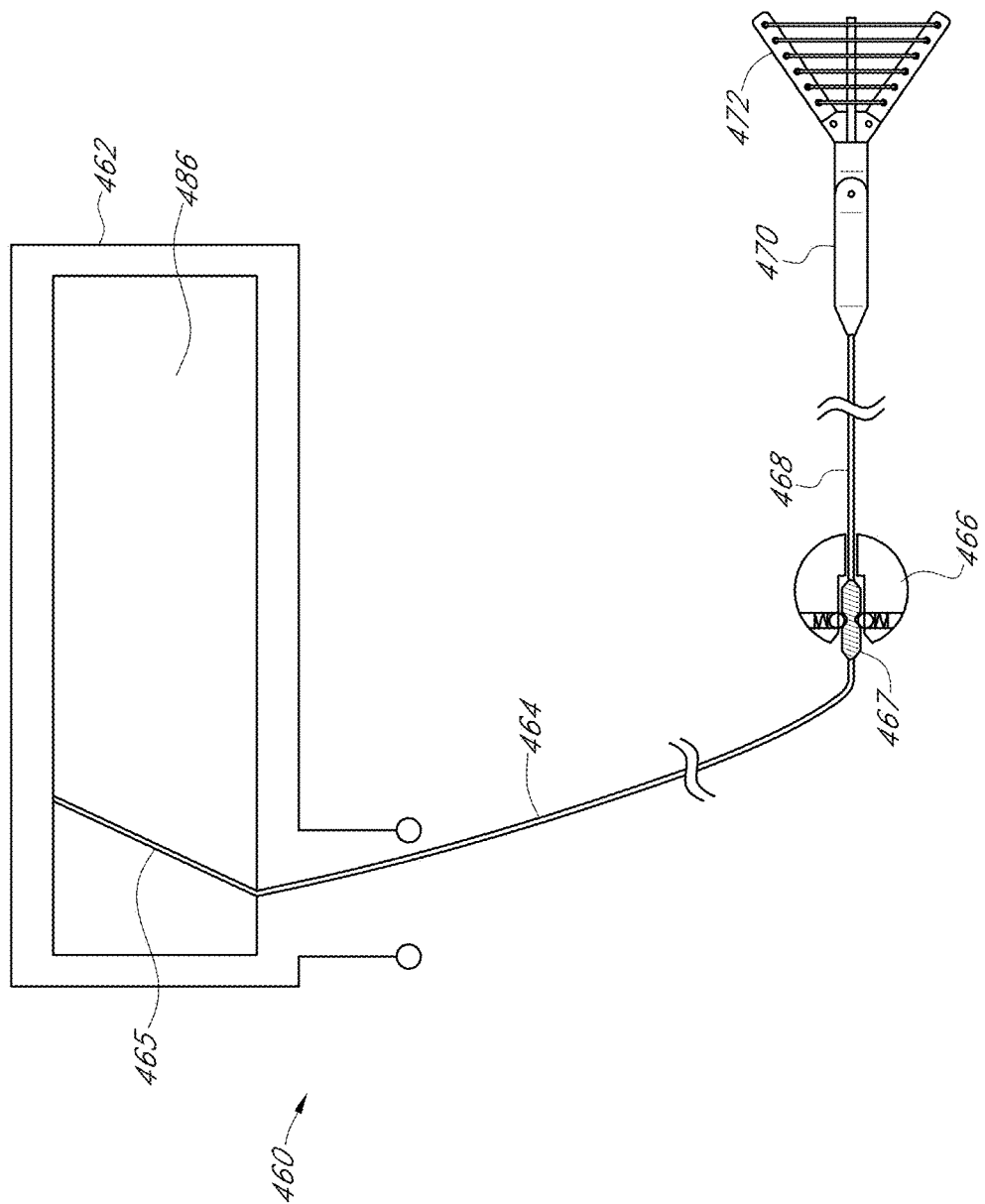

FIGS. 16-18 show another embodiment of a towline recovery system 460 that may be used in conjunction with the host aircraft 150. The towline recovery system 460 may be used as any of the towline recovery systems described herein, such as those described with respect to FIGS. 1A-15. The recovery system 460 may include a reel system 462. The reel system 462 may include a drum 486 for storing, retrieving and/or putting out a towline 465. The towline 465 may be wrapped over the drum 486. The end of the towline 465 may include a fitting 470 and/or a drogue 472. The fitting 470 may be attached with the drogue 472.

The reel system 462 may include an opening 482 in a housing thereof. The opening 482 may include one or more doors 484. The doors 484 may contain a weight 466 within the opening 482. The weight 466 may be attached with the towline 465. The towline 465 may pass through an aperture within the weight 466. The doors 484 of the opening 482 may prevent the weight 466 from moving out as the towline 465 is payed out by the drum 486.

The towline 465 may include a locator 467. The locator 467 may be crimped on a portion of the towline 465. The locator 467 may include a circumferential recess 467a. The locator 467 may be generally shaped as an elongated member. The locator 467 may be fixed with and paid out along with the towline 465. As the towline 465 is paid out, the locator 467 may encounter the weight 466. The locator 467 may engage with the weight 466. For example, the weight 466 may include an internal aperture sized to at least partially receive the locator 467.

In certain implementations the weight 466 may include an engagement mechanism 466a. The engagement mechanism 466a for example may be a spring-loaded ball bearing, a recess, other suitable feature, or combination thereof, for engaging with the circumferential recess 467a on the locator 467. When the locator 467 is located within the aperture of the weight 466, the engagement mechanism 466a may be engaged within the circumferential recess 467a.

When the locator 467 engages with the weight 466, the doors 484 may be actuated to release the weight 466. The weight 466 may be engaged with the locator 467 when the doors 484 are opened. Alternatively, the force of the towline 465 on the opening 482, due to the locator 467 pushing downward on the weight 466 due to pull from the towline 465, may be great enough to open the doors 484. After releasing the weight 466, the towline 465 may continue to be paid out and the recovery method for the target aircraft 180 may be performed as described. The locator 467 and weight 466 may separate the towline 465 into a forward section 464 and an aft section 468, as described herein, for example with respect to FIGS. 1-13. The location of the locator 467 on the towline 465 may be adjusted according to the desired lengths of the forward section 464 and the aft section 468.

The towline 465 may be retracted by the reel system 462 in the reverse direction. The fitting 470 and the drogue 472 may be retracted towards the reel system 462 with or without the target aircraft 180 attached. The reel system 462 may rotate the drum 486 to retrieve the towline 465. The weight 466 and the locator 467 may be drawn into the opening 482 of the housing of the reel system 462. The locator 467 may be removed from the weight 466 by the force of the rotation of the drum 486. The weight 466 may be trapped within the opening 482 of the housing of the reel system 462. Thus the weight 466 may be securely stowed on the host aircraft 150 and optionally redeployed.

Figure 19A:
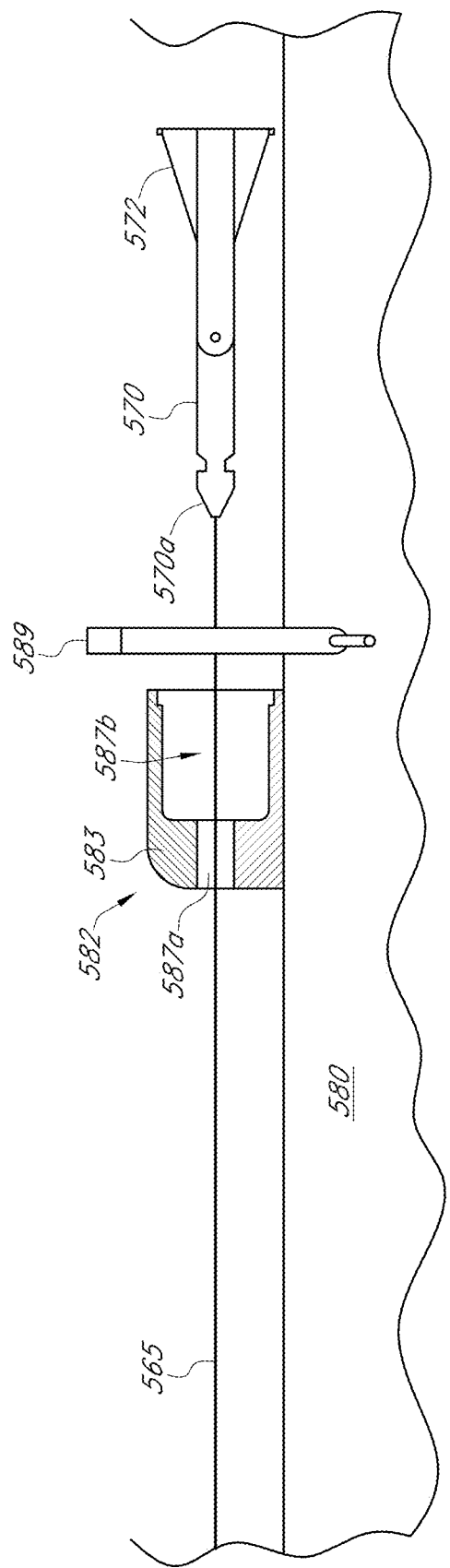
FIGS. 19A-19B are side views of an embodiment of a towline fitting shown, respectively, aligned and engaged with a catch, and that may be used with the various aircraft recovery systems described herein.
Figure 19B:
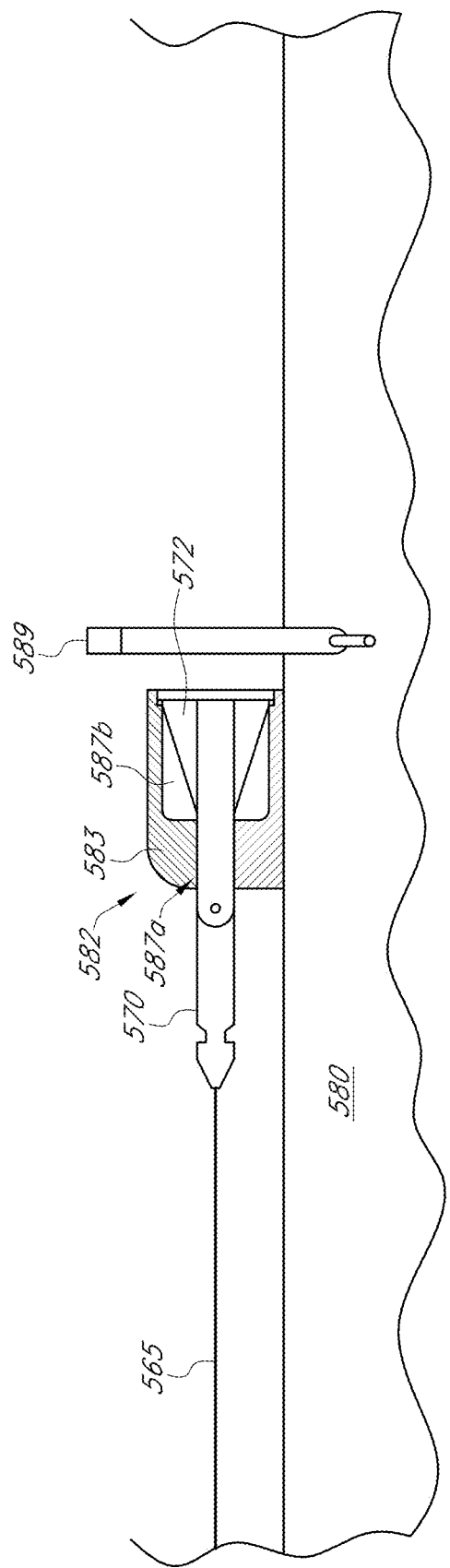
Figure 20A:
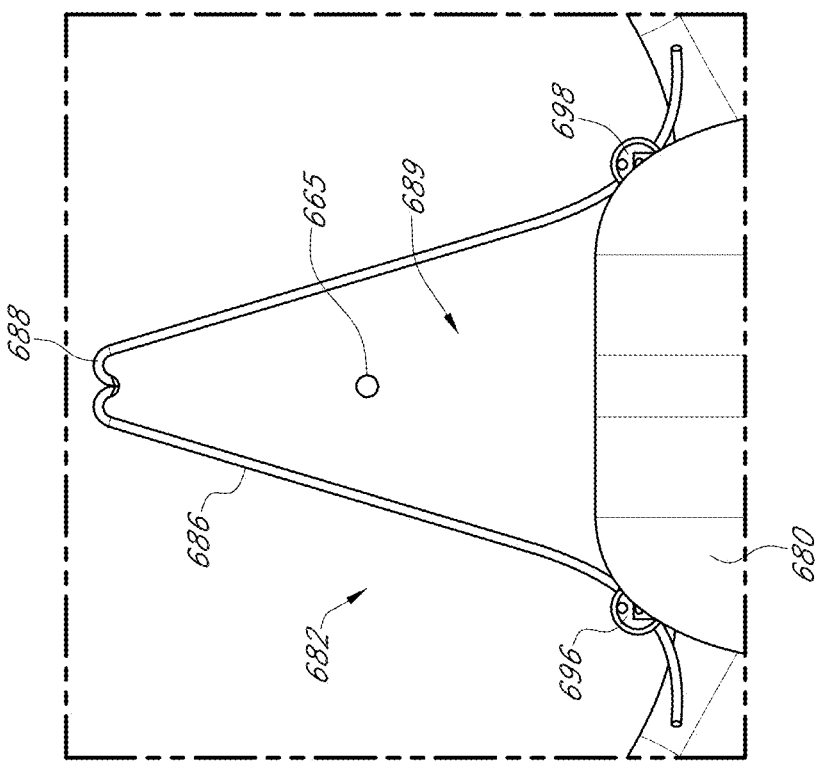
FIGS. 20A-20B are end views of embodiments of a pair of catch arms and a towline shown in various configurations, and that may be used with the various aircraft recovery systems described herein.
Figure 20B:
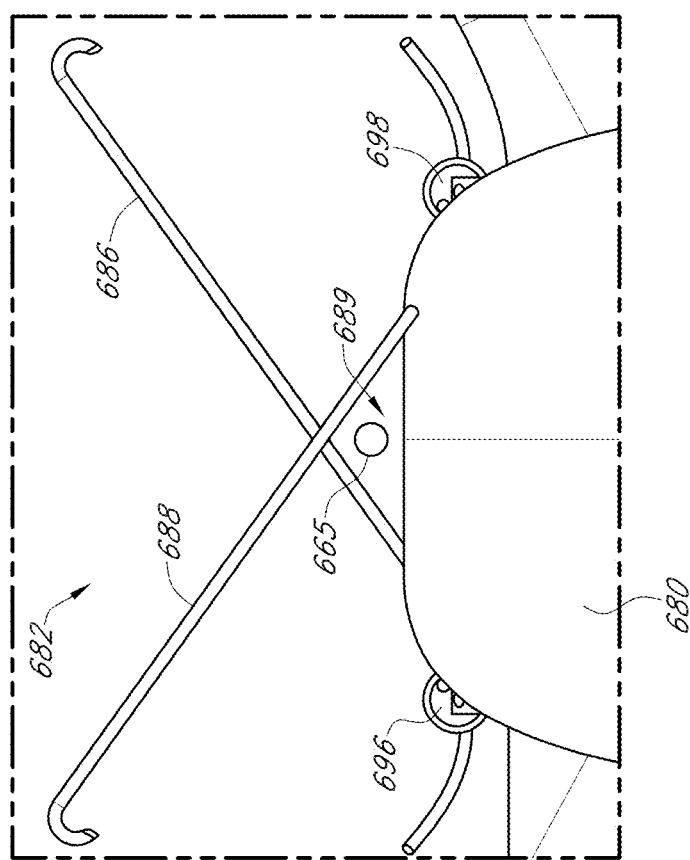
Figure 21A:
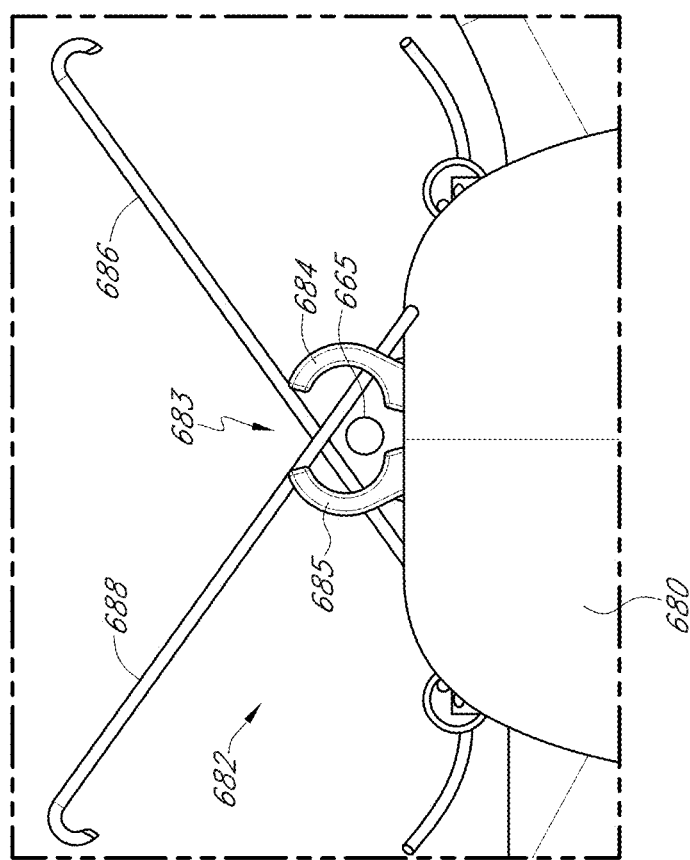
FIGS. 21A-21B are end views of another embodiment of a pair of catch arms and a towline shown in various configurations, and that may be used with the various aircraft recovery systems described herein.
Figure 21B:
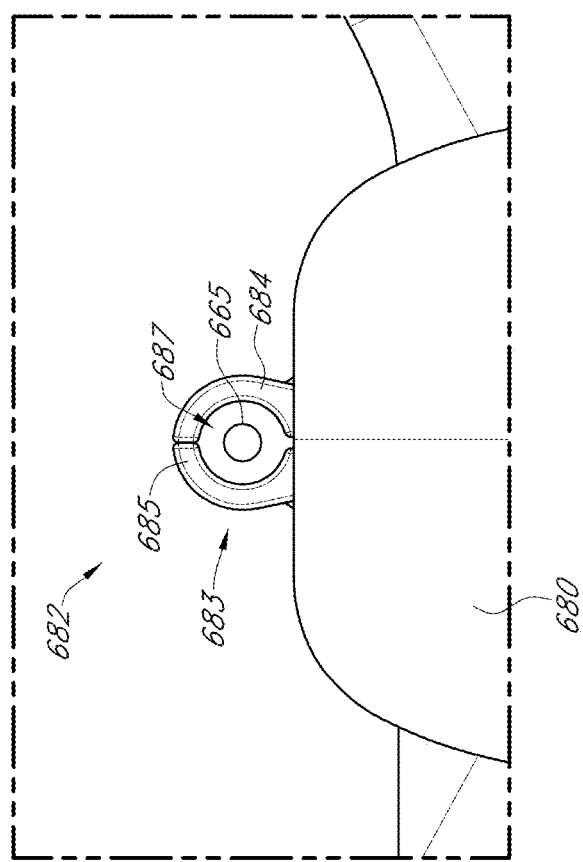

FIGS. 19A and 19B show a cross section of an embodiment of a catch system 582 that may be on the various target aircraft described herein. The catch system 582 may include a latch 583. The latch 583 may include a channel 587a and a receiving space 587b. The channel 587a may receive and enclose around a towline 565. The latch 583 may include one or more latch members that are movable with respect to each other to capture the towline 565. The catch system 582 may include a pair of catch arms 589. The catch arms 589 may capture the towline 565 and guide the towline 565 into the latch mechanism 583. The catch arms 589 may also guide the fitting 570 into the latch 583.

As shown in FIG. 19B the fitting 570 may fit within the channel 587a. The drogue 572 may fit within the receiving space 587b of the latch mechanism 583. Thus, the fitting 570 may be securely retained by the latch mechanism 583 for retrieving the target aircraft 580. The catch arms 589 may be retracted after the towline 565 is within the channel 587a. The fitting 570 may include a tapered end 570a. The tapered end 570a may aligning the fitting 570 within the channel 587a.

FIGS. 20A-21B show a sequence of capturing a towline 665 using a catch system 682. The catch system 682 may be like the catch system 182 in the towline recovery system 160. The catch system 682 may include first and second catch arms 686, 688. The first and second catch arms 686, 688 may include elongate members and/or hooks. The first arm 686 may include a pivotable location 696, such as a hinge. The first and second catch arms 686, 688 may be pivotable with respect to the target aircraft 680. The first arm 686 may be attached with a servo motor or other actuator for rotating the first arm 686 about the pivot location 696. The second arm 688 may include a pivot location 698 about which the second arm 688 may be controlled to pivot by a servo motor or other actuator. An actuator (e.g., servo motor) may deploy the first and second arms 686, 688 from a stowed configuration (FIG. 21B), to an open configuration, to a closed configuration (FIGS. 20A-21A).

The first and second catch arm 686, 688 may be deployed to enclose a towline 665 within a capture space 689. In the closed configuration, the first and second arms 686, 688 are crossed. The closed configuration may capture the towline 665 in the capture space 686. The timing of the movement of the catch arm 686, 688 to the closed configuration may be used to capture the towline 665. The capture space 686 may be variable to more or less precisely control the position of the towline 665. Continued rotation of the first and second catch arms 686, 688 may further make the capture space 689 smaller to locate the towline 665 relative to the target aircraft 680. The hooks on the end may assist in preventing the loss of the towline 665 from the capture space 689.

The capture space 689 formed by the first and second catch arm 686, 688 may align the towline 665 with a latch mechanism 683. The latch mechanism 683 may be deployable from a stowed configuration within the catch system 682. In the stowed configuration, the latch mechanism 683 may be at least partially or fully within the body of the target aircraft 680. In the deployed configuration, as shown in FIG.

21A, the latch mechanism 683 may extend into the capture space 689. The catch arms 686, 688 may guide the towline 665 to between a pair of latch members 684, 685 of the latch mechanism 683. The latch members 684, 685 may include two generally hemispherical portions that may be moved with respect to each other to enclose a channel 687. The first and second latch members 684, 685 may be deployed in an open configuration and then closed around the towline 665. The towline 665 may be enclosed within the channel 687 formed by the two hemispherical portions of the first and second latch members 684, 685. Once the towline 665 is captured by the latch mechanism 683, the catch arms 688, 686 may be returned to the stowed configuration (e.g., alongside a body portion of the target aircraft 680 or partially therewithin). The stowing may take place by reversing the direction of pivoting about the first and second pivot locations 696, 698 using the actuators. After the towline 665 is secured within the latch mechanism 683, the target aircraft may engage in a latching maneuver to allow a fitting engage with the latch mechanism 683.

Figure 22A:
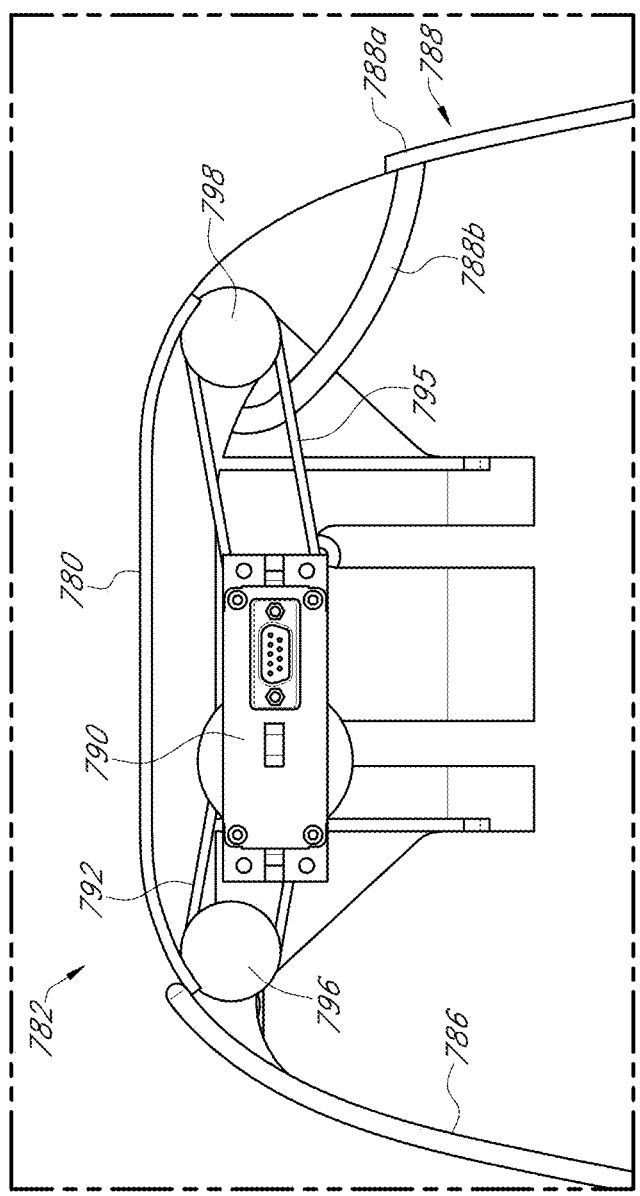
FIGS. 22A-22B are partial cross-section end views of another embodiment of a pair of catch arms and a towline shown in various configurations, and that may be used with the various aircraft recovery systems described herein.
Figure 22B:
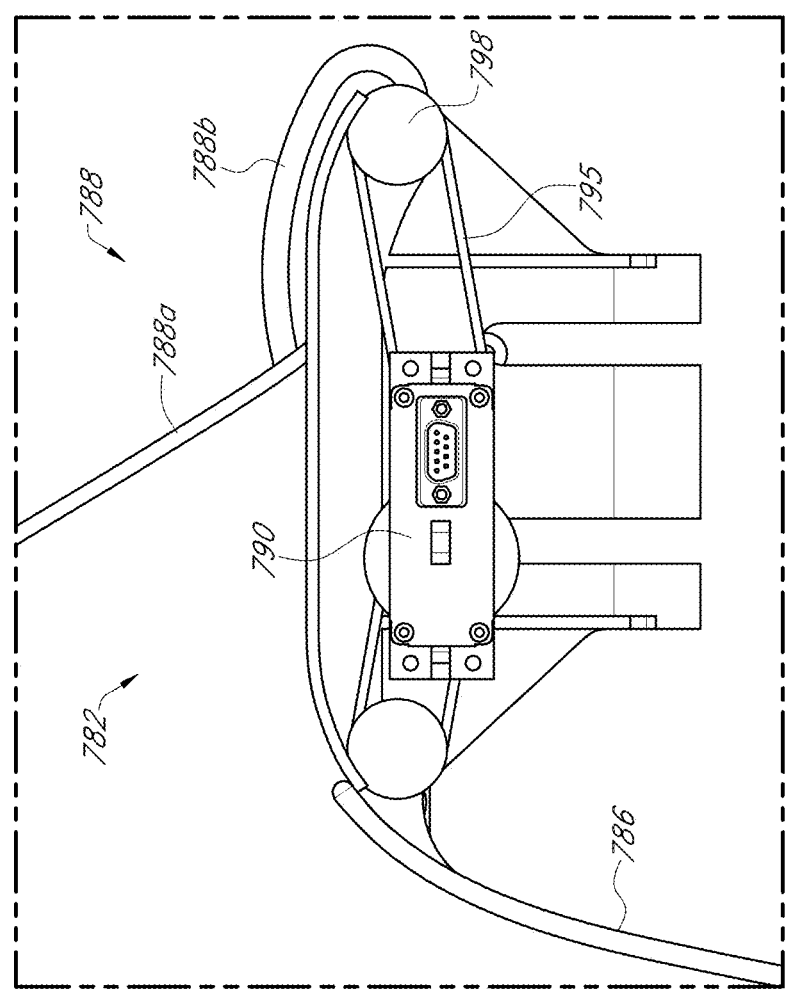

FIGS. 22A and 22B show another embodiment of a catch system 782 that may be assembled on a target aircraft 780. The target aircraft 780 is partially shown for clarity. The catch system 782 may include a first catch arm 786 and a second catch arm 788. The first catch arm 786 may be pivotable about a pivot location 796, such as a hinge. The first catch arm 786 may be attached with a servo 790 through a transmission 792. The transmission 792 may be a belt, chain, geardrive, cam or other rotation transmission mechanism. Rotation of the output shaft of the servo 790 may rotate the transmission 792 to cause rotation of the first catch arm 786. Similarly, the second catch arm 788 it may be attached with and pivoted about a pivot location 798 through a transmission 795 that attaches with the servo 790 or alternatively with a second servo motor (not shown).

The second arm 788 may include a first section 788*a* and a second section 788*b*. The first section 788*a* may be substantially straight and the second section 788*b* may be substantially curved. The curvature may generally match a portion of the top surface of the catch system 782 or the target aircraft 780. The first arm 786 may have the same structure as the second arm 788. The first section 788*a* may configured to cross with the straight portion of the first arm 786 to capture a towline (not shown).

FIGS. 23A-24B show another embodiment of a catch system 882. The catch system 882 may be coupled with a target aircraft 880. The catch system 882 may include a first arm 886 and a second arm 888. The first arm 886 may include an outer portion 886*a* and an inner portion 886*b*. The outer portion 886*a* may be generally at a right angle with respect to the inner portion 886*b*. The shape of the first arm 886 may generally correspond to that of a body of the target aircraft 880. This may enable the first arm 886 to be stowed potentially within or along the side of the body of the target aircraft 880. This may reduce the risk of damage due to the first arm 886. The first arm 886 may be rotatable about a pivot location 896. The pivoting may be controlled by a servo or other actuator. The second arm 888 may include the same or similar structure such as the first arm 886, for example an outer portion 888*a*, an inner portion 888*b* and/or a pivot location 898.

Figure 23A:
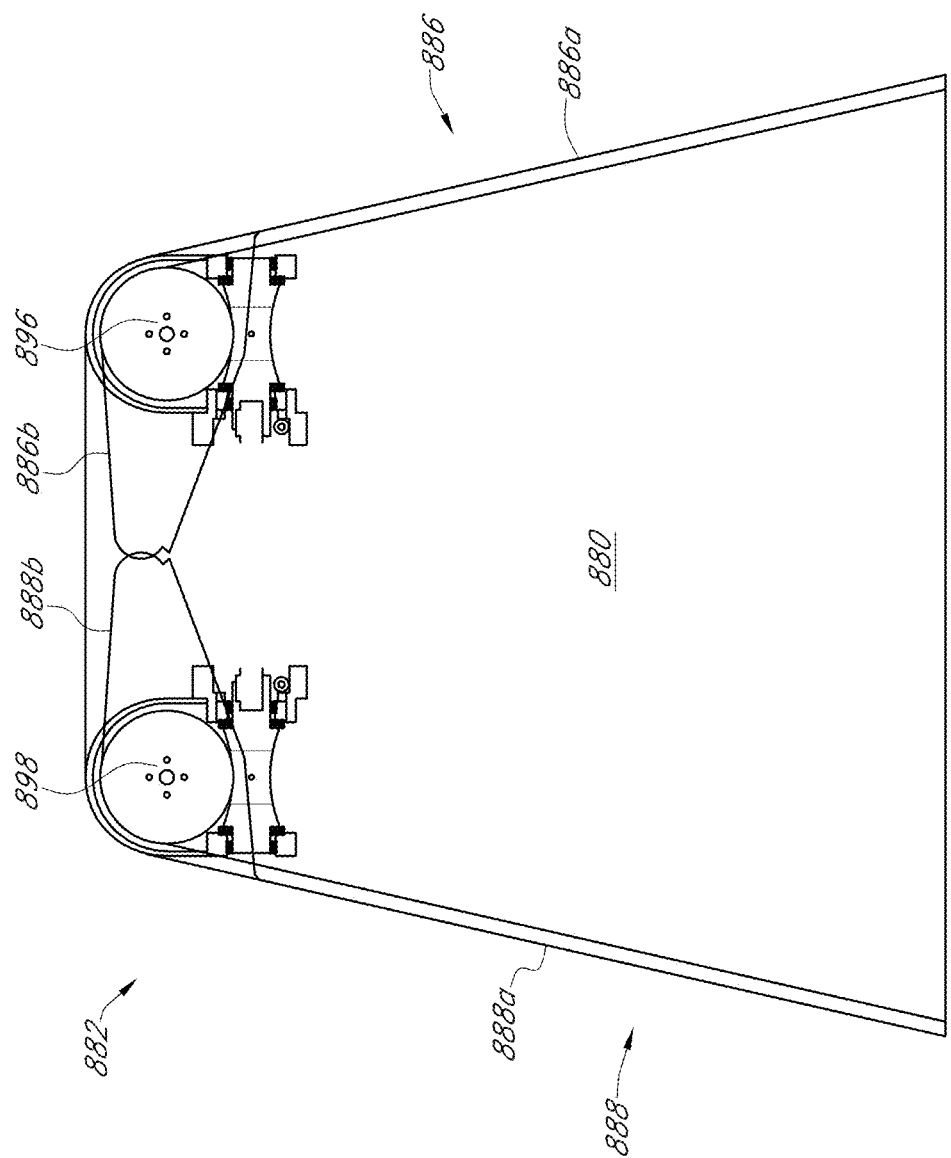
FIGS. 23A-23D are partial cross-section end views of another embodiment of a pair of catch arms and a towline with the arms shown in various opening configurations, and that may be used with the various aircraft recovery systems described herein.
Figure 23B:
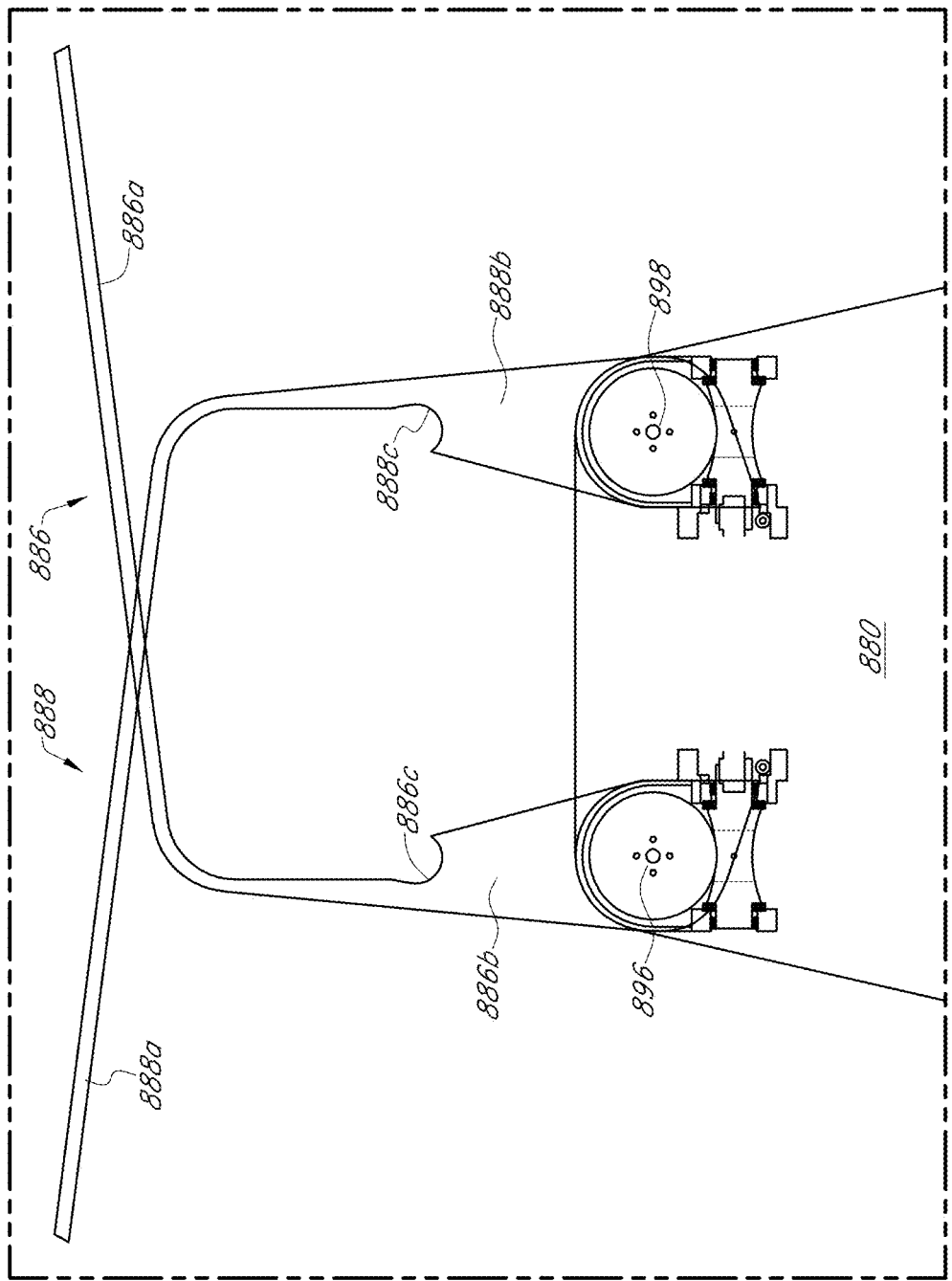
Figure 23C:
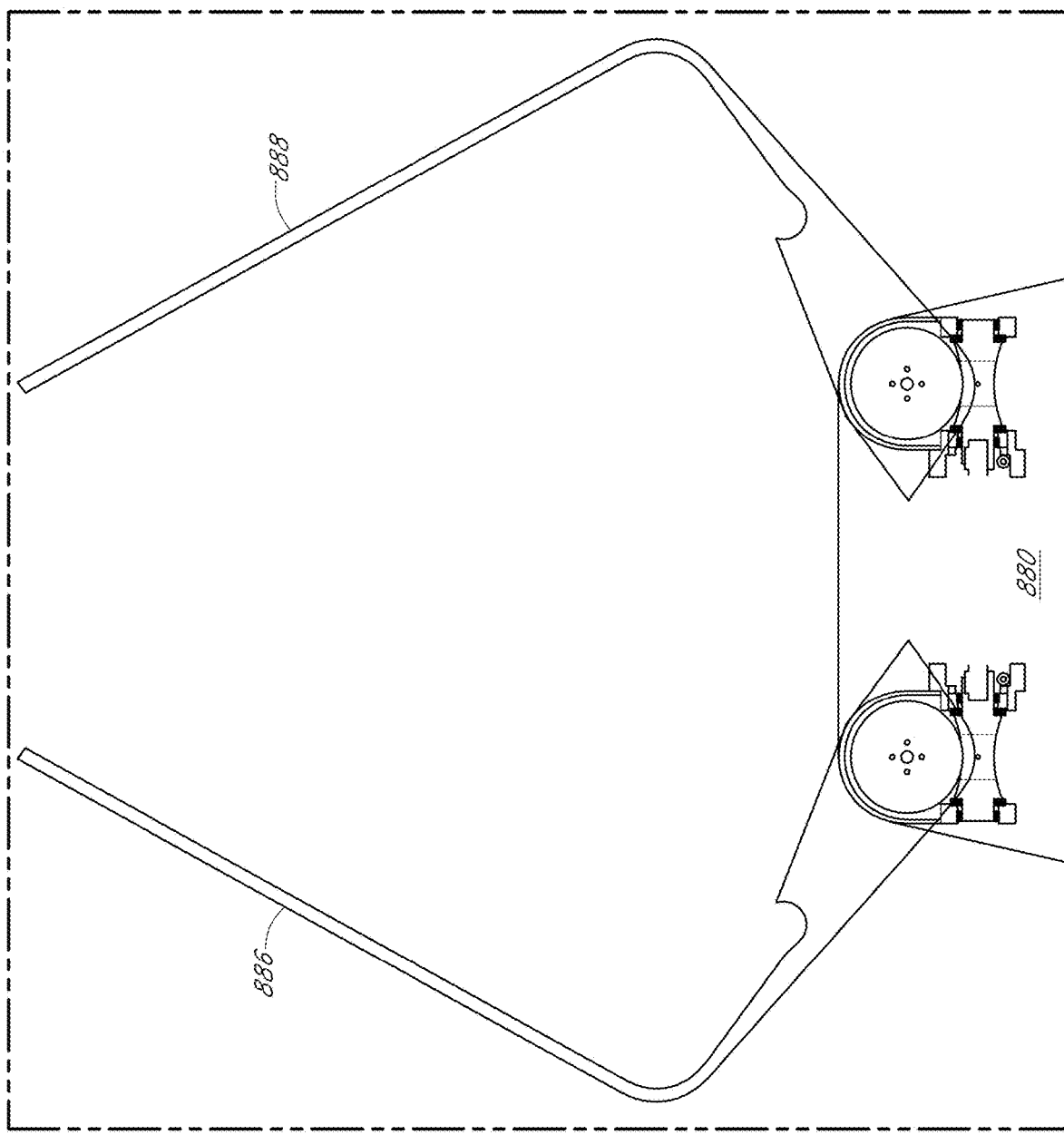
Figure 23D:
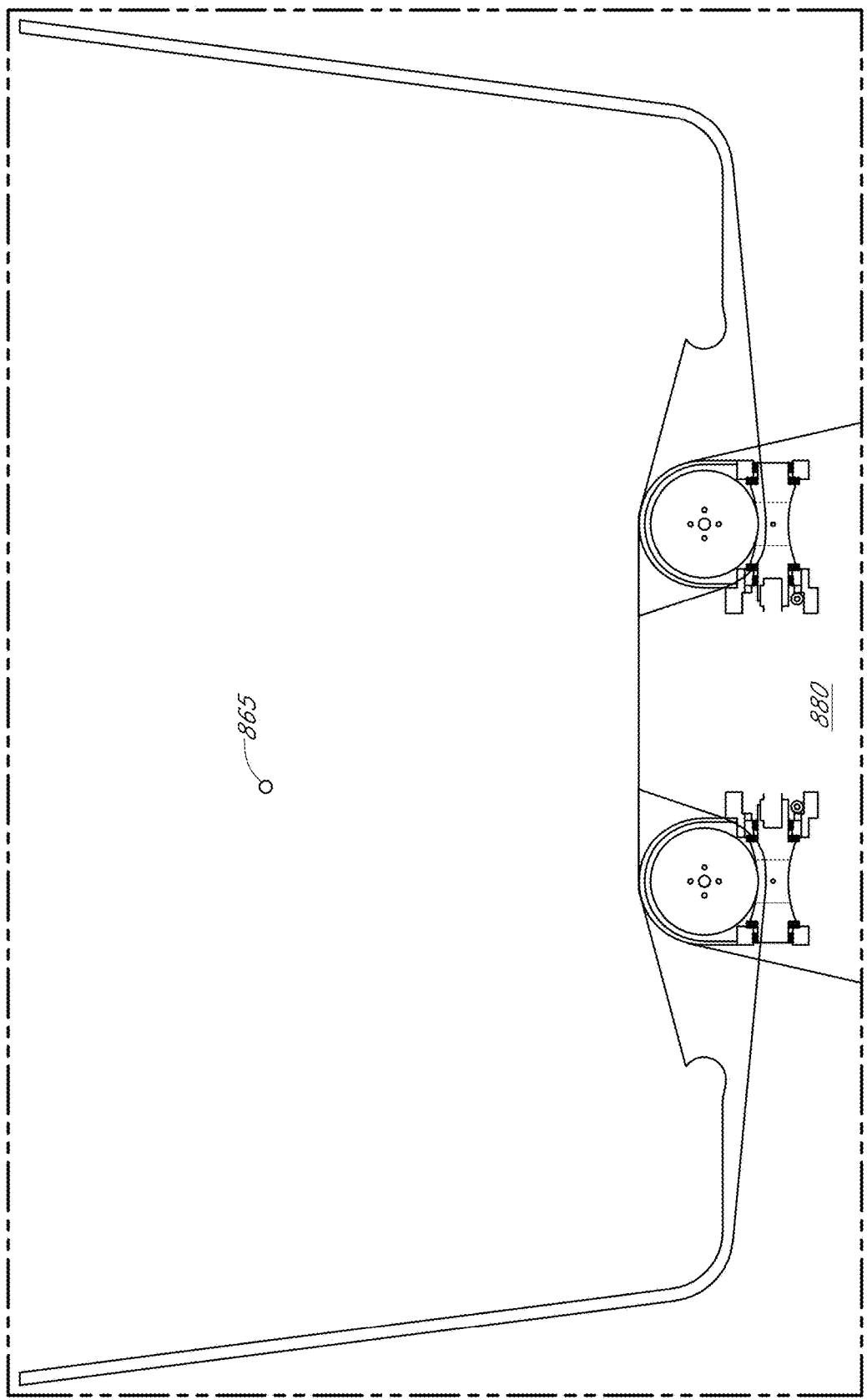
Figure 24A:
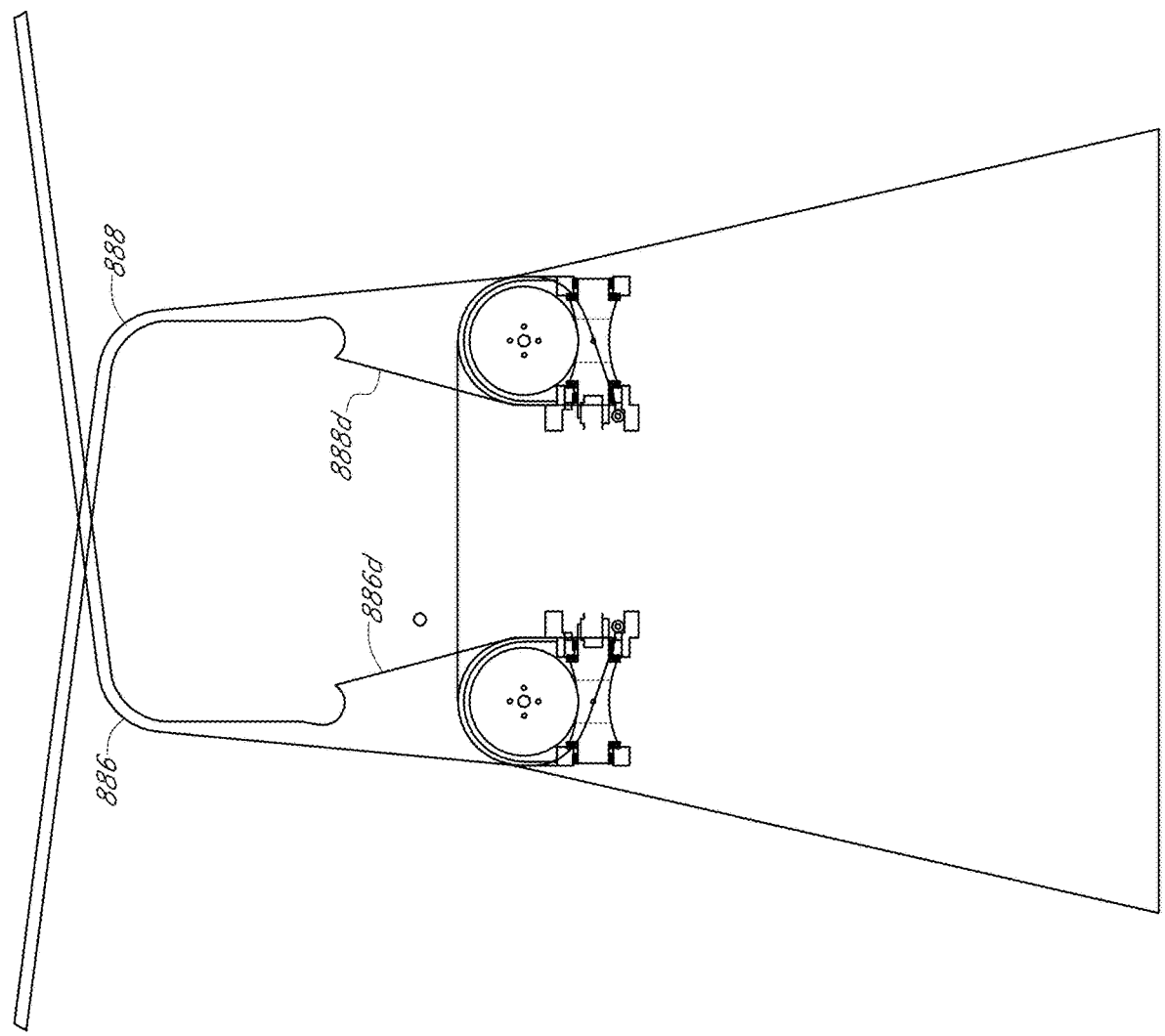
FIGS. 24A-24B are partial cross-section end views of the pair of catch arms and towline with the arms shown in various closing configurations.
Figure 24B:
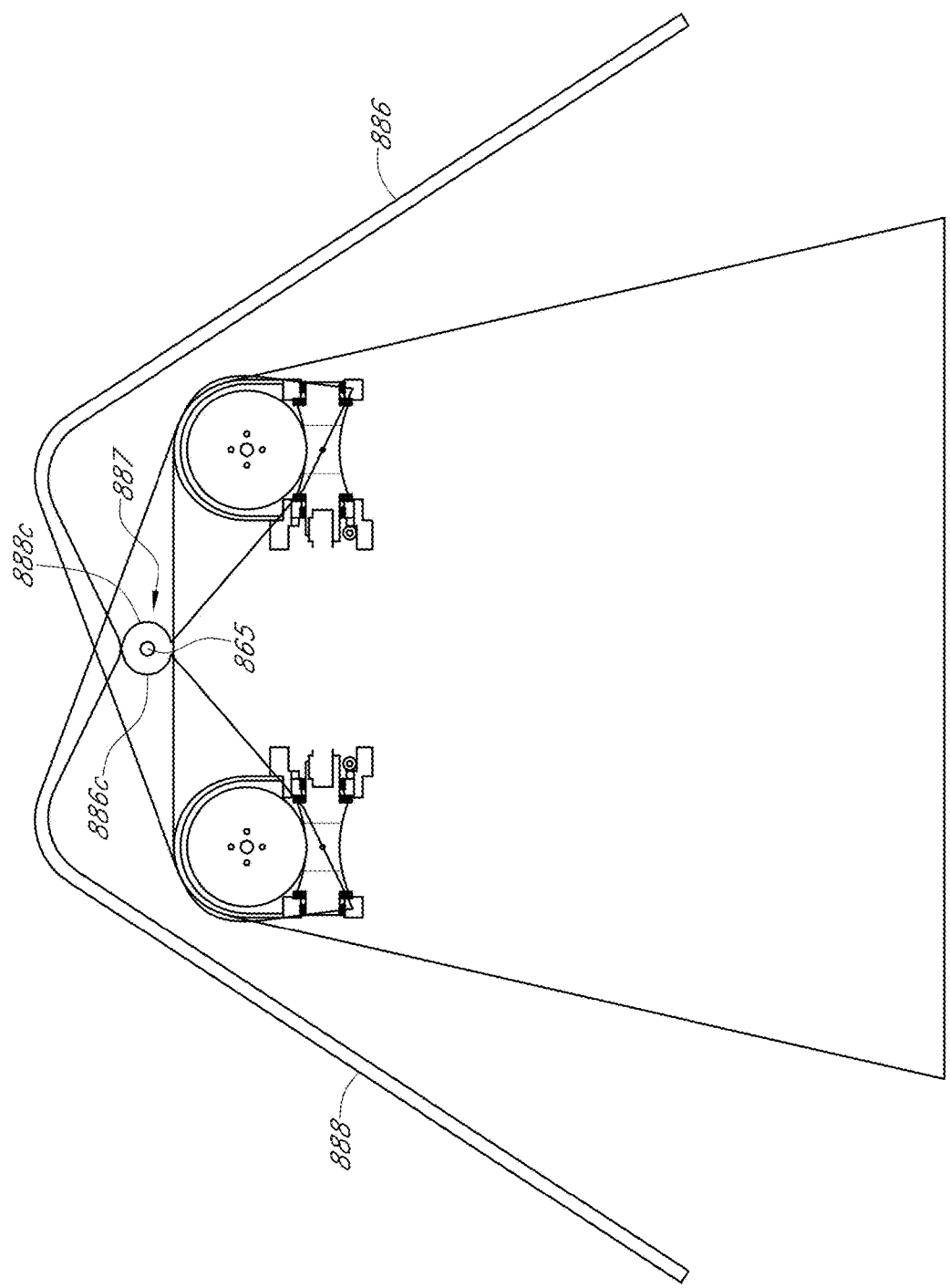

As shown in FIG. 23B, the first and second arms 886, 888 may be deployed by rotation about the respective pivot locations 896, 898. As the arms 886, 888 are deployed, they may move from an initial crossed position into an open configuration as illustrated in FIGS. 23A to 23D. As the first and second arms 886, 888 uncross they may open to receive a towline 865 of a towline recovery system, such as the towline recovery system 160. Once the towline 865 is between the outer portions 886*a*, 888*a* the arms 886, 888 may be closed to enclose a capture space therebetween. Continued rotation of the catch arms 886, 888 may make the capture space smaller to guide the towline 865 into a smaller area. In certain implementations, the inner portions of one or more of the first and second arms 886, 888 may include cam surfaces 886*d*, 888*d* that may reduce the risk of pinching of the towline 865.

The towline 865 may be guided to be located between one or more concave surfaces 886*c*, 888*c* of the respective first and second catch arms 886, 888. Together the concave portions 886*c*, 888*c* may form a channel 887 in which the towline 865 is captured. The catch arms 886, 888 may stop in this position for a hard capture engagement with a fitting. The channel 887 may also be sized to receive a fitting attached with the towline 865 not shown. This type of arrangement may be used in conjunction with a latch mechanism or more advantageously, the latch mechanism may be foregone in favor of the corresponding concave portions 886*c*, 888*c*.

Figure 25:
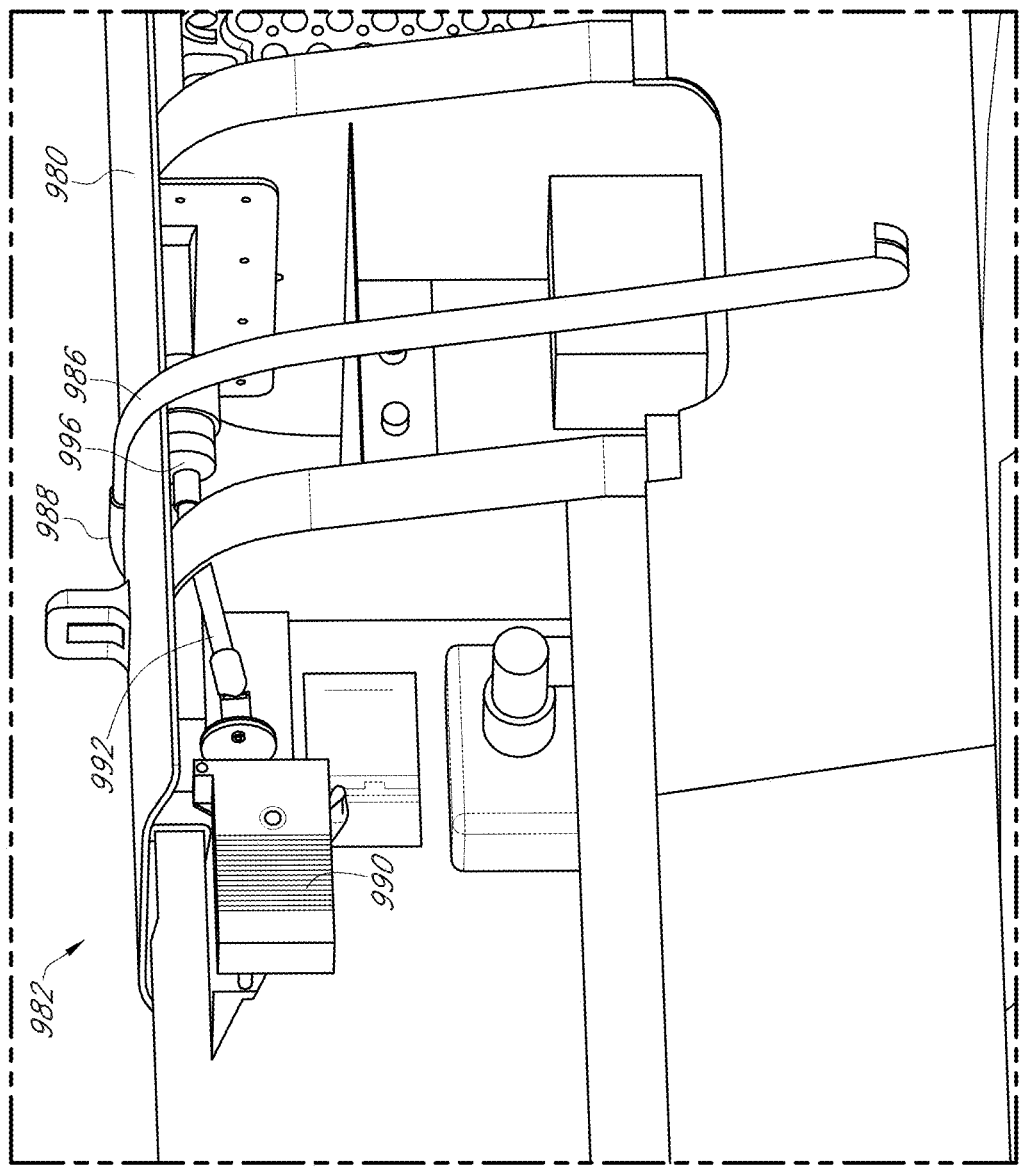
FIG. 25 is a side perspective view of another embodiment of a towline catch system on a target aircraft, with part of the aircraft removed for clarity, and that may be used with the various target aircraft described herein.
Figure 26A:
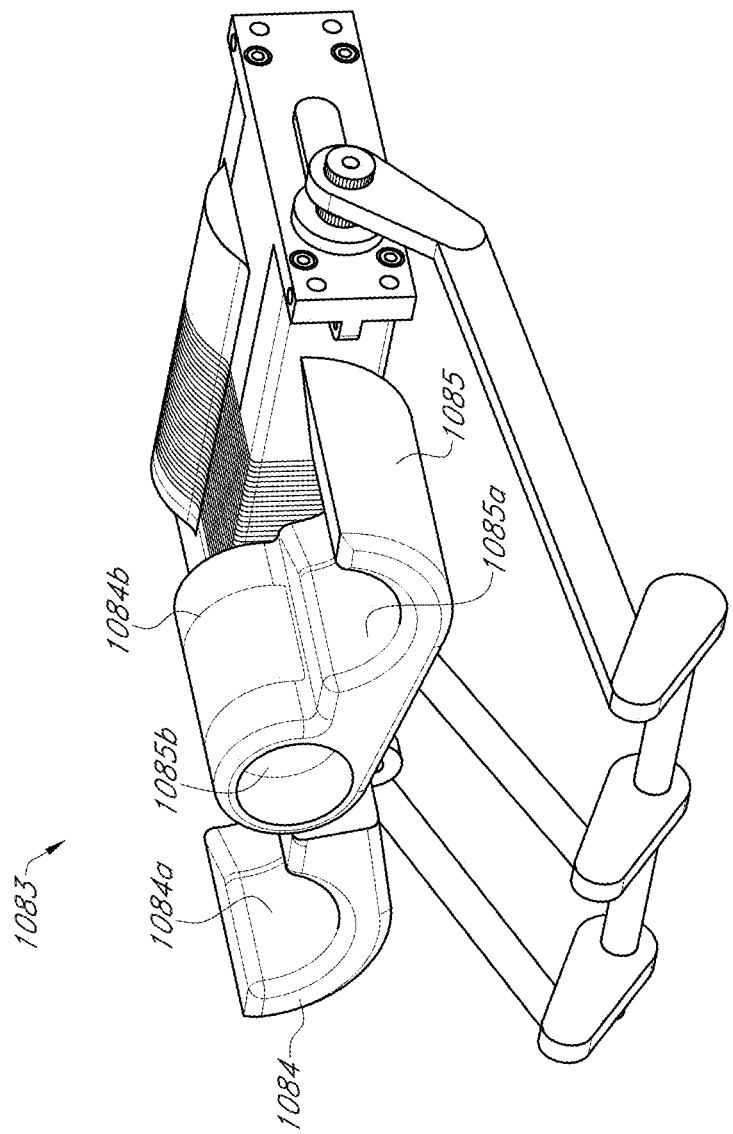
FIGS. 26A-26B are perspective views of an embodiment of a latch mechanism of a towline catch system shown in various configurations, and that may be used with the various target aircraft described herein.
Figure 26B:
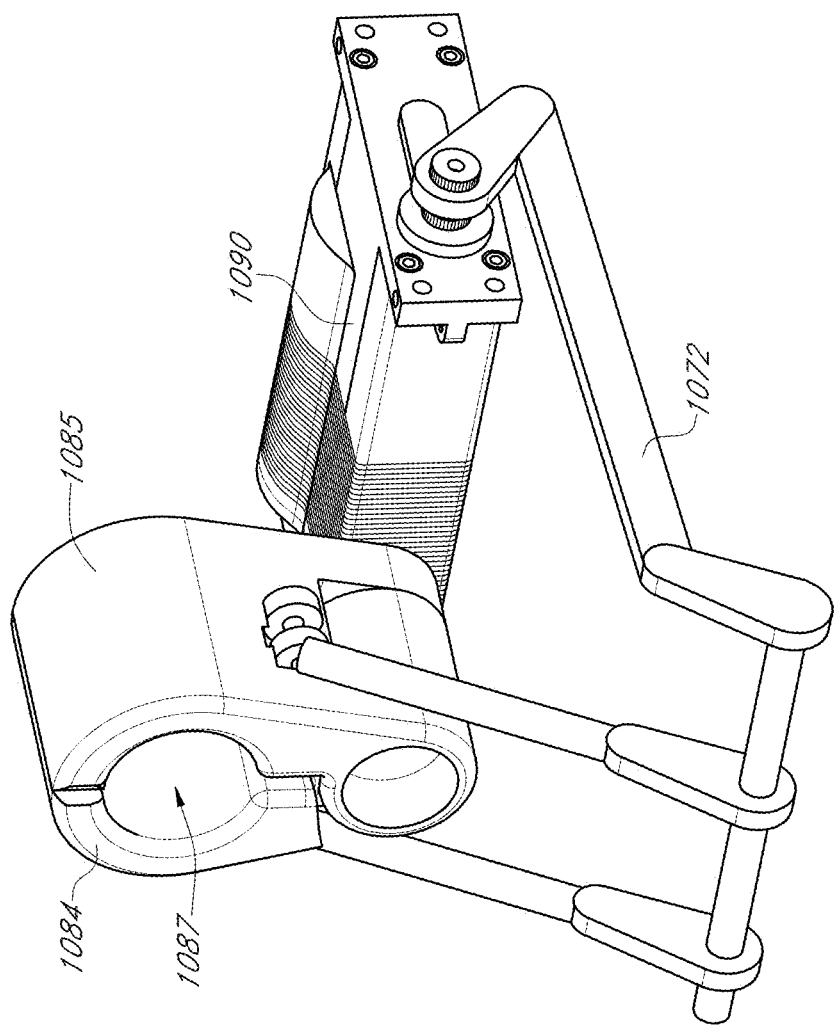

FIG. 25 shows a catch system 982 on a target aircraft 980. The catch system 982 may include a first catch arm 986 and/or a second catch arm 988. The catch system 982 may be attached to and/or partially contained within the target aircraft 980. The catch system 982 may be located on an upper side of a fuselage portion of the target aircraft 980. The first catch arm 986 may be coupled with a servo 990. The first catch arm 986 may rotate at a pivot 996. The servo 990 may couple with the first catch arm 986 through a transmission 992. The transmission 992 may include one or more universal joints, shafts other rotation transmission mechanisms FIGS. 26A-26B show another embodiment of a latch mechanism 1083 that may be used with any of the various catch systems described herein. The latch mechanism 1083 may include a first latch member 1084 and a second latch member 1085. The first latch member 1084 may be pivotally connected with the second latch member 1085. The first latch member 1084 may include a concave portion 1084*a* and a base portion 1084*b*. The base portion 1084*b* may include an aperture therein for receiving a pin. Similarly, the second latch mechanism 1085 may include a concave portion 1085*a* and base 1085*b* for receiving a pin. The pin may be received in the corresponding base portions 1084*b*, 1085*b* for pivotally coupling the first and second latch members 1084, 1085. The first and second latch members 1084, 1085 may be closable into a closed configuration forming a channel 1087. The first and second latch members 1084, 1085 may be actuatable by a servo 1090 or other actuator.

The latch mechanism 1083 may include a transmission 1072. The transmission 1072 may include a plurality of links and cam members. The links and cam members may couple with the shaft output of the servo 1090. The links and shaft members may couple with both the first and second latch members 1084, 1085. Rotation of the output shafts of the servo 1090 may cause rotation of the first and second latch member 1084, 1085 about the base portions thereof 1084*b*, 1085*b* to actuate the latch portion mechanisms 104, 1085 between the open and closed configurations for selectively capturing a fitting and/or a towline of a towline recover system.

Figure 27A:
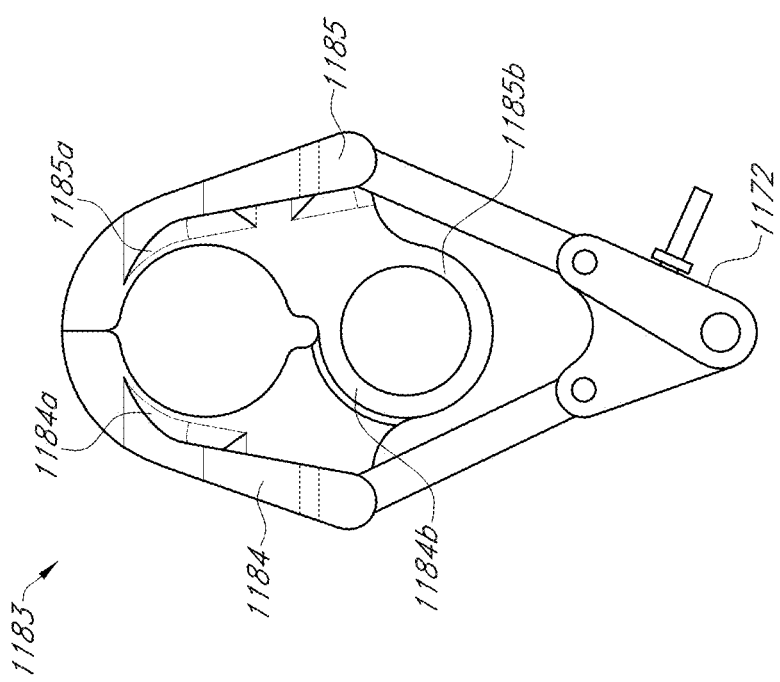
FIGS. 27A-27C are partial cross-section end views of an embodiment of a latch mechanism of a towline catch system shown in various configurations, and that may be used with the various target aircraft described herein.
Figure 27B:
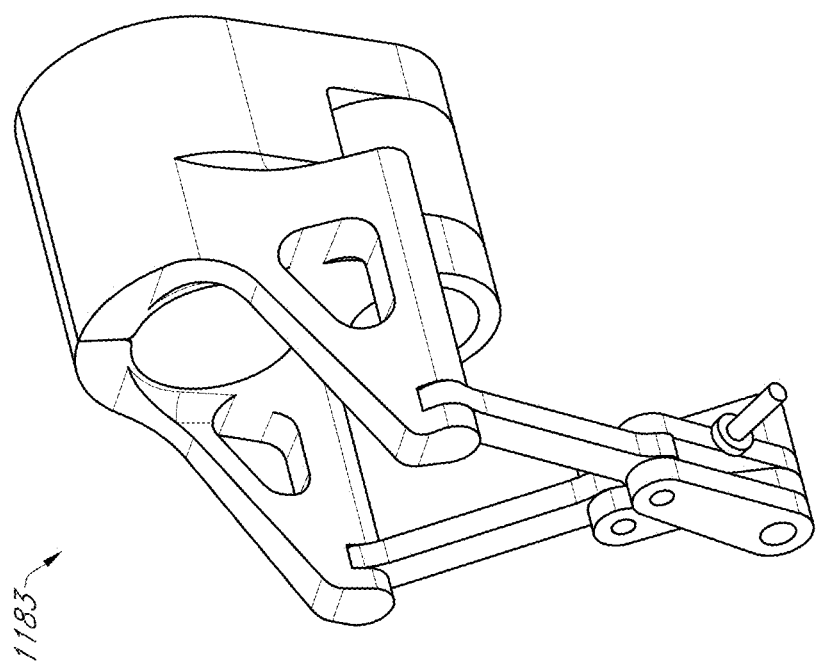
Figure 27C:
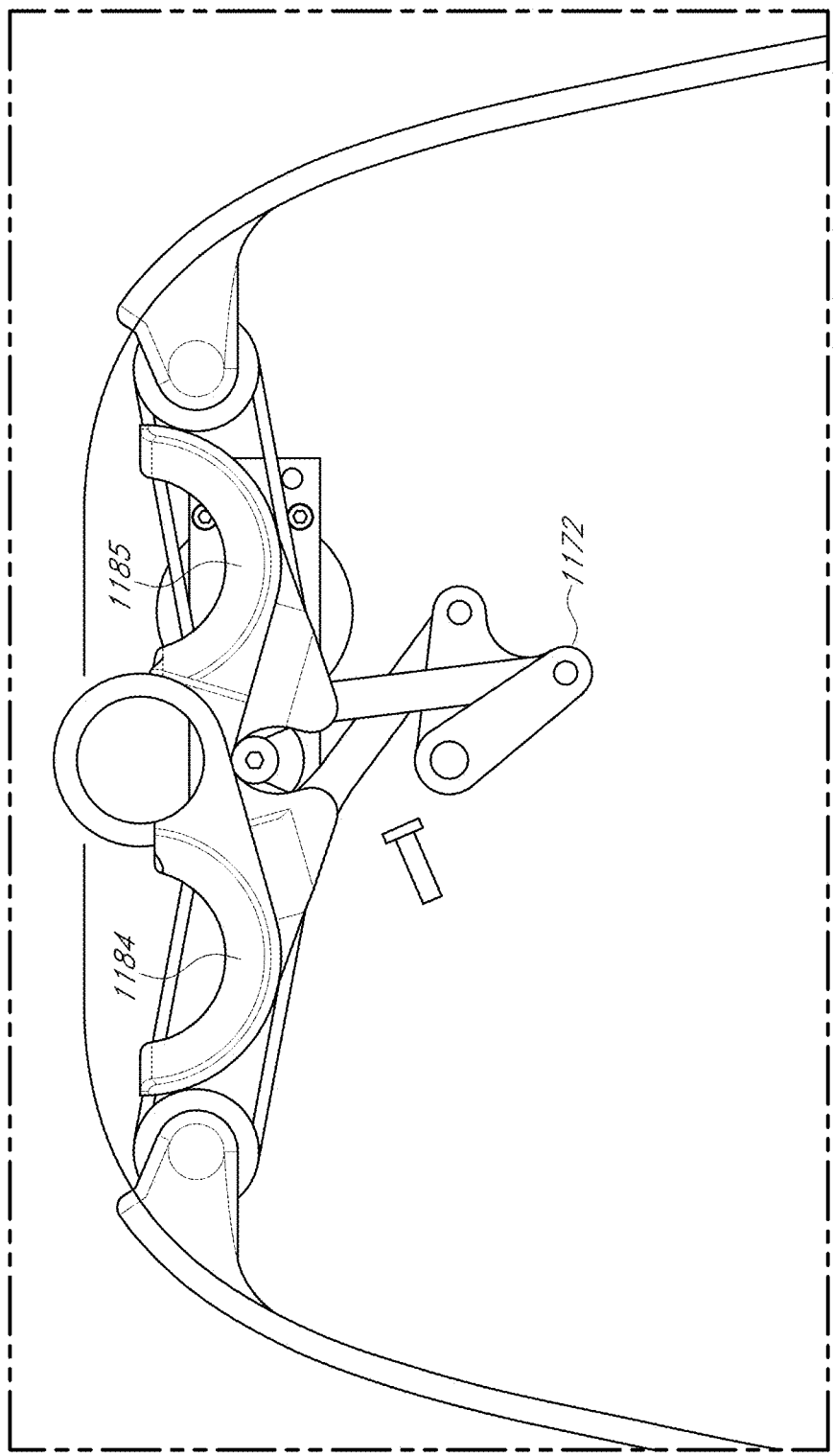

FIGS. 27A-27C show another embodiment of a latch mechanism 1183. FIGS. 27A and 27B are end and perspective views, respectively, of the latch mechanism. FIG. 27C is an end view of the latch mechanism 1183 integrated with guide arms, which may be any of the various arms described herein. The latch mechanism 1183 may include a first latch member 1884 and a second latch member 1185. The first latch member 1184 may include a concave member 1184*a* and a base 1184*b*. The base and 1184*b* may include an aperture for receiving a pin. The second latch member 1885 may include a concave portion 1185*a* that corresponds with the concave portion 1184*a*. The second latch member 1185 may include a base portion 1185*b* that corresponds with the aperture on the base portion 1184*b*. The apertures of the base portions 1184*b*, 1185*b* may receive a pin for pivotally coupling together the first and second latch members 1184, 1185 and allowing them to move between an open configuration as shown in FIG. 27C and a closed configuration as shown in FIGS. 27A and 27B. The first and second latch members 1184, 1185 may be coupled with a transmission mechanism comprised of one or more linkages or cams 1172 for actuating the first and second latch members 1184, 1185 between open and closed positions.

Figure 28A:
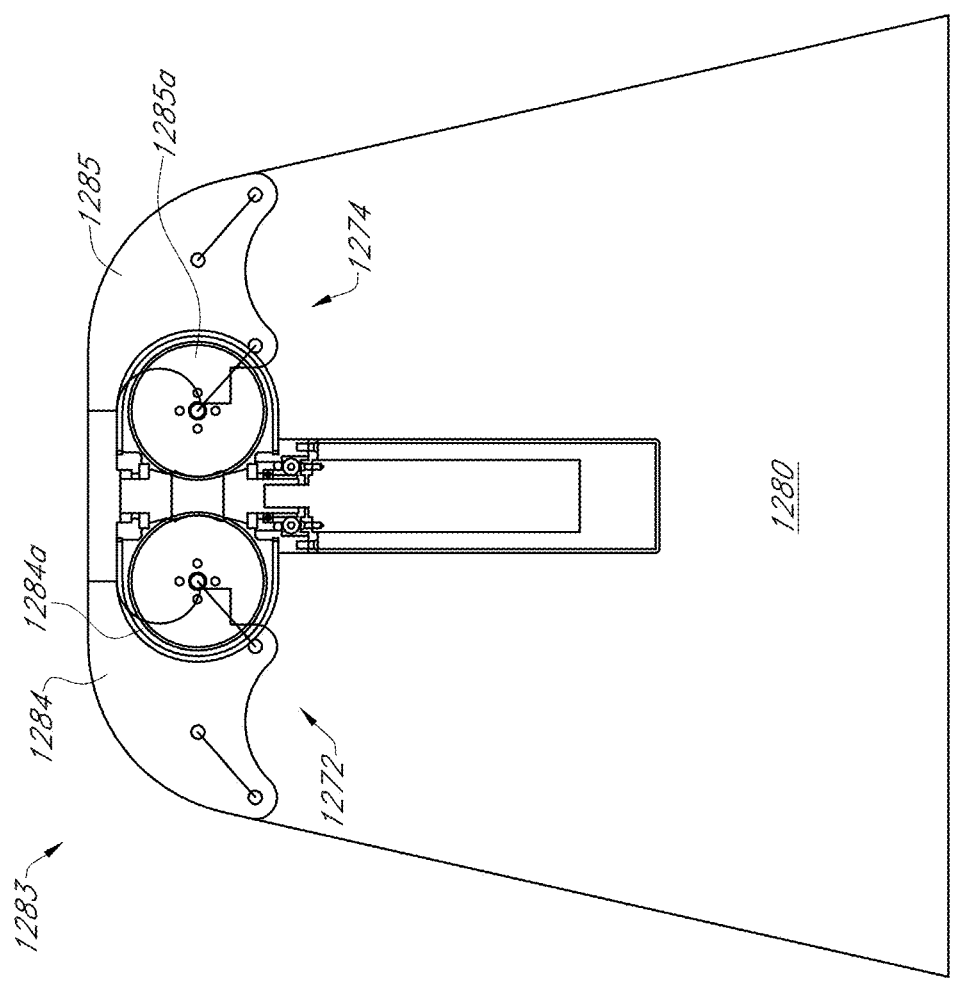
FIGS. 28A-28C are partial cross-section end views of an embodiment of a latch mechanism of a towline catch system, and that may be used with the various target aircraft described herein.
Figure 28B:
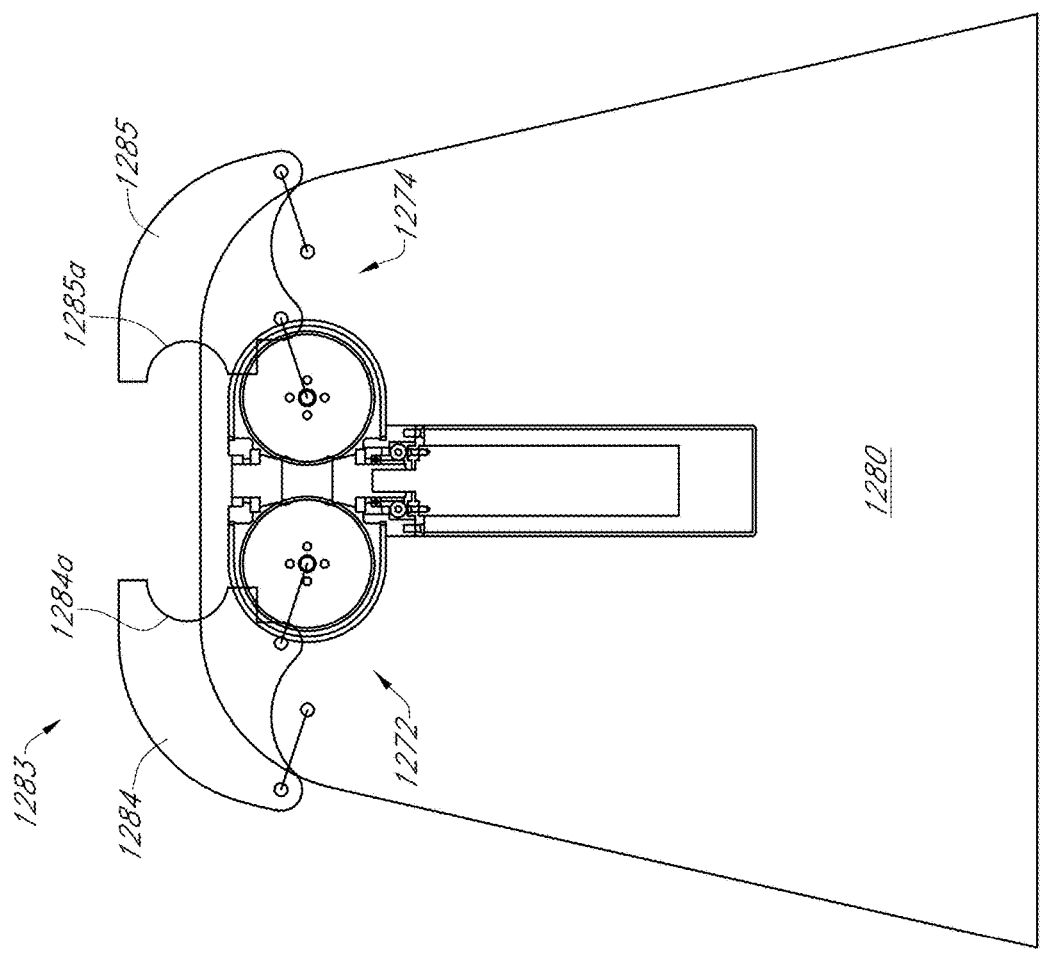
Figure 28C:
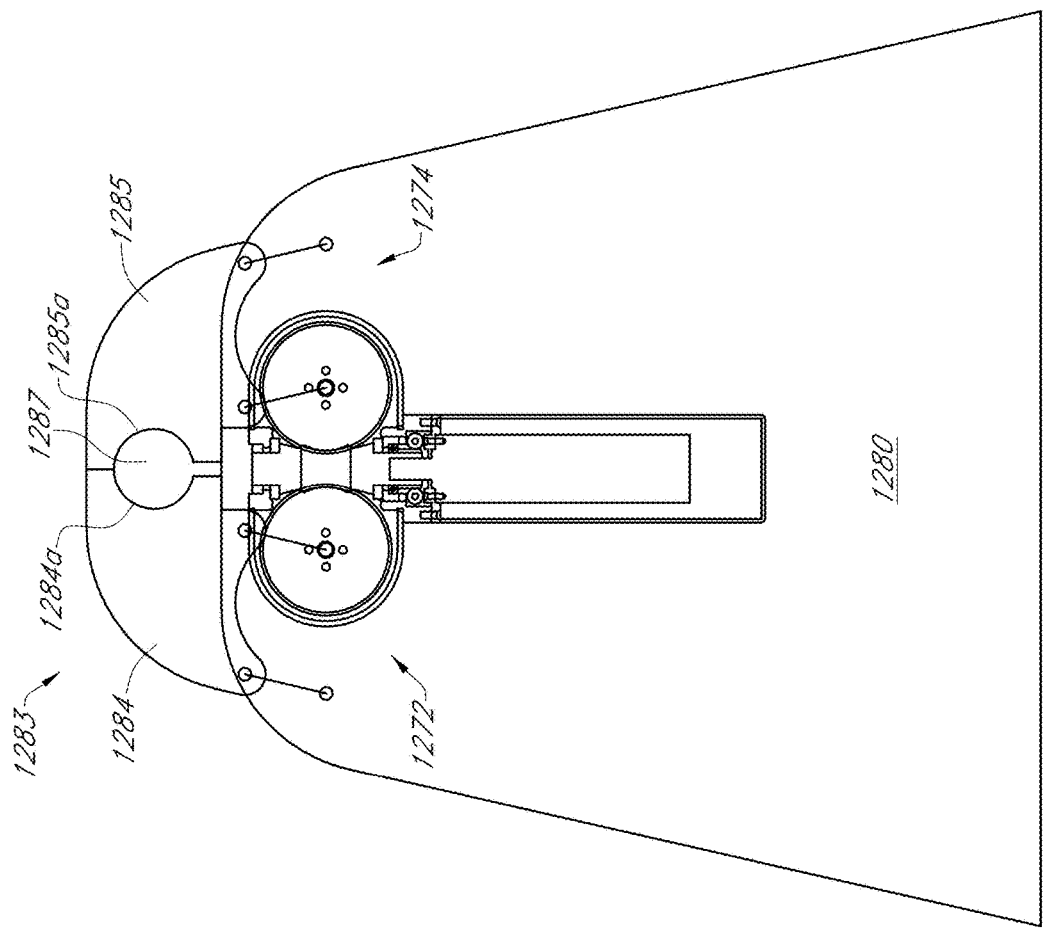

FIGS. 28A-28C show another embodiment of a latch member mechanism 1283. The latch mechanism 1283 may include a first latch member 1284. The first latch member 1284 may include a concave portion 1284*a* that corresponds with a concave portion 1285*a* of a second latch mechanism 1285. The first and second latch members 1284, 1285 may be actuatable between open and closed configurations. In the closed configuration, the corresponding concave regions may form a channel 1287 as shown in FIG. 28C.

The first latch mechanism 1284 may mounted on a four-bar mechanism 1272. The four-bar mechanism 1272 may be coupled with a servo motor or other actuator for selectively rotating translating position of the latch member 1284 between a stowed configuration (FIG. 28A), an open configuration (FIG. 28B) and a closed configuration (FIG. 28C) forming the channel 1287. The four-bar mechanism 1272 may comprise a plurality of linkages and pivots that enable movement of the latch member 1284. The second latch member 1285 may be mounted on a four-bar mechanism 1274. Advantageously, the outer contours of the outer latch members 1284, 1285 may generally match the fuselage of the target aircraft 1280. Thus in the stowed configuration, the latch members 1284, 1285 may be stowed fully within the fuselage to reduce drag and the risk of damage to the latch mechanism 1283.

Figure 29:
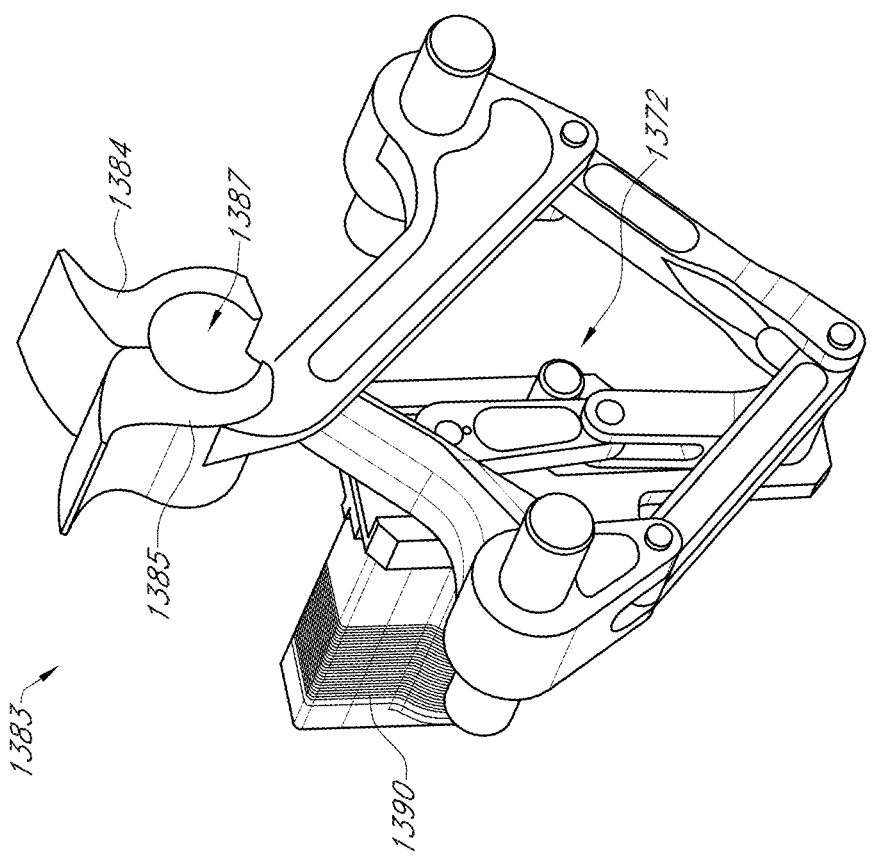
FIG. 29 is a perspective view of an embodiment of a latch mechanism of a towline catch system that may be used with the various target aircraft described herein.

FIG. 29 shows another embodiment of a latch mechanism 1383. The latch mechanism 1383 may include a first latch member 1384 having a concave region on one end thereof and a second latch member 1385 including a concave region thereon. The concave regions of the first and second latch members 1384, 1385 may correspond to form a channel 1387. The channel 1387 may be used to capture a towline and/or a fitting of a towline recovery system. The latch mechanism 1383 may be assembled on a target aircraft not shown. The latch mechanism 1383 may include a servo 1390 or other actuator. The latch mechanism 1383 may include a transmission 1372. The transmission 1372 may couple with the latch members 1384, 1385 for opening and closing the ends thereof having the concave regions that open and form the channel 1387. The transmission 1372 may comprise a plurality of linkages and pivots that enable opening and closing of the latch members 1384, 1385.

Figure 30A:
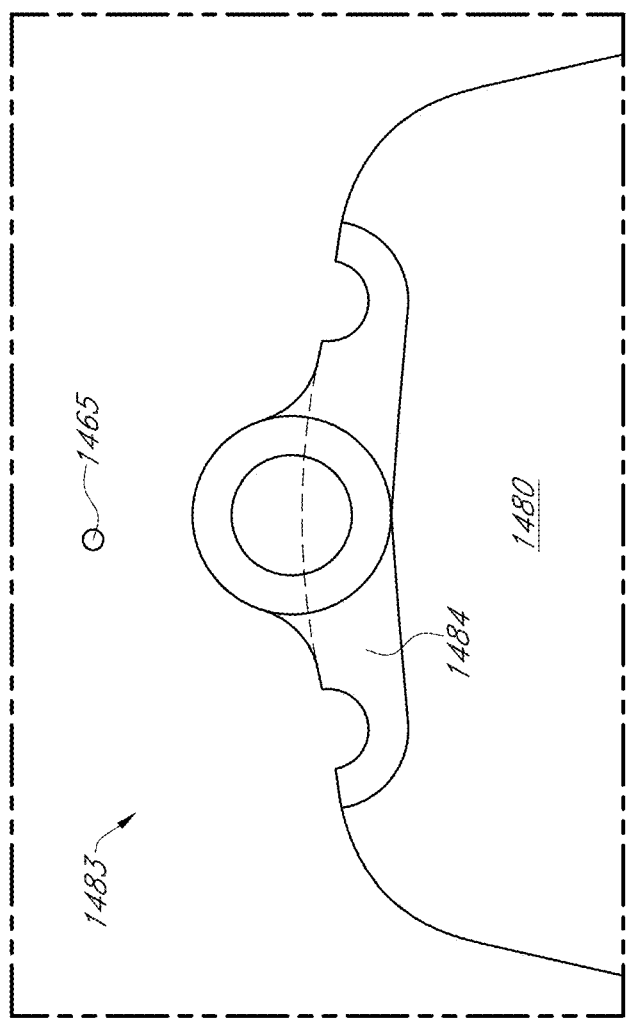
FIGS. 30A-30D are schematics of an embodiment of a latch mechanism shown in various configurations to engage a fitting of a towline that may be used with the various aircraft recovery systems described herein.
Figure 30B:
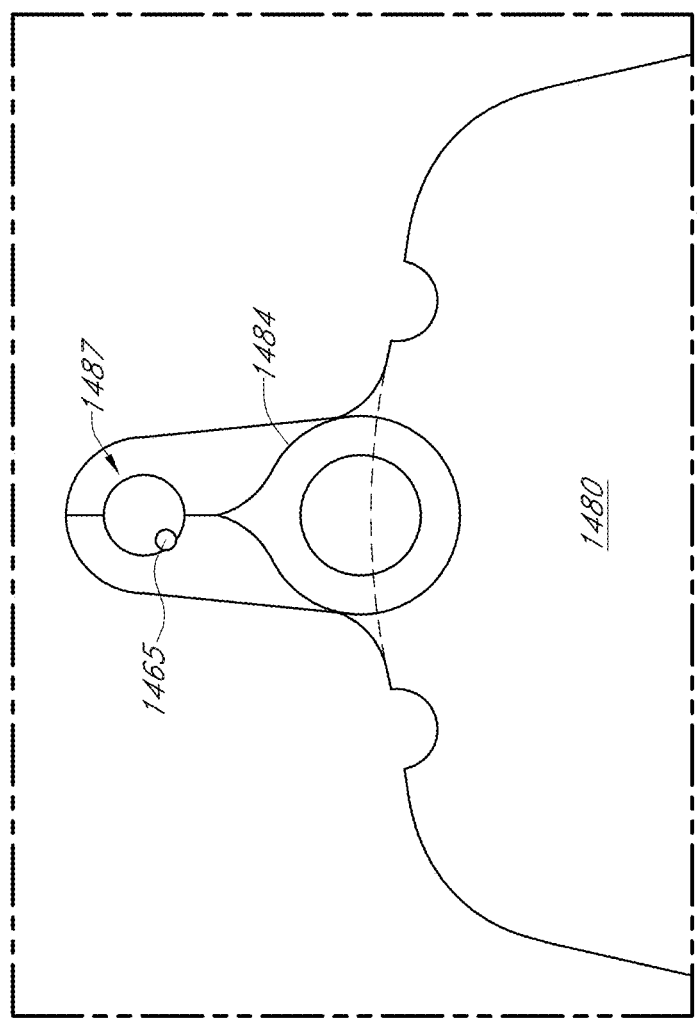
Figure 30C:
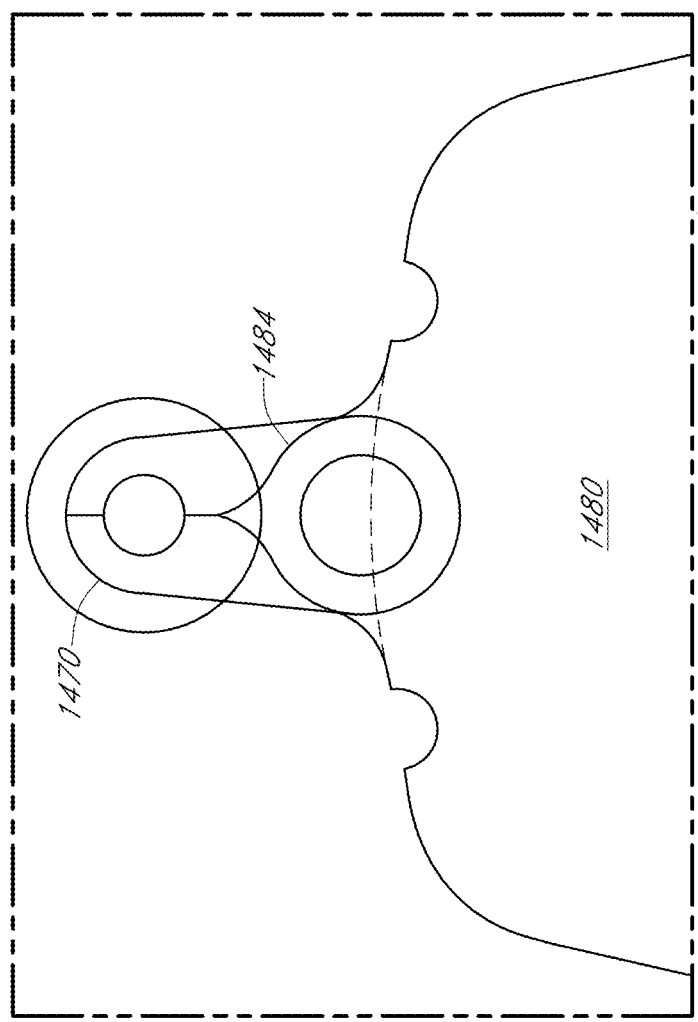
Figure 30D:
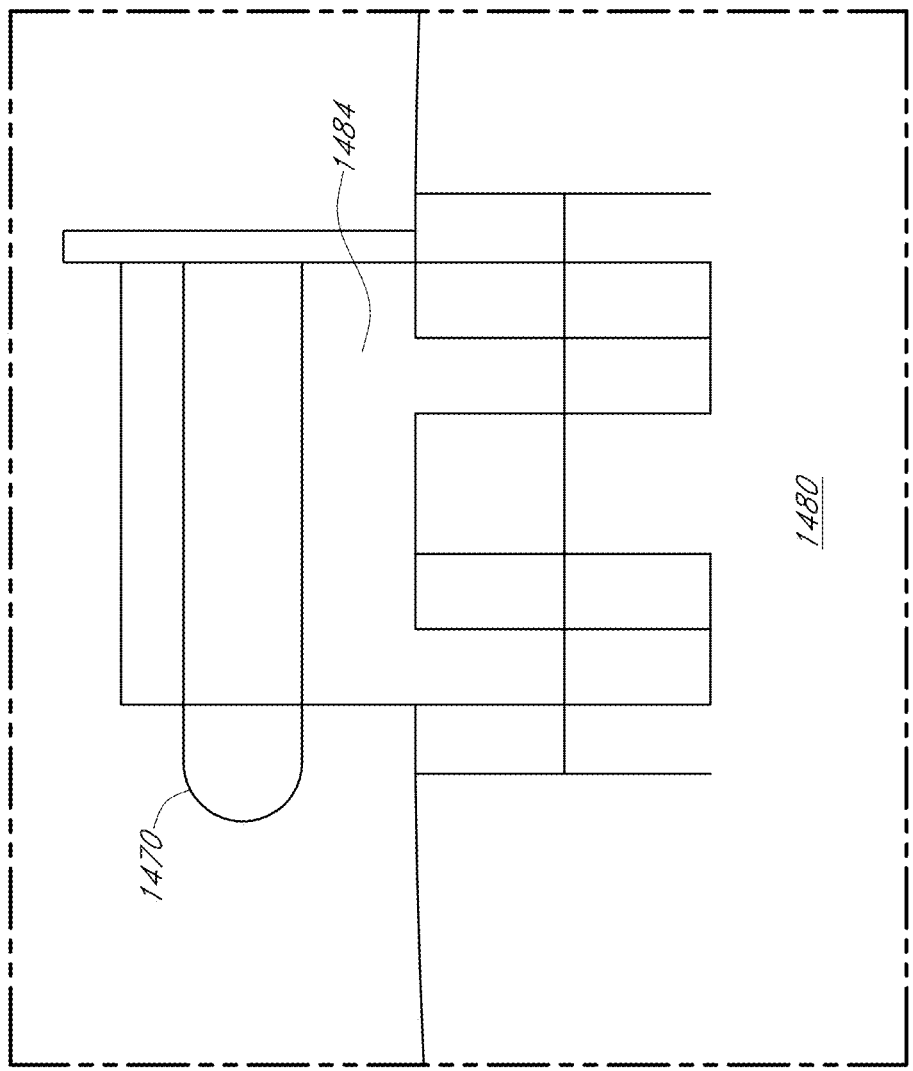
Figure 31A:
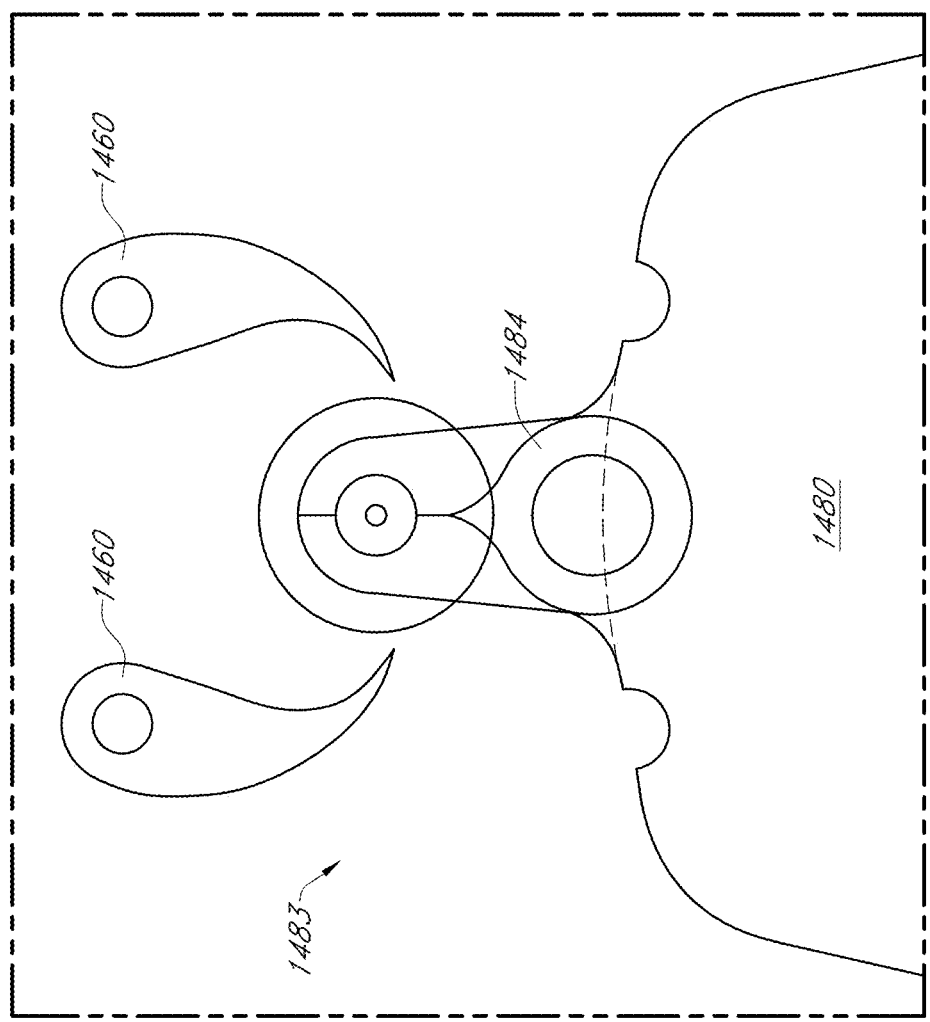
FIGS. 31A-31D are schematics of an embodiment of retaining arms in various configurations engaging a latch mechanism to secure a target aircraft with a host aircraft, and that may be used with the various aircraft recovery systems described herein.
Figure 31B:
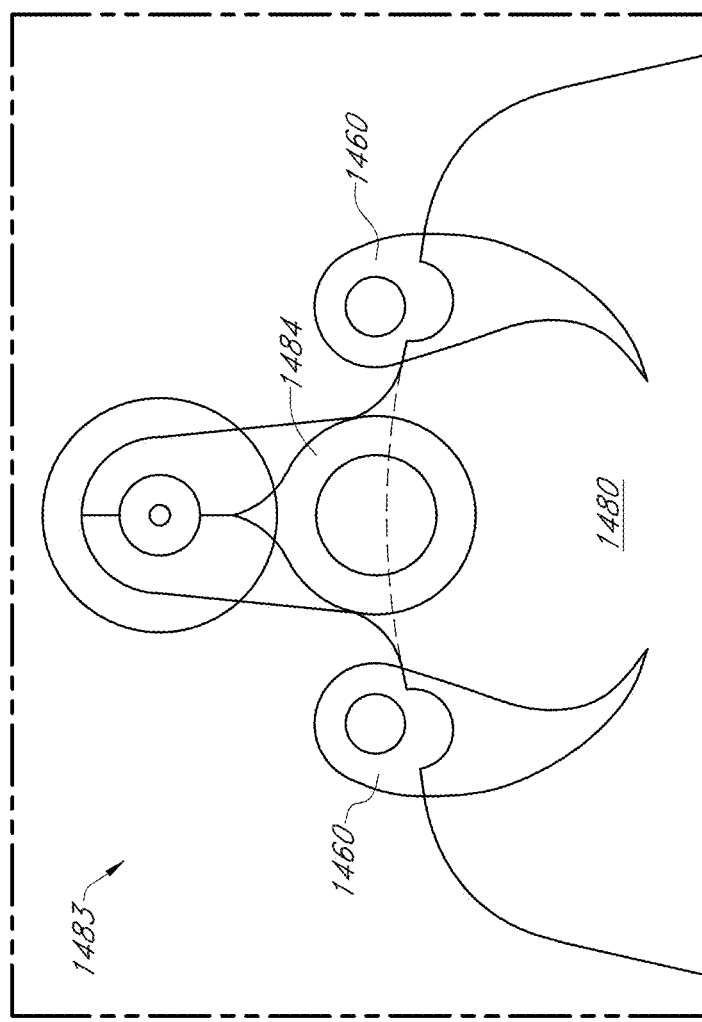
Figure 31C:
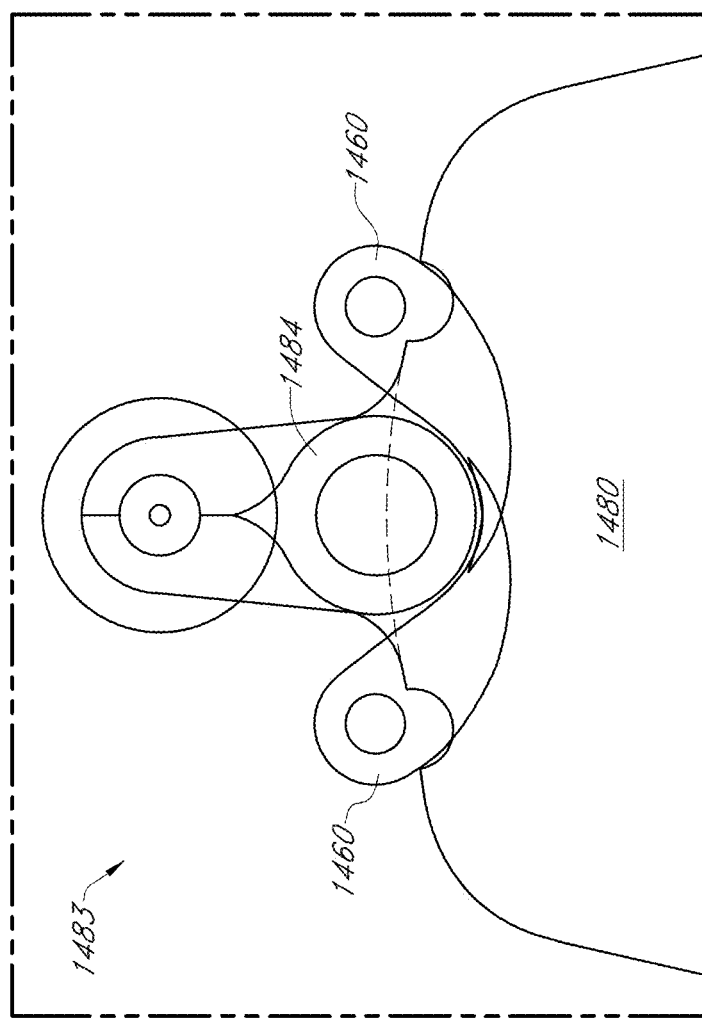
Figure 31D:
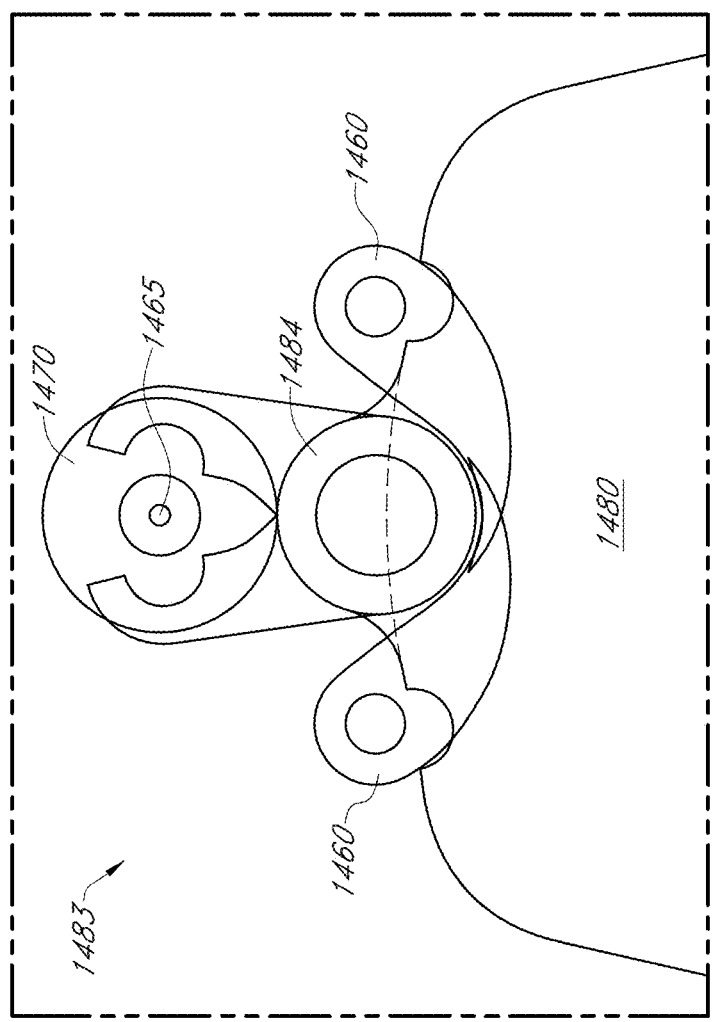
Figure 32A:
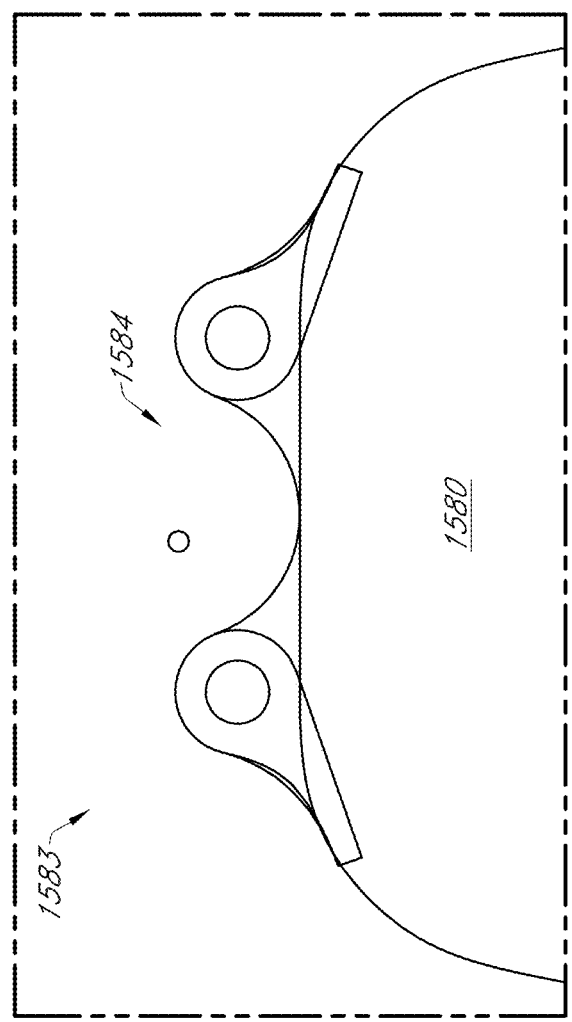
FIGS. 32A-32D are schematics of another embodiment of retaining arms in various configurations engaging a latch mechanism to secure a target aircraft with a host aircraft, and that may be used with the various aircraft recovery systems described herein.
Figure 32B:
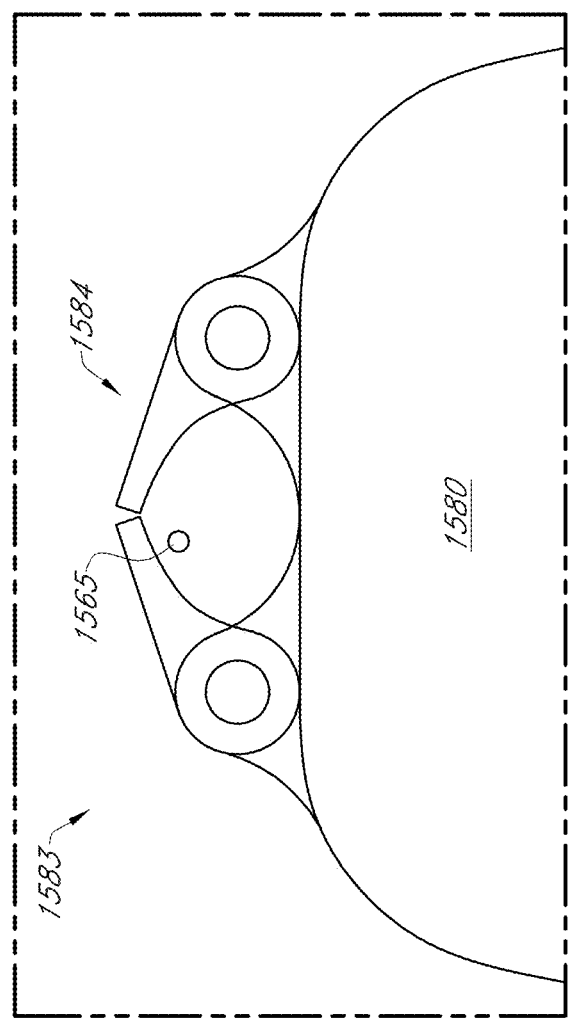
Figure 32C:
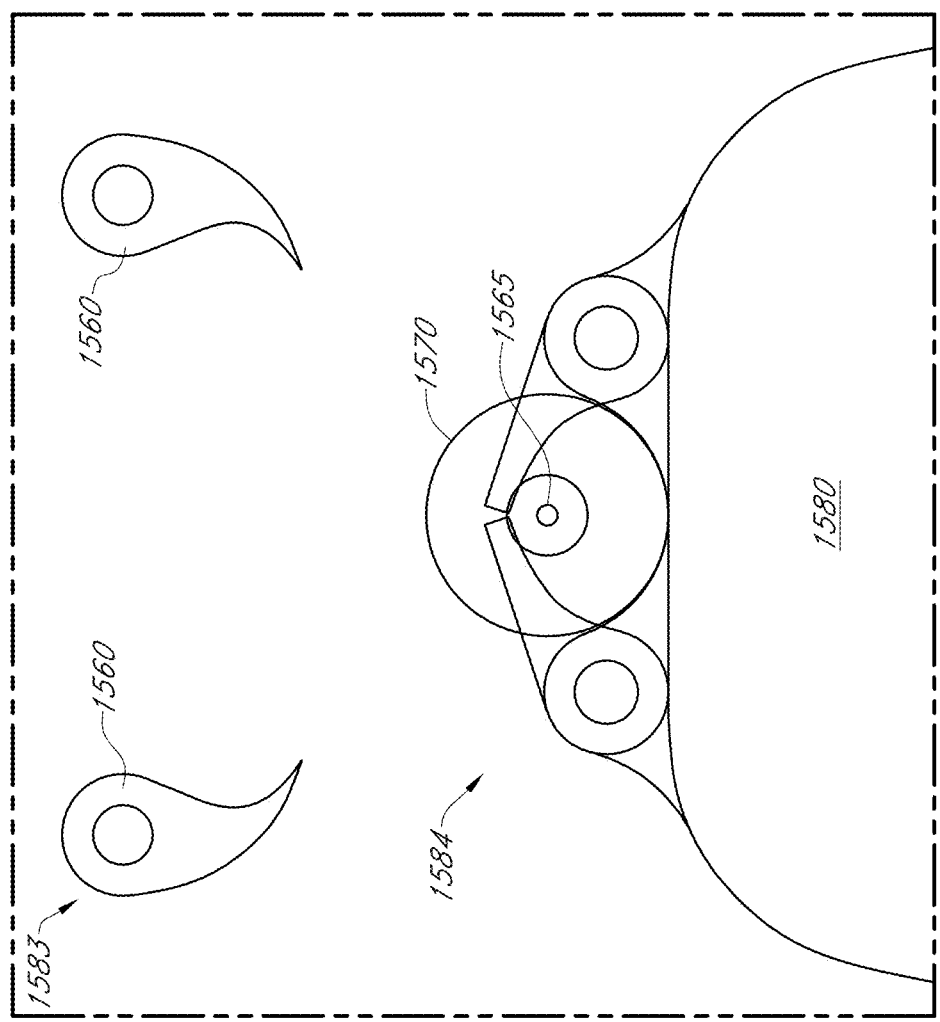
Figure 32D:
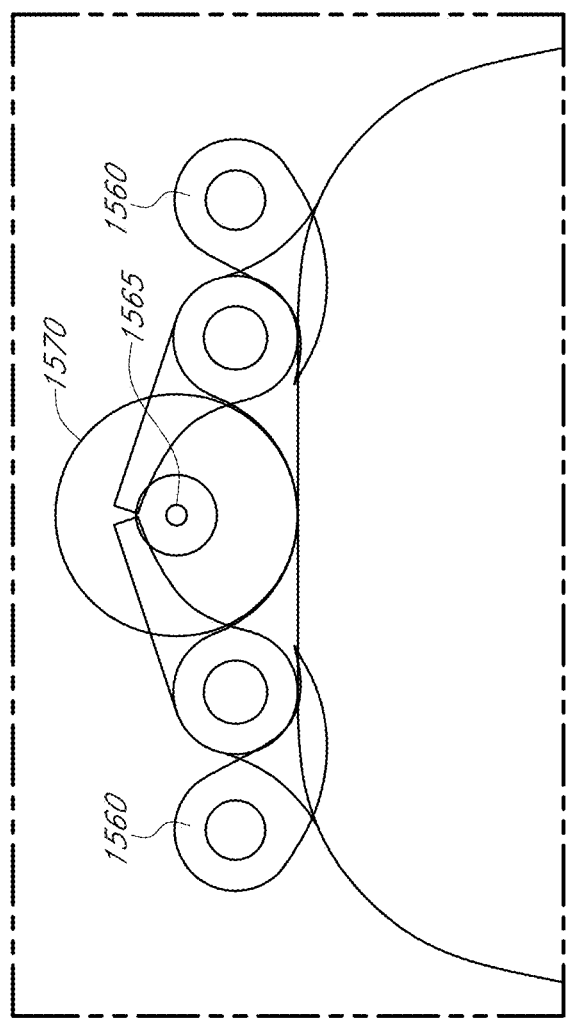
Figure 33A:
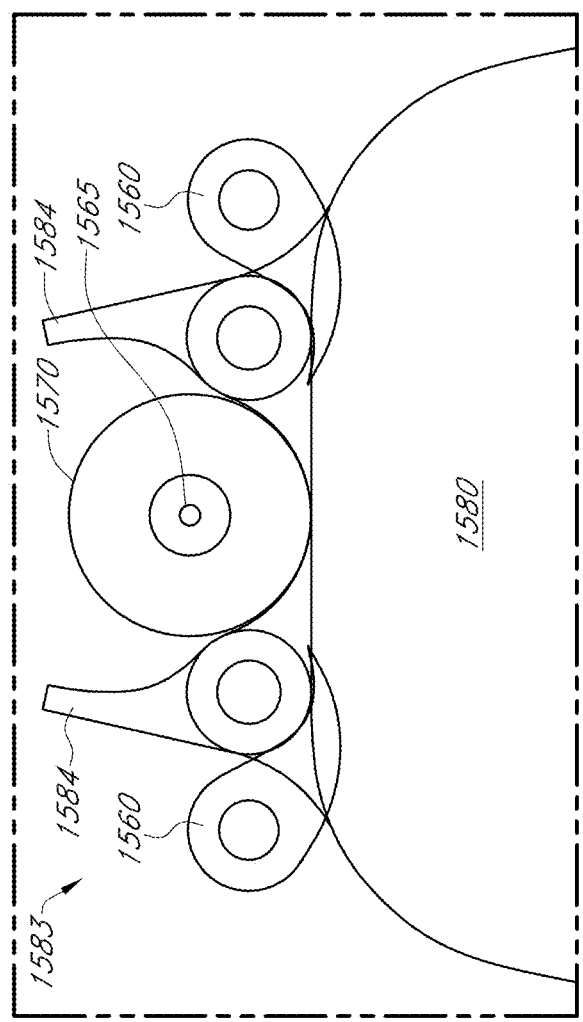
FIGS. 33A-33B are schematics of another embodiment of a fitting released from a latch mechanism and release of the latch mechanism by a pair of retaining arms retaining arms in various configurations to deploy the target aircraft from the host aircraft, and that may be used with the various aircraft recovery systems described herein.
Figure 33B:
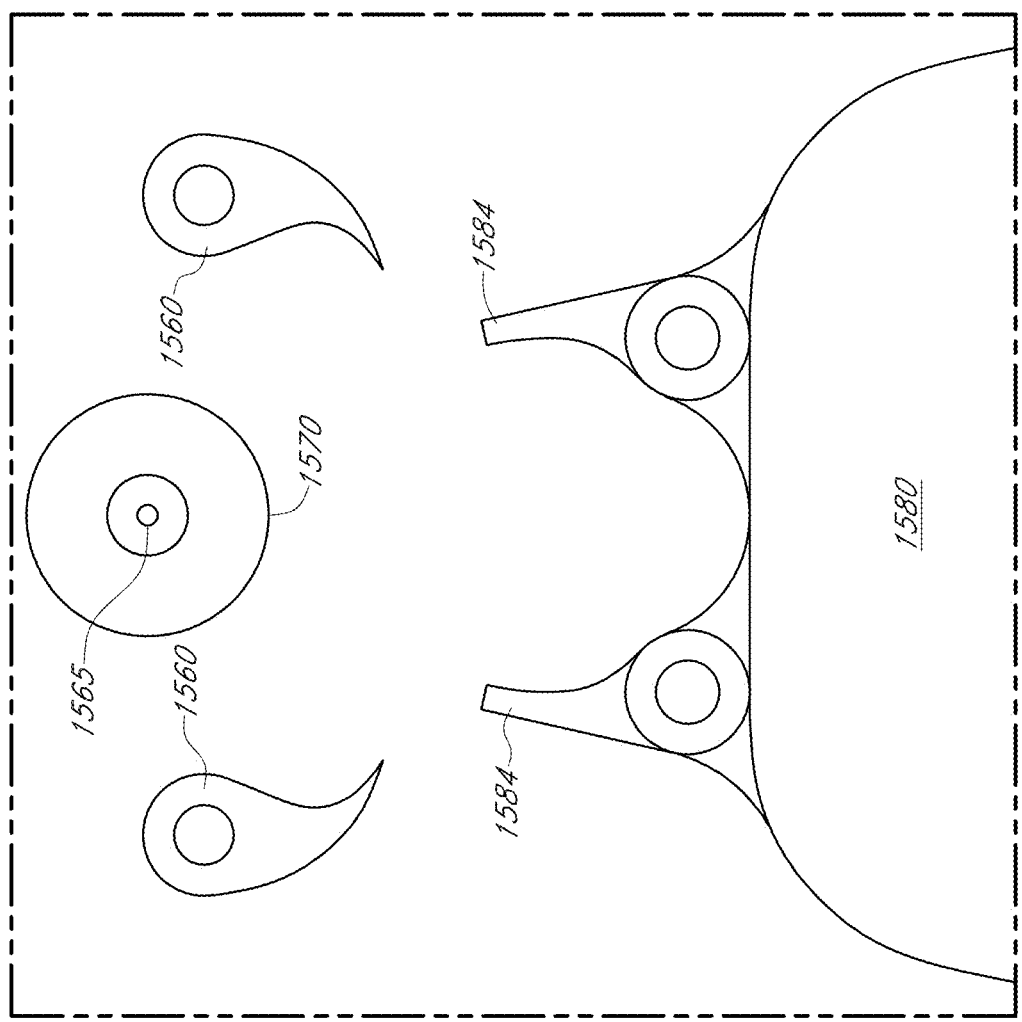

FIGS. 30A-30D show another embodiment of a latch mechanism 1483 attached to a target aircraft as a part of a catch system. The latch mechanism 1483 may be assembled on a target aircraft 1480. The latch mechanism 1483 may comprise latch members that are coupled with each other about a pivot location. The latch members may include latch members 1484, as shown in FIG. 30B. Latch members 1484 may be closed to form a channel 1487. The channel 1487 may capture a towline 1465. The towline 1465 may guide a fitting 1470 into the channel 1487 created by the latch members 1484, 1485.

FIGS. 31A-31D show the latch system 1483 utilized for securing the target aircraft 1480 with a host aircraft. The host aircraft may include a pair of retaining arms 1460. The retaining arms 1460 may have an open configuration and a closed configuration. As the towline 1465 is retracted into the host aircraft the target aircraft 1480 may be moved closer towards the host aircraft. As the target aircraft is retrieved it may be drawn into the retaining arms 1460. The retaining arms 1460 may pass over the latch members 1484. The retaining arms 1460 may pass at least partially into the fuselage into the target aircraft 1480. In certain implementations, the catch system and/or fuselage may include recesses formed therein for receiving the retaining arms 1460. The retaining arms 1460 may engage and capture the latch members 1484. The retaining arms 1460 may securely attach the target aircraft 1480 with the host aircraft. The retaining arm 1460 may engage with the pivot end of the latch members 1484. This enables the latch members 1484 to still open and close to optionally release the fitting 1460 and/or the towline 1465 (e.g., after engagement with the retaining arms 1460).

FIGS. 32A-33B show another implementation of a catch system 1583. The catch system 1583 may be attached with a target aircraft 1580. The catch system 1583 may include a pair of latch members 1584. The latch members 1584 may capture a towline 1565 and/or a fitting 1570 during a recovery maneuver, as described above. The host aircraft may include a pair of retaining arms 1560. The latching members 1584 do not rotate about a common axis. They may be spaced apart from each other in a direction transverse to the longitudinal axis of the fuselage of the target aircraft 1580. The retaining arms 1560 may be used to attach the target aircraft 1580 with the host aircraft. In an open configuration, the retaining arms 1560 may pass over and possibly partially into the fuselage of the target aircraft 1580 and engage underneath pivot portions of each of the latch members 1584. Optionally, the towline 1565 and/or the fitting 1570 may be released after the retaining arms 1560 engage the latch members 1584. Optionally, the entire target aircraft 1580 may be released by releasing the latch members 1584, the towline 1565 and the fitting 1570. In this manner, the target aircraft 1580 may be re-launched from the host aircraft.

Figure 34A:
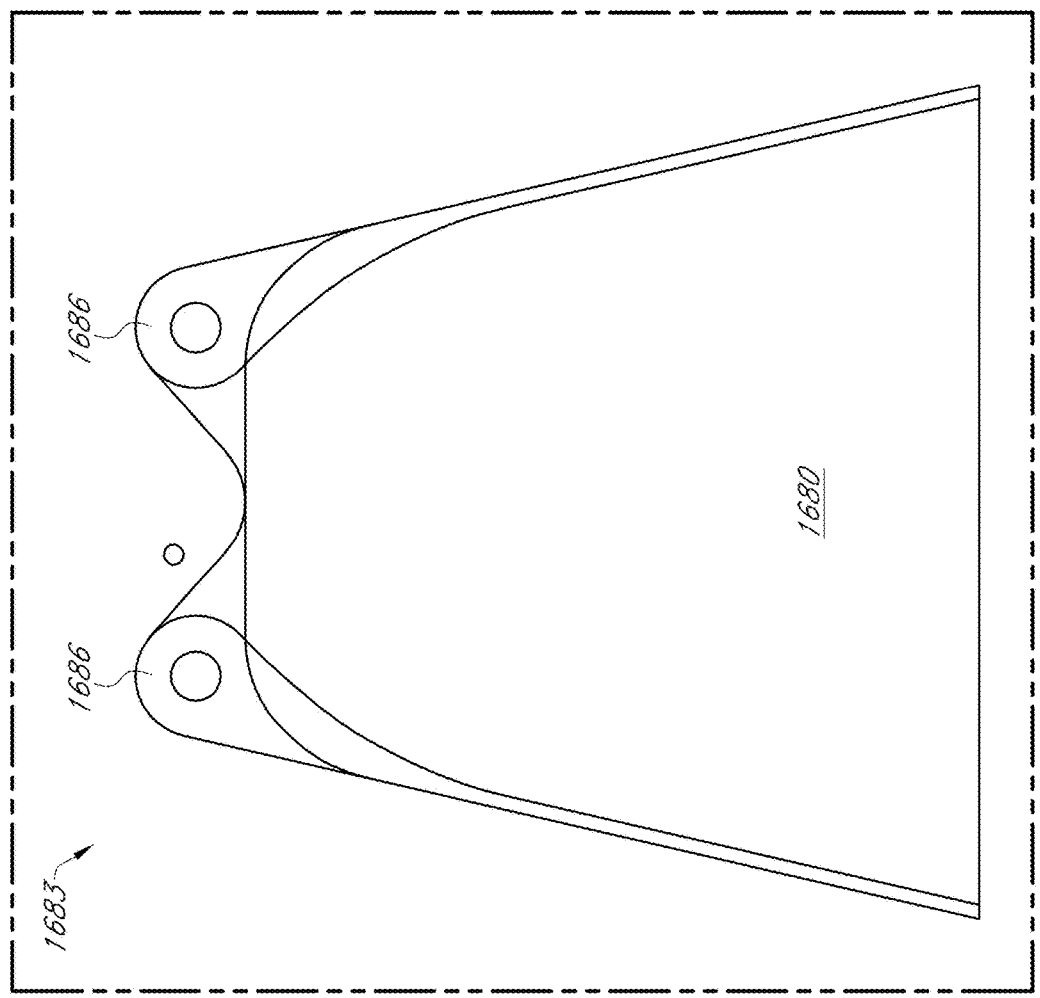
Figure 34B:
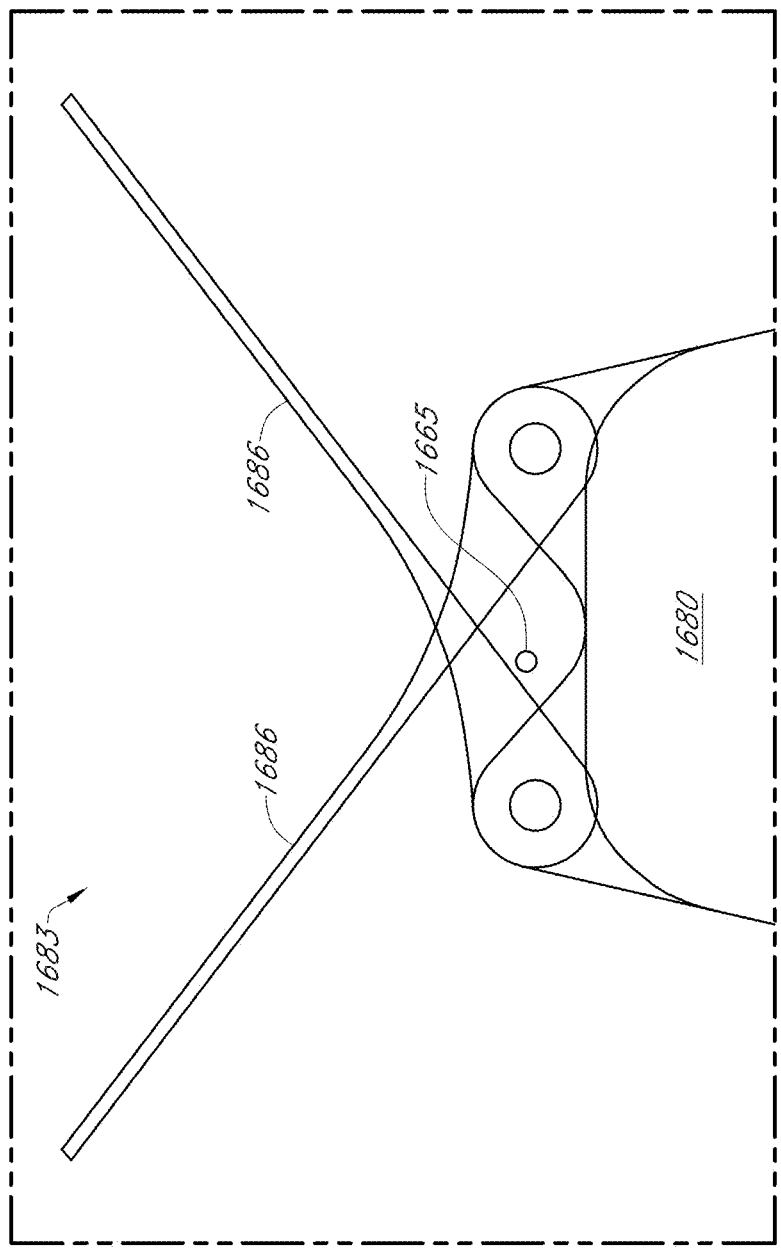

FIGS. 34A-34C show another embodiment of a catch system 1683. The catch system 1683 may be attached with a target aircraft 1680. The catch system 1683 may include a pair of catch arms 1686. The catch arms 1686 may be deployed in a closed configuration (e.g., crossing) to capture a towline 1665 and/or a fitting 1676. The catch arms 1686 may include base portions that may securely support the fitting 1676. This may negate the need for a separate latch mechanism.

Figure 35A:
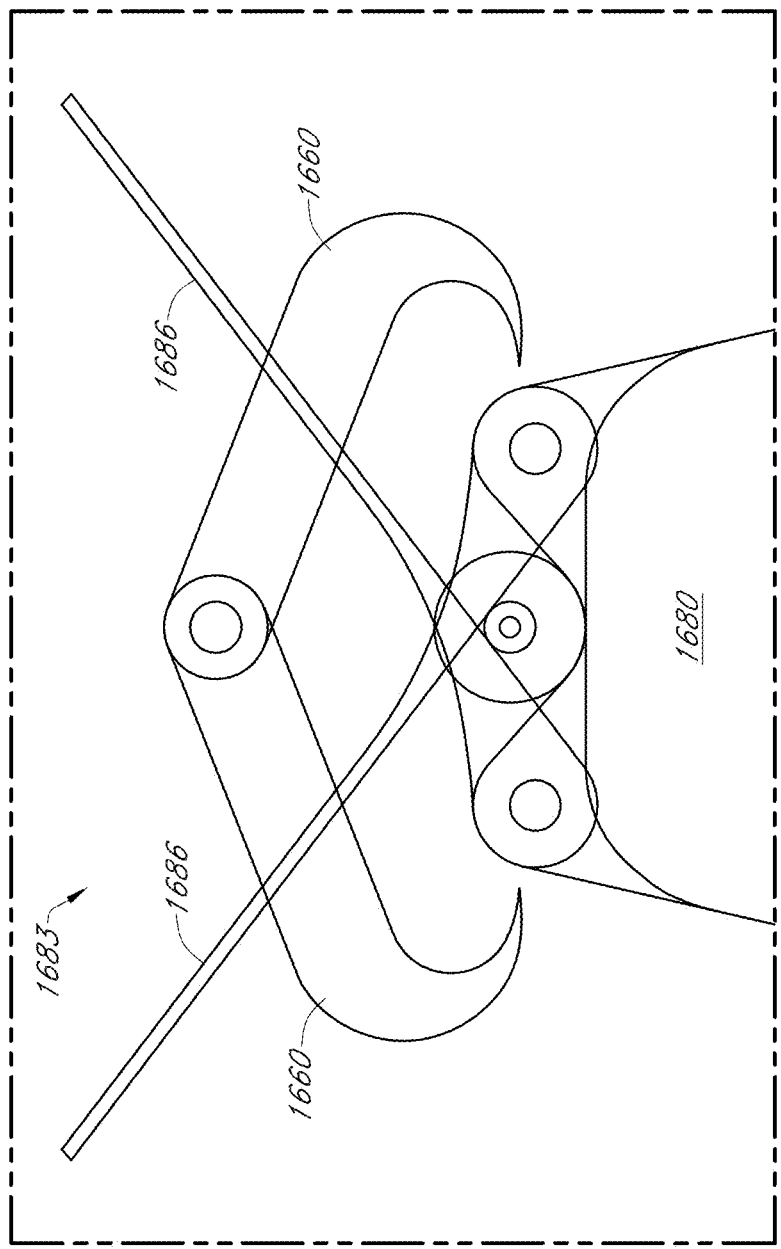
FIGS. 35A-35B are schematics of another embodiment of retaining arms deployed to engage with a towline catch system and secure a target aircraft with a host aircraft, and that may be used with the various aircraft recovery systems described herein.
Figure 35B:
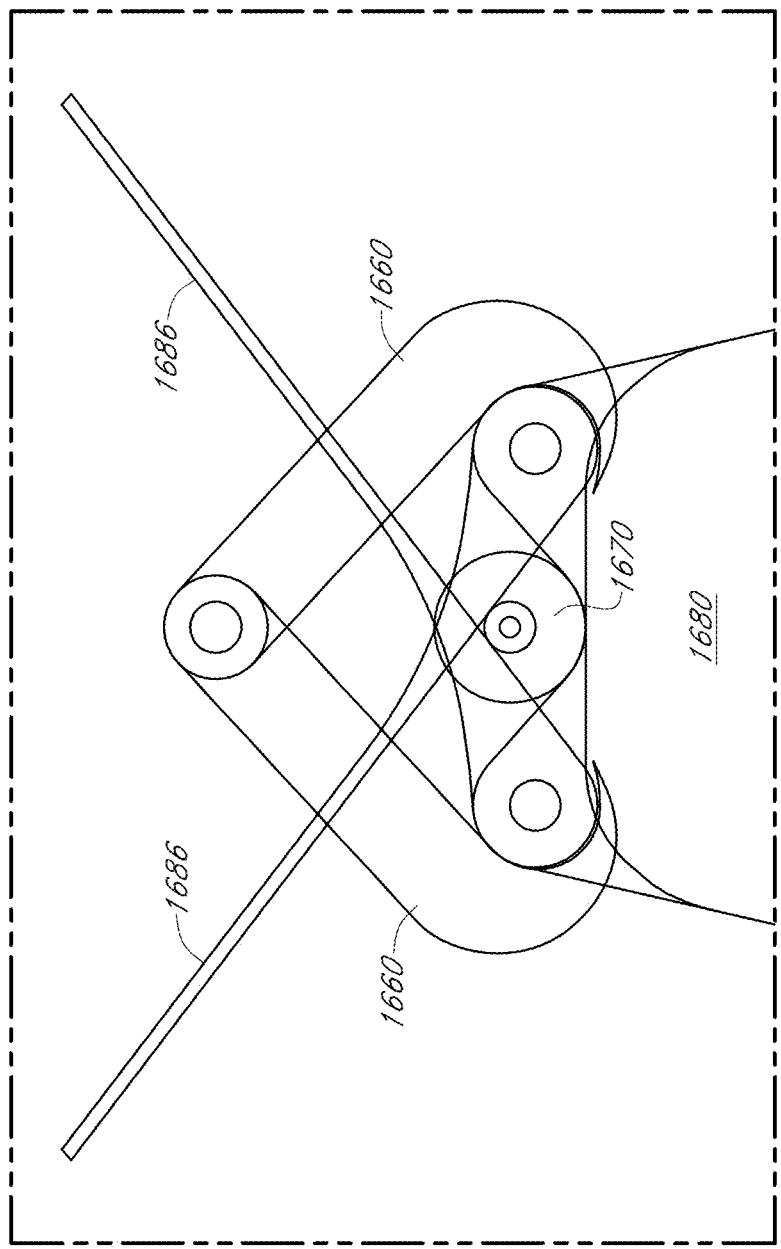

As shown in FIGS. 35A-35B, the host aircraft may include retaining arms 1660 (e.g., hooks) that may directly capture the catch arms 1686. For example, the retaining arms 1660 may engage with the pivot ends of the catch arms 1686.

FIGS. 36A-36F show a weight release mechanism of a towline recovery system 1760. The towline recovery system 1760 may include a towline 1765 and a reel system 1762. The reel system 1762 may include an opening 1782. The opening 1782 may include one or more doors 1784. Contained within the opening 1782 may be a sinker 1766. The sinker 1766 may be elongate (e.g., torpedo-shaped) or shaped in any other manner. The sinker 1766 may include an aperture through which the towline 1765 extends.

Figure 36B:
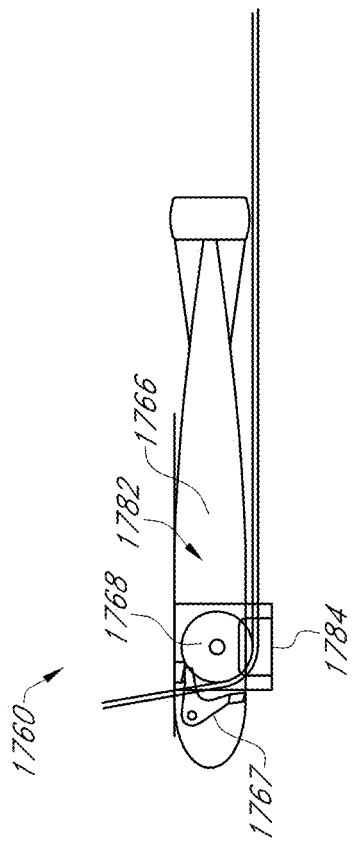
FIGS. 36A-36F are various views of schematics of a sinker deployed with a towline in a towline recovery system shown in various configurations, and that may be used with the various aircraft recovery systems described herein.
Figure 36A:
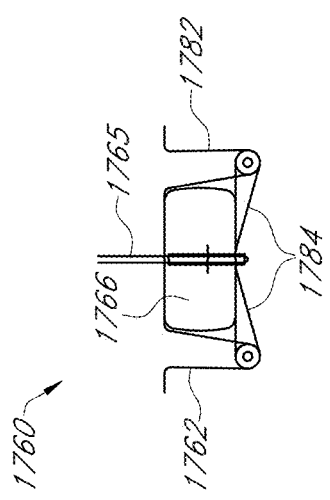
Figure 36D:
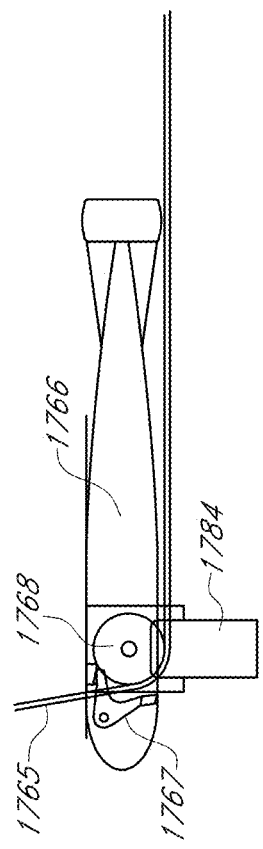
Figure 36C:
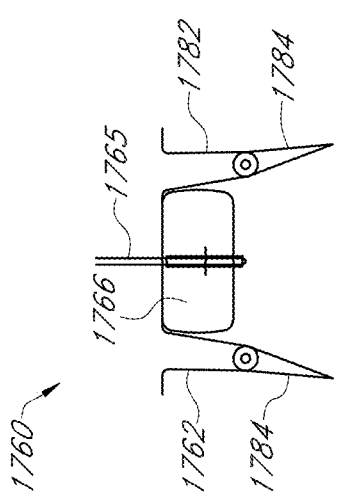
Figure 36F:
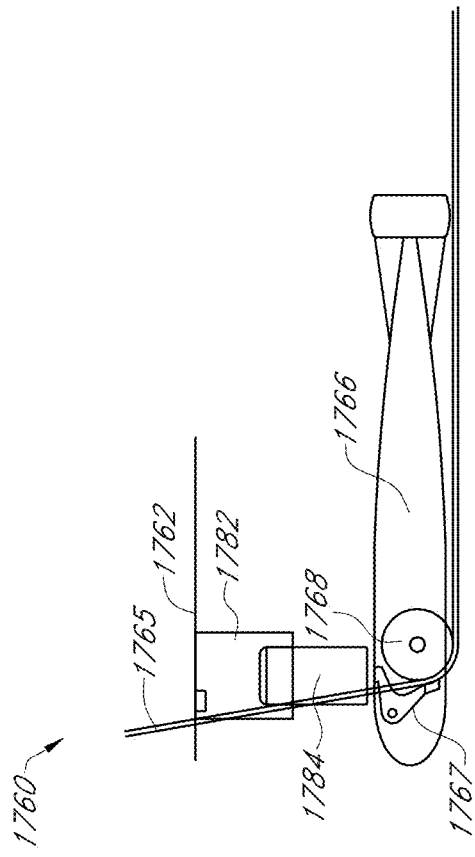
Figure 36E:
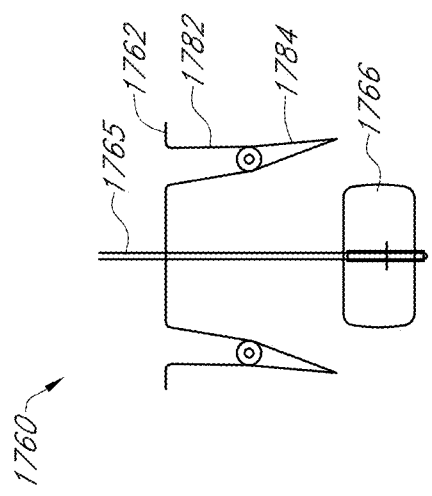

The sinker 1766 may include a cam mechanism 1767. In a first configuration of the cam mechanism 1767, as shown in FIGS. 36A-D, the towline 1765 may pass freely through the aperture past the cam mechanism 1767 as the towline 1765 is payed out by the reel system 1762. In a second configuration of the cam mechanism 1767, as shown in FIGS. 36E-F, the towline 1765 may be engaged with the cam mechanism 1767. In the second configuration, the sinker 1766 may be payed out along with the towline 1765.

The cam mechanism 1767 may be actuated between the first and second configurations by the doors 1784. When the sinker 1766 is held within the opening 1782 by the doors 1784, the cam mechanism 1767 may be positioned in the first configuration, e.g., spaced from a drum 1768, by engagement with a projection within the opening 1782. When the sinker 1766 is released from within the opening 1782 by the doors 1784, the cam mechanism 1767 may be positioned in the second configuration (engaged with the drum 1768) by loss of engagement with the projection. The towline 1765 may be located between the drum 1768 and the cam mechanism 1767. In this manner, the sinker 1766 may attach with the towline 1765 to form the forward and aft sections of the towline 1765 for use in the towline recovery method and procedures described herein. One of the advantages of the towline recovery system 1760 is that the timing of the release of the doors 1784 to position the sinker 1766 along the towline 1765.

The towline 1765 may also be retrieved by the reel system 1762. The sinker 1766 may be retracted into the opening 1782 and the doors 1784 may be closed. This may actuate the cam mechanism 1767 from the second configuration to the first configuration to release the towline 1765 and allow for continued retrieval of the towline 1765.

Figure 37:
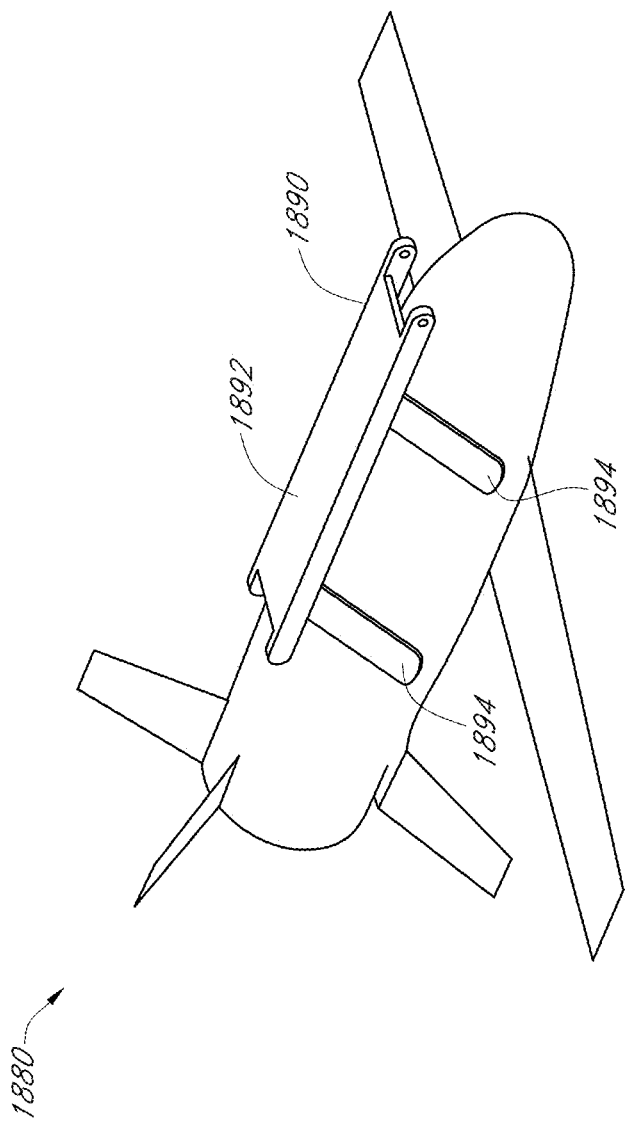
FIG. 37 is a perspective view of an embodiment of a mounting platform on a target aircraft for mounting a towline catch system, and that may be used with the various aircraft recovery systems described herein.

FIG. 37 shows an example of a target aircraft 1880. The target aircraft 1880 may include a mount 1890. The mount 1890 may attach on an upper side of the fuselage of the target aircraft 1880. The mount 1890 may include a substantially flat surface 1892 on an upper side thereof. The mount 1890 may include one or more flanges 1894 for attachment with the fuselage. A catch system may be mounted on the mount 1890 on the flat portion 1892. Thus, existing UAVs may be retrofitted to be usable with the towline recovery procedures described herein.

Figure 38:
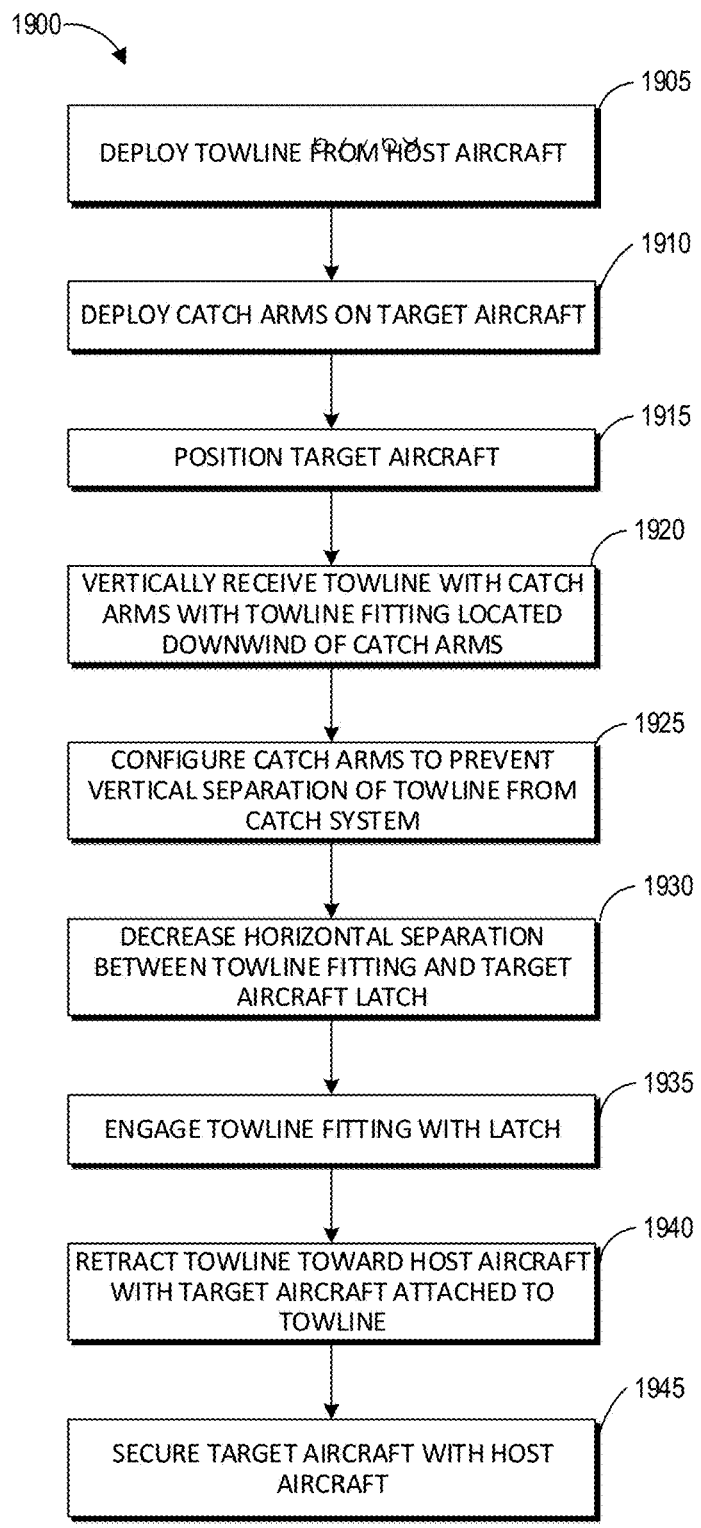
FIG. 38 is a flow chart showing an embodiment of a method of recovering a target aircraft in-flight using a host aircraft recovery system that may be performed using the various target and host aircraft, and features thereof, described herein.
Figure 39:
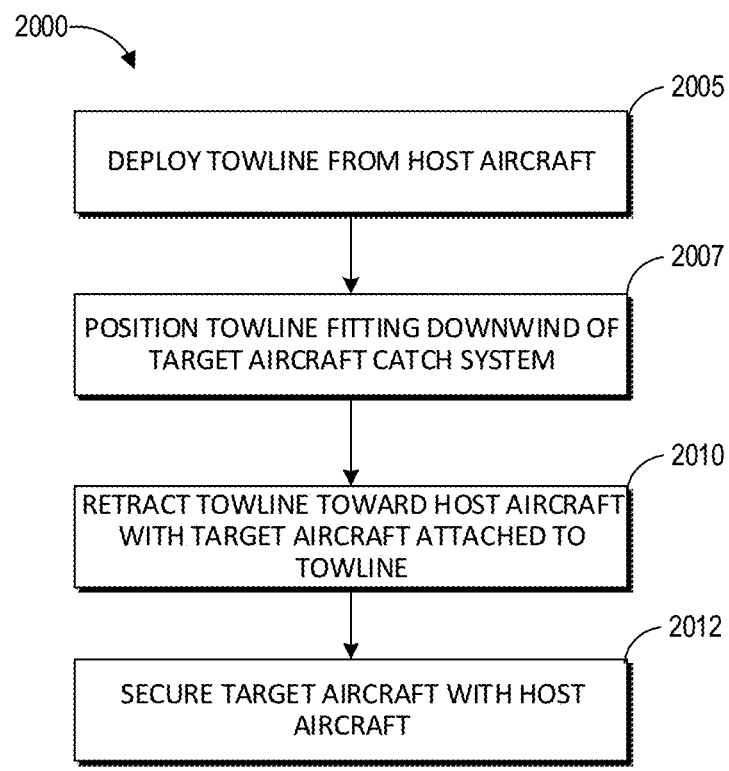
FIG. 39 is a flow chart showing an embodiment of a method of deploying and retrieving a towline in order to recover a target aircraft in-flight, that may be performed by the various host aircraft, and features thereof, described herein.
Figure 40:
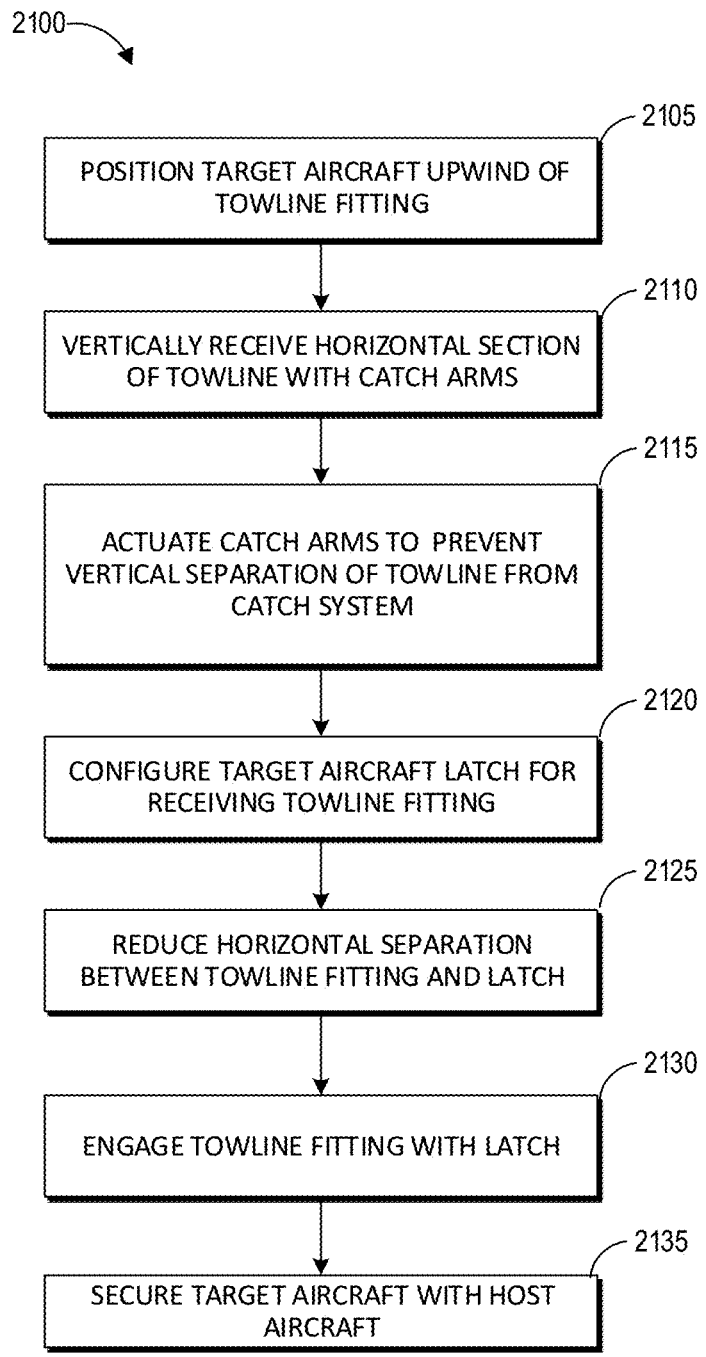
FIG. 40 is a flow chart showing an embodiment of a method of engaging a towline using a catch system in order to be recovered by a host aircraft in-flight, and that may be performed using the various target aircraft, and features thereof, described herein.

FIGS. 38-40 are flowcharts showing various embodiments of methods that may be performed by the host aircraft and/or target aircraft, and/or features thereof, in order to recover the target aircraft in-flight by the host aircraft in-flight. FIG. 38 is a flow chart showing an embodiment of a method 1900 of recovering a target aircraft in-flight using a host aircraft recovery system that may be performed using the various target and host aircraft, and/or features thereof, as described herein for example with respect of FIGS. 1A-37. FIG. 39 is a flow chart showing an embodiment of a method 2000 of deploying and retrieving a towline in order to recover a target aircraft in-flight, that may be performed by the various host aircraft, and/or features thereof, as described herein for example with respect of FIGS. 1A-37. FIG. 40 is a flow chart showing an embodiment of a method 2100 of engaging a towline using a catch system in order to be recovered by a host aircraft in-flight, and that may be performed using the various target aircraft, and/or features thereof, as described herein for example with respect of FIGS. 1A-37.

FIG. 38 is a flow chart showing an embodiment of a target aircraft retrieval method 1900 using a towline recovery system. The method begins with step 1905, where a towline is deployed from a host aircraft, as described herein. The host aircraft can deploy a towline from a towline reel system, as described herein. The towline can include a forward section, a weight, and/or an aft section, as described herein. The host aircraft can trail the deployed towline with the forward section in a substantially vertical orientation and the aft section in a substantially horizontal orientation, as described herein.

At step 1910, catch arms are deployed from the target aircraft. A catch system on the target aircraft can deploy catch arms from a stowed configuration to an open configuration, as described herein. Step 1910 may occur before, during or after step 1905.

At step 1915, the target aircraft is positioned. The target aircraft may be positioned such that the catch is located forward of a towline fitting, as described herein. The target aircraft may maneuver relative to the towline, and/or the host aircraft may maneuver relative to the catch, to locate the towline fitting aft of the catch, as described herein. Step 1915 may occur before, during or after steps 1905 and/or 1910.

At step 1920, the catch arms may vertically receive the aft section of the towline therebetween, as described herein. The catch arms may be in, or may be positioned into, an open position, as described herein. The towline fitting may be located downwind, i.e. aft, of the catch and/or a latch thereof, as described herein.

At step 1925, the catch arms are configured to prevent vertical separation of the towline from the catch system, as described herein. The catch arms may be actuated to enclose the towline between the arms to prevent vertical separation of the towline from the catch system and target aircraft, as described herein.

At step 1930, horizontal separation between the towline fitting and the target aircraft latch is decreased. The target aircraft may move horizontally along the aft section of the towline to decrease the horizontal separation between the latch of the catch system and the fitting on the towline, as described herein. The host aircraft may increase its speed relative to the target aircraft, and/or the target aircraft may decrease its speed relative to the towline fitting, as described herein.

At step 1935, the towline is engaged with the fitting. The fitting on the towline may be engaged with (e.g., secured by) the latch, as described herein. The latch and/or catch arms may be actuated into a stowed or engaged configuration, as described herein. Any of the various embodiments of the fitting, latch and/or catch described herein may be used.

At step 1940, the towline is retracted toward the host aircraft, as described herein. The target aircraft may be attached to the towline such that the target aircraft and host aircraft are directed relatively toward each other, with either or both aircraft changing altitude and/or speed during this maneuver. The target aircraft may enter a towed body flight mode, as described herein. The towline reel system may retract the towline with the target aircraft attached thereto to direct the target aircraft toward the host aircraft, as described herein.

At step 1945, the target aircraft is secured with the host aircraft. The target and host aircraft may be secured together using any of the various structures and methods described herein. The host and target aircraft may be secured at one or more engagement ends, as described herein. Any of the steps of the method 1900 may be performed in the order shown in FIG. 38, or in other orders.

FIG. 39 is a flow chart showing an embodiment of a method 2000 for operating a towline recovery system. The method begins with step 2005, where a towline is deployed from a host aircraft. The host aircraft may deploy a towline from a towline reel system, as described herein. The towline reel system may include a drum about which the towline is wrapped, as described herein. Rotation of the drum may pay out the towline from the reel system, as described herein. The towline may include a forward section, a weight, and an aft section, as described herein. The host aircraft may trail the deployed towline with the forward section in a substantially vertical orientation and the aft section in a horizontal orientation, as described herein.

At step 2007, the towline fitting may be positioned downwind of the target aircraft catch system. The towline may be deployed with enough length such that the towline may extend a fitting at an end thereof aft of the target aircraft. The towline may be deployed into a position such that the target aircraft and/or host aircraft can maneuver to position the fitting aft of the catch system on the target aircraft.

At step 2010, the towline is retracted toward the host aircraft. The target aircraft may be attached with the towline, e.g., via a fitting engaged with a catch system, as described herein, as the towline is retracted. The towline reel system may retract the towline with the target aircraft attached thereto, as described herein.

At step 2012, the target aircraft and host aircraft are secured together. The target aircraft may be secured to the host aircraft at one or more engagement ends, and/or using any of the various structure or methods described herein. Any of the steps of the method 2000 may be performed in the order shown in FIG. 39, or in other orders.

FIG. 40 is a flowchart showing an embodiment of a method 2100 for using a catch system on a target aircraft as part of a recovery. At step 2105, the target aircraft is positioned upwind of the deployed towline fitting. The target aircraft may change speed and/or altitude to position a catch system on the target aircraft upwind or forward of the fitting.

At step 2110, the catch system of the target aircraft receives the towline. The horizontal section of the towline may be vertically received by the catch system, as described herein. The catch arms may receive the towline therein. The catch system on the target aircraft may deploy catch arms from a stowed configuration to an open configuration. The target aircraft may maneuver relative to the towline. The target aircraft may increase altitude and/or the host aircraft may decrease altitude (or otherwise lower the towline, such as by paying out more towline).

At step 2115, catch arms may be actuated to prevent vertical separation of the towline from the catch system. The catch arms may vertically receive the aft section of the towline therebetween and then actuate to close about or otherwise surround the towline and prevent vertical separation. The catch arms may be actuated to completely enclose the towline to prevent vertical separation of the towline from the catch system and target aircraft. The towline may be limited to moving within a boundary defined by the catch arms, to guide the towline fitting into a latch as the towline moves horizontally therethrough in subsequent steps, as described herein.

At step 2120, a latch on the target aircraft may be configured to receive a towline fitting. The catch system may deploy a latch, as described herein. The latch may already be in an open configuration. The latch may be configured using any of the structures or methods described herein. The latch may vertically receive the towline. The latch may be actuated to enclose the towline in a closed configuration.

At step 2125, horizontal separation between the towline fitting and the latch is decreased. The target aircraft may move horizontally relative to the towline in a rearward direction along the aft section of the towline. The target aircraft may slow down, as described herein.

In step 2130, a latch on the catch system engages with a towline fitting. The latch may receive the fitting on the towline, as described herein. Any of the various structures and methods for the latch as described herein may be used. The catch arms and/or latch may be actuated into a stowed configuration in any of steps 2115, 2120, 2125, or 2130.

In step 2135, the target aircraft is secured with the host aircraft. The target aircraft may be retrieved and directed toward the host aircraft along the towline. The target aircraft may control its trajectory, e.g. speed, orientation, and/or altitude. The target aircraft may enter a tow mode, as described herein. Any of the steps of the method 2100 may be performed in the order shown in FIG. 40, or in other orders.

Any portion of any of the steps, processes, structures, and/or devices disclosed or illustrated in one example in this disclosure may be combined or used with (or instead of) any other portion of any of the steps, processes, structures, and/or devices disclosed or illustrated in a different example or flowchart. The examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described may be incorporated in the example methods and processes. For example, one or more additional operations may be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems may generally be integrated together in a single product or packaged into multiple products. Additionally, some implementations are within the scope of this disclosure.

Terms of orientation used herein, such as "top," "bottom," "proximal," "distal," "longitudinal," "lateral," and "end," are used in the context of the illustrated example. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that may be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but may encompass structures that are reasonably close approximations.

Conditional language, such as "may," "could," "might," or "may," unless specifically stated otherwise, or otherwise understood within the context as used, is generally intended to convey that certain examples include or do not include, certain features, elements, and/or steps. Thus, such conditional language is not generally intended to imply that features, elements, and/or steps are in any way required for one or more examples.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

The terms "approximately," "about," and "substantially" as used herein represent an amount close to the stated amount that still performs a desired function or achieves a desired result. For example, in some examples, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain examples, as the context may dictate, the term "generally parallel" may refer to something that departs from exactly parallel by less than or equal to 20°. All ranges are inclusive of endpoints.

Several illustrative examples of towlines and related systems and methods have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps may be arranged or performed differently than described and components, elements, features, acts, or steps may be combined, merged, added, or left out in various examples. All possible combinations and subcombinations of elements and components described herein are intended to be included in this disclosure. No single feature or group of features is necessary or indispensable.

Certain features that are described in this disclosure in the context of separate implementations may also be implemented in combination in a single implementation. Conversely, various features that are described in the context of a single implementation also may be implemented in multiple implementations separately or in any suitable subcombination. Moreover, although features may be described above as acting in certain combinations, one or more features from a claimed combination may in some cases be excised from the combination, and the combination may be claimed as a subcombination or variation of a subcombination.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. For example, some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components may be added, removed, and/or rearranged. Further, the disclosure herein of any particular feature, aspect, method, property, characteristic, quality, attribute, element, or the like in connection with various examples may be used in all other examples set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular example of the inventions disclosed herein. No aspects of this disclosure are essential or indispensable. In many examples, the devices, systems, and methods may be configured differently than illustrated in the figures or description herein. For example, various functionalities provided by the illustrated modules may be combined, rearranged, added, or deleted. In some implementations, additional or different processors or modules may perform some or all of the functionalities described with reference to the examples described and illustrated in the figures. Many implementation variations are possible. Any of the features, structures, steps, or processes disclosed in this specification may be included in any example.

In summary, various examples of towlines and related systems and methods have been disclosed. This disclosure extends beyond the specifically disclosed examples to other alternative examples and/or other uses of the examples, as well as to certain modifications and equivalents thereof. Moreover, this disclosure expressly contemplates that various features and aspects of the disclosed examples may be combined with, or substituted for, one another. Accordingly, the scope of this disclosure should not be limited by the particular disclosed examples described above, but should be determined only by a fair reading of the claims.

What is claimed is:

1. A system for in-flight recovery of a target aircraft by a host aircraft during forward flight, the system comprising:
 a reel configured to attach with the host aircraft;
 a towline comprising an aft section and a fitting attached to the aft section, wherein the reel is configured to pay out the towline from the reel to extend the fitting away from the host aircraft during forward flight;
 a catch system comprising at least one moveable arm configured to attach with the target aircraft and to transition from a first configuration to a second configuration, wherein in the first configuration, the catch system is configured to vertically receive a section of the towline located forward of the fitting, and in the second configuration, the at least one movable arm of the catch system is configured to prevent the towline from vertically separating from the catch system as the catch system and the towline move horizontally relative to each other;
 wherein the catch system is further configured to couple with the fitting after a horizontal separation between the catch system and the fitting aft of the catch system is decreased such that the fitting and the catch system are brought into contact with one another, and wherein the reel is further configured to retract the towline with the catch system coupled with the fitting to direct the target aircraft towards the host aircraft.

2. The system of claim 1, wherein the aft section of the towline includes a drogue configured to increase drag on the aft section of the towline to thereby cause the aft section to be oriented in a substantially horizontal orientation.

3. The system of claim 2, wherein the drogue comprises the fitting.

4. The system of claim 2, wherein the fitting is located along the towline forward of the drogue.

5. The system of claim 1, wherein the catch system comprises two moveable arms configured to deploy, to guide the towline, and to stow.

6. The system of claim 5, wherein the two moveable arms comprises a first arm and a second arm, wherein the first arm is configured to cross the second arm to prevent vertical separation of the towline from the catch system.

7. The system of claim 6, wherein the two moveable arms are further configured to transition between a stowed configuration, the first configuration, and the second configuration, wherein in the stowed configuration the two moveable arms extend along opposite sides of target aircraft, wherein in the first configuration, the two moveable arms extend to receive the towline and define a capture envelope of the towline, and wherein in the second configuration the two moveable arms rotate downward towards each other and cross to create a closed section between the two moveable arms to capture the towline, wherein the two moveable arms guide the towline to a latch configured to engage with the fitting.

8. The system of claim 5, wherein the two moveable arms comprise elongated members or hooks.

9. The system of claim 1, wherein the catch system further comprises a latch configured to engage with the fitting.

10. The system of claim 1, wherein the towline further comprises a weighted section and a forward section, wherein the forward section is separated from the aft section by the weighted section.

11. The system of claim 10, wherein the aft section of the towline includes a drogue, and wherein the weighted section of the towline and the drogue are configured to cause the aft section of the towline to extend rearward from the weighted section at an angle of less than 180° (degrees) relative to the forward section.

12. A method for in-flight recovery of a target aircraft by a host aircraft during forward flight, the method comprising:
deploying a towline away from the host aircraft having a fitting coupled with the towline;
vertically receiving the towline with a catch system on the target aircraft forward of the fitting;
causing relative horizontal movement between the catch system and the towline to couple the fitting with the catch system; and
retracting the towline toward the host aircraft to direct the target aircraft toward the host aircraft after the catch system has engaged the fitting.

13. The method of claim 12, further comprising orienting an aft section of the towline in a substantially horizontal orientation.

14. The method of claim 12, further comprising detecting a position of the towline using an imaging system on the target aircraft and/or host aircraft, the imaging system comprising optical cameras.

15. The method of claim 12, further comprising changing a configuration of the target aircraft to a tow configuration.

16. The method of claim 12, wherein vertically receiving the towline with the catch system on the target aircraft includes deploying one or more arms of the catch system to receive the towline.

17. The method of claim 12, further comprising horizontally receiving the fitting within a latch of the catch system on the target aircraft.

18. The method of claim 17, further comprising deploying the latch from a stowed configuration to an open configuration, receiving the towline within the latch, and actuating the latch to a closed configuration with the towline secured therein.

19. The method of claim 12, further comprising securing the target aircraft with the host aircraft.

20. A system for in-flight recovery of a target aircraft by a host aircraft during forward flight, the system comprising:
a reel configured to attach with the host aircraft;
a towline comprising an aft section and a fitting attached to the aft section, wherein the reel is configured to pay out the towline away from the host aircraft during forward flight such that the aft section extends substantially horizontally; and
a catch system coupled to the target aircraft and configured to vertically receive a section of the towline forward of the fitting, the catch system further configured to engage the fitting after relative motion between the catch system and fitting decreases a horizontal separation aft of the catch system,
wherein the reel is further configured to retract the towline with the catch system engaging the fitting to direct the target aircraft towards the host aircraft.

21. The system of claim 20, wherein:
the system further comprises a decoupling mechanism mounted on the reel; and
the towline further comprises a weighted section located between a forward section and an aft section of the towline, the weighted section comprising a plurality of discrete weights; and
the discrete weights are configured to allow the towline to be released between the discrete weights of the weighted section by the decoupling mechanism.

22. The system of claim 21, wherein the decoupling mechanism comprises a blade to sever a target portion of the towline between the discrete weights.

23. The system of claim 21, wherein the decoupling mechanism comprises a releasable clamp to release a portion of the weighted section.

24. The system of claim 20, wherein the catch system is further configured to transition from a first configuration to a second configuration, wherein in the first configuration the catch system is configured to vertically receive a part of the towline located forward of the fitting, and in the second configuration the catch system is configured to prevent vertical separation of the towline from the catch system as the catch system and the towline move horizontally relative to each other.

25. The system of claim 20, wherein the towline further comprises a weighted section and a forward section, wherein the forward section is separated from the aft section by the weighted section.

26. The system of claim 25, further comprising a drogue attached with the aft section, and wherein the weighted section of the towline and the drogue are configured to cause the aft section of the towline to extend rearward from the weighted section at an angle of less than 180° (degrees) relative to the forward section.

27. The system of claim 26, wherein the drogue is one of a chute, a streamer, and a solid-body object.

28. The system of claim 26, wherein the fitting is located forward of the drogue.

29. The system of claim 20, wherein the catch system comprises one or more catch arms configured to deploy, to guide the towline, and to stow.

30. The system of claim 29, wherein the one or more arms comprises a first arm and a second arm, wherein the first arm is configured to cross the second arm to prevent vertical separation of the towline from the catch system.

31. The system of claim 29, wherein the one or more catch arms are further configured to transition between a stowed configuration, an open configuration, and a closed configuration, wherein in the stowed configuration the one or more catch arms extend along opposite sides of target aircraft, wherein in the open configuration, the one or more catch arms extend to receive the towline and define a capture envelope of the towline, and wherein in the closed configuration the one or more catch arms rotate downward towards each other and cross to create a closed section between the one or more catch arms to capture the towline, wherein the one or more catch arms guide the towline to a latch configured to engage with the fitting.

* * * * *